(12) United States Patent
Rastegar

(10) Patent No.: US 11,626,596 B2
(45) Date of Patent: Apr. 11, 2023

(54) LIQUID RESERVE BATTERIES FOR LOW TEMPERATURE ACTIVATION AND PERFORMANCE IN MUNITIONS

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/736,880

(22) Filed: May 4, 2022

(65) Prior Publication Data
US 2022/0416261 A1 Dec. 29, 2022

Related U.S. Application Data

(63) Continuation of application No. 17/095,660, filed on Nov. 11, 2020, now Pat. No. 11,335,916.

(60) Provisional application No. 62/933,596, filed on Nov. 11, 2019.

(51) Int. Cl.
| | | |
|---|---|---|
| H01M 6/00 | (2006.01) | |
| H01M 6/38 | (2006.01) | |
| H01M 50/60 | (2021.01) | |
| H01M 50/70 | (2021.01) | |
| H01M 50/463 | (2021.01) | |
| H01M 50/636 | (2021.01) | |

(52) U.S. Cl.
CPC ............ *H01M 6/38* (2013.01); *H01M 50/463* (2021.01); *H01M 50/60* (2021.01); *H01M 50/636* (2021.01); *H01M 50/70* (2021.01)

(58) Field of Classification Search
CPC .......... H01M 6/38; H01M 2/18; H01M 2/365; H01M 2/361; H01M 2/38; H01M 50/463; H01M 50/609; H01M 50/636; H01M 50/682; H01M 50/60
See application file for complete search history.

(56) References Cited

U.S. PATENT DOCUMENTS

2019/0363364 A1* 11/2019 Honda ................ H01M 50/186

* cited by examiner

*Primary Examiner* — Cynthia H Kelly
*Assistant Examiner* — Monique M Wills

(57) ABSTRACT

A liquid reserve battery including: a collapsible storage unit having a collapsible cavity for storing a liquid electrolyte therein; and a battery cell in communication with an outlet of the collapsible storage unit, the battery cell having gaps dispersed therein. Wherein the collapsible storage unit comprises a plurality of triangular sidewalls; and the plurality of triangular sidewalls being configured to collapse in a longitudinal direction about a hinge disposed between adjacent sides of each of the plurality of triangular sidewalls.

17 Claims, 35 Drawing Sheets

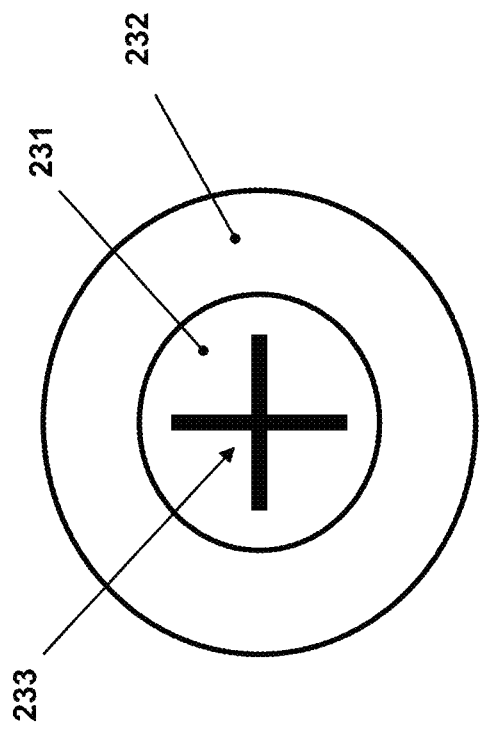
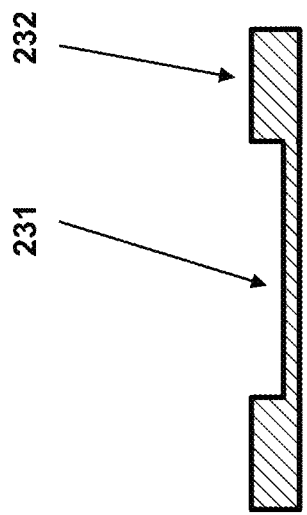
Figure 18B
Figure 18A

LIQUID RESERVE BATTERIES FOR LOW TEMPERATURE ACTIVATION AND PERFORMANCE IN MUNITIONS

CROSS REFERENCE TO RELATED APPLICATION

This application is a Continuation Application of U.S. patent application Ser. No. 17/095,660 filed on Nov. 11, 2020, which claims the benefit of U.S. Provisional Application No. 62/933,596 filed on Nov. 11, 2019, the entire contents of each of which are incorporated herein by reference. This application is related to U.S. application Ser. No. 16/532,249 filed on Aug. 5, 2019, which is a Divisional Application of U.S. application Ser. No. 14/590,955 filed on Jan. 6, 2015 (now U.S. Pat. No. 10,374,213 issued on Aug. 6, 2019), which is a continuation-in-part of U.S. application Ser. No. 13/350,907, filed on Jan. 16, 2012 (now U.S. Pat. No. 9,252,433 issued on Feb. 2, 2016), the entire contents of each of which are incorporated herein by reference.

BACKGROUND

1. Field

The present invention relates generally to reserve power sources for munitions; and more particularly to liquid reserve batteries for use in gun-fired munitions, sub-munitions, mortars and the like. The liquid reserve batteries can be activated at very low temperatures and continue to operate at high performance following activation. The electrolyte storage reservoir design allows for battery miniaturization and increased reliability.

2. Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which are to operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the Li(Si)/$FeS_2$ or Li(Si)/$CoS_2$ couples. Some batteries also employ anodes of Li(Al) in place of the Li(Si) anodes. Insulation and internal heat sinks are used to maintain the electrolyte in its molten and conductive condition during the time of use.

The second type includes the so-called liquid reserve batteries in which the electrodes are fully assembled for cooperation, but the liquid electrolyte is held in reserve in a separate container until the batteries are desired to be activated. In these types of batteries, since there is no consumption of the electrodes under these circumstances, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms or by the high-G firing setback shock. In these batteries, the projectile spin or a wicking action of the separator is generally used to transport the electrolyte into the battery cells.

In recent years, there have been a number of advancements in reserve battery technologies. Among these advances are superhydrophobic nanostructured materials, bimodal lithium reserve battery, and ceramic fiber separator for thermal batteries. In one liquid reserve battery technology under development, "superhydrophobic nanostructured material" is used in a honeycomb structure to keep the electrolyte separated from the battery cell. "Electrowetting" is achieved by the application of a trigger voltage pulse. The electrolyte can then penetrate the honey comb structure and come into contact with the electrodes, thereby making the cell electrochemically active.

The currently available liquid reserve batteries of all types and designs and those that are known to be under development materials suffer from several basic shortcomings for munitions applications, including the following:

1. The main shortcoming of currently available liquid reserve batteries of all types and designs is their very poor performance at low temperatures, usually below −25 deg. F. and for becoming almost non-functional at lower temperatures. In most munitions applications, however, the batteries are required to be operational at significantly lower temperatures of −40 deg. F. and sometimes lower, and sometimes after storage at temperatures as low as −65 deg. F.
2. The second shortcoming of liquid reserve batteries is their relatively slow rise time, particularly at low temperatures. Researchers have, however, attempted to minimize this shortcoming by, for example, by injecting pressurized electrolyte into the battery cells; using wicks to increase the electrolyte diffusion rate; utilize spin and/or setback to move electrolyte into the battery cell to increase; etc. These methods have improved the liquid reserve battery rise time, but have not resolved the problems at low temperatures.
3. The third shortcoming is activation at very low temperatures, for example at temperatures as low as −65 deg. F. and even lower and then keeping the battery to operate at such low temperatures at high performance levels (for example at room temperature or close to that) after activation.
4. In addition, the use of glass ampule for electrolyte storage and its general has presented a wide range of manufacturing and safety problems.
5. When bellow type electrolyte storage devices are used, such electrolyte storage devices only eject a relatively small fraction of their electrolyte content into the battery core, thereby resulting in a significantly larger battery size.

SUMMARY

A need therefore exists for liquid reserve batteries that can effectively operate with good performance at low temperatures, particularly at temperatures below −25 to −40 deg. F. and even after being stored at temperatures as low as −65 deg. F.

A need also exists for liquid reserve batteries that do not only operate effectively operate with good performance at low temperatures, but are also capable of becoming operational very rapidly following activation, i.e., to have a so-called short rise time to full or near full capacity.

In particular, there is a need for such liquid reserve batteries for gun-fired munitions, mortars and the like that are inactive prior to launch and become active during or after certain amount of time following launch or other similar linear or rotary (spin) acceleration or deceleration event. Such liquid reserve batteries must be capable of withstanding high firing accelerations; have very long shelf life, preferably beyond 20 years; and that can be used in munitions with any spin rates, including very low or no spin to very high spin rate munitions.

In particular, there is a need for relatively small reserve power sources for munitions, particularly for smaller caliber munitions, that can withstand very high firing accelerations; have very long shelf life, preferably beyond 20 years; and that can be in munitions with very high spin rates.

Such liquid reserve power sources are preferably initiated as a result of the munitions firing using inertial igniters such as those disclosed in U.S. Pat. Nos. 7,437,995; 7,587,979; 7,587,980; 7,832,335 and 8,061,271 and U.S. patent application Ser. Nos. 12/774,324; 12/794,763; 12/835,709; 13/180,469; 13/207,280 and 61/551,405 (the full disclosure of each of which being incorporated herein by reference) or piezoelectric-based inertial igniters such as those disclosed in U.S. Pat. No. 8,024,469 and U.S. patent application Ser. Nos. 13/186,456 and 13/207,355 the full disclosure of each of which being incorporated herein by reference) or other electrical initiators. The piezoelectric-based inertial igniters, particularly those that can provide relatively long initiation delay, are highly advantageous since by delaying the initiation, the time period in which the battery is subjected to high acceleration/deceleration levels is reduced or even preferably eliminated. The reserve battery may also be activated following launch when its power is needed, which may in certain cases be long after launch and even landing. The initiation devices to be used must also be capable to operate safely by differentiating all-fire and various no-fire events such as accidental drops and vibration and impact during transportation and loading and even nearby explosions. The task of differentiating all-fire conditions from no-fire conditions is preferably performed without the use of external acceleration sensors and the like, and/or the use of external power sources.

An objective of the present invention is to provide new types of liquid reserve batteries (power sources) that can operate efficiently at very low temperatures and that can be activated and brought to operational power levels rapidly. Such liquid reserve batteries can also be fabricated in small sizes suitable for use in small and medium caliber munitions, sub-munitions and the like.

Another objective of the of the present invention is to provide new types of liquid reserve batteries and methods of their design and construction such that they could be activated by the initiation of pyrotechnic materials, thereby allowing their liquid electrolyte to be heated prior and even after injection into the battery cell to allow activation at very low temperatures and faster activation.

Another objective of the present invention is to provide new types of liquid reserve batteries and methods of their design and construction such that they could be activated by the initiation of pyrotechnic materials, and the pressure generated by the initiation of the pyrotechnic material be used to rapidly inject the (heated) liquid electrolyte into the battery cell cavities to achieve very fast battery activation.

In one disclosed liquid reserve battery design, the aforementioned pressure generated by the initiation of the pyrotechnic material is used to generate vacuum in a region of the battery to assist evacuation of the gasses filling the battery cell cavities as the electrolyte liquid enters to fill these cavities, thereby minimizing their resistance to inflow of the liquid electrolyte, further reducing the battery rise time. The provided vacuum (suction) is particularly effective when the liquid electrolyte is being injected into the battery cell cavities under pressure.

To ensure safety and reliability, the liquid reserve power source withstand and not initiate during acceleration events which may occur during manufacture, assembly, handling, transport, accidental drops, etc. Additionally, once under the influence of an acceleration profile particular to the firing of the ordinance, i.e., an all-fire condition (with or without a programmed delay period), the reserve battery must initiate with high reliability.

The disclosed reserve power sources are preferably provided with hermetically sealed packaging. The disclosed reserve power sources would therefore be capable of readily satisfying most munitions requirement of 20-year shelf life requirement and operation over the military temperature range of −65 to 165 degrees F., while withstanding high G firing accelerations.

In many applications, the liquid reserve battery is required to provide full or close to full power very short time after initiation. This capability is particularly challenging when the reserve battery is at very low temperatures such as the aforementioned −65 degrees F. For this reason, the electrolyte must be at a relatively high temperature before it is injected into the battery cell since it is also required to provide the required amount of heat to rapidly heat the cell elements while staying warm enough to ensure proper operation of the reserve power source.

In most low temperature applications, once the liquid reserve battery has been activated at very low temperatures, such as −65 degrees F. or even lower, it must be capable of providing power at room or close to room temperature performance levels for sometimes several minutes to several days or even weeks. In such applications, the liquid reserve battery must be provided with the means of keeping the battery at higher temperature performance levels, i.e., keep the battery core at high enough temperatures.

The method of activating liquid reserve batteries at low temperatures must be compatible for battery activation at higher environmental temperatures, such as environmental temperatures of up to 165 degrees F. as required by the military.

Current liquid reserve batteries commonly use glass ampules as reservoir to store battery electrolyte prior to activation. The glass ampules electrolyte storage has presented a wide range of manufacturing and safety problems. It is thereby highly desirable to replace glass ampules with metallic (not brittle like glass) or the like electrolyte storage containers. Such metallic or and non-brittle electrolyte storage containers must be readily "collapsible" and eject nearly all their electrolyte content into the battery core with subjected to the activation force/pressure and stay in their collapsed state so that the ejected electrolyte could not return back into the electrolyte storage container.

A need therefore exists for liquid reserve batteries that can be activated at very cold temperatures that may reach −65 degrees F. and even lower and be capable of operating at such low temperatures at or close to optimal performance levels, usually close to room temperature.

A need also exists for methods and devices for activating liquid reserve batteries at low temperatures that are compatible for battery activation at higher environmental temperatures, such as environmental temperatures of up to 165 degrees F. as required by the military. Such methods and devices are preferably passive and adaptive, i.e., do not requires sensory, actuation, power sources, and the like for their proper operation.

A need also exists for methods and devices for electrolyte storage containers that are not fragile like currently used glass ampules and are safe to handle and readily manufacturable and that unlike bellow type storage containers, would eject almost all of their content into the battery core upon activation and require relatively low force/pressure to collapse and would stay in its collapsed state after the activation force/pressure has ceased.

Current liquid reserve batteries commonly use glass ampules as reservoir to store battery electrolyte prior to activation. The glass ampules electrolyte storage has presented a wide range of manufacturing and safety problems. It is thereby highly desirable to replace glass ampules with metallic (not brittle like glass) or the like electrolyte storage containers. Such metallic or relatively ductile electrolyte storage containers must be readily "collapsible" and eject nearly all their electrolyte content into the battery core when subjected to the activation force/pressure and stay in their collapsed state so that the ejected electrolyte could not return back into the electrolyte storage container.

Such liquid reserve batteries must be capable of withstanding high firing accelerations; have very long shelf life, preferably beyond 20 years; and that can be used in munitions with any spin rates, including very low or no spin to very high spin rate munitions.

BRIEF DESCRIPTION OF THE DRAWINGS

These and other features, aspects, and advantages of the apparatus of the present invention will become better understood with regard to the following description, appended claims, and accompanying drawings where:

FIGS. 18A and 18B are the cross-sectional and top views of the electrolyte storage container exit port membrane.

DETAILED DESCRIPTION

Figure 1:
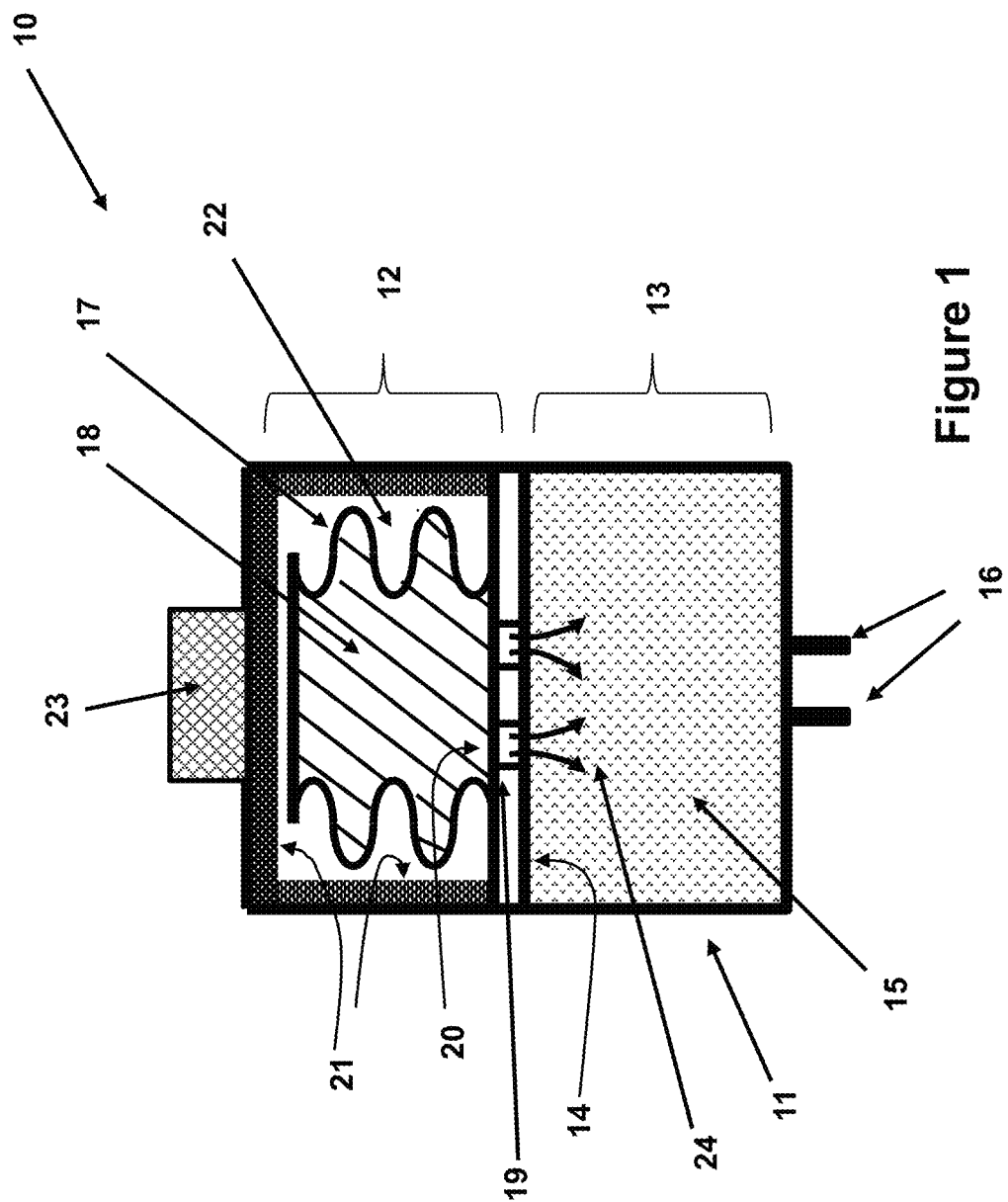
FIG. 1 illustrates a sectional schematic of the first embodiment of the pyrotechnic activated liquid reserve battery for fast activation and high low-temperature performance.

An embodiment 10 of the present novel pyrotechnic charge activated liquid reserve batteries is shown in the cross-sectional schematic of FIG. 1. The novel pyrotechnic charge activated liquid reserve battery, hereinafter also referred to as simply "liquid reserve battery" consists of a body 11, which is divided into two compartments 12 and 13. The compartment 12 is where the liquid electrolyte and pyrotechnic material are located. The compartment 13 is where the battery electrodes are spaced with gaps to accommodate the battery liquid electrolyte, the entire combined volume of which is indicated by the numeral 15 and hereinafter will be referred to as a "battery cell". The compartments 12 and 13 can be divided by a single relatively rigid separating plate 14. The battery body 11, the dividing plate 14 and other structures of the battery can be made out of relatively non-corrosive metal such as stainless steel. The liquid reserve battery 10 terminals are indicated by numeral 16. The terminals 16 of the liquid reserve battery 10 may be located at any convenient location, such as being positioned on a surface of the battery cell compartment 13 to avoid running wires to them through compartment 12.

In general, the body 11 and the compartments 12 and 13 of the liquid reserve battery 10 may be formed to have any convenient shape, such as to match an available space in the munitions.

In the compartment 12 is located at least one collapsible (e.g., bellow like) storage unit 17 within which the liquid electrolyte 18 is stored. At least one, which can be several, outlet holes 19 are provided on the relatively rigid separating plate 14. The outlet holes 19 are sealed by relatively thin, such as metallic, diaphragms 20. Pyrotechnic materials 21, such as in a layer configuration as shown in the schematic of FIG. 1 are provided in the sealed volume 22 between the collapsible liquid electrolyte storage unit 17 and the compartment 12 walls. The liquid reserve battery 10 is also provided with an initiation device 23 for igniting the pyrotechnic materials 21. The initiation device 23 is either of inertial, electrical, or other available types appropriate for the application at hand (e.g., see those listed above) which can, for example, ignite the pyrotechnic material upon the occurrence of an acceleration with at least a predetermined duration and magnitude.

The liquid reserve battery 10 is activated by the initiation device 23 igniting the pyrotechnic materials 21. The burning pyrotechnic material 21 generates heat and heats the stored liquid electrolyte 18. The burning pyrotechnic material 21 also generates pressure within the sealed volume 22 by heating the enclosed gasses as well as by generating new gasses. The generated pressure would then act over the surface of the at least one collapsible liquid electrolyte storage unit 17, forcing it to collapse, thereby forcing the pressurized liquid electrolyte 18 to rupture the diaphragm(s) 20 separating it from the battery cell 15 and rapidly injecting the heated liquid electrolyte 18 into the cavities between the battery cell 15 electrodes as shown by the arrows 24. The liquid reserve battery 10 is thereby activated very rapidly without the need for wicks or munitions spin or other additional means. In addition, the heating of the liquid electrolyte 18 (even if it is turned solid due to extreme cold temperatures) would allow activation of the liquid reserve battery 10 at very cold temperatures and ensures its high performance. The heating of the liquid electrolyte 18 would also enhance its diffusion rate inside the battery cell 15.

The collapsible liquid electrolyte storage unit 17 can be configured with a relatively large surface area to allow for rapid transfer of heat to the liquid electrolyte 18. The liquid electrolyte storage unit 17 can also be configured to deform plastically under the generated pressure so that once the pressure has subsided, only a minimal amount of the liquid electrolyte 18 is returned back to the storage unit 17. Alternatively, particularly when the size of the battery allows, one-way valves (not shown) may be used to prevent the return of the liquid electrolyte 18 back to the liquid electrolyte storage unit 17. Such fluid one-way valves are well known in the art, such as the use of sealing flaps or balls positioned in an orifice.

As indicated previously, the burning of the provided pyrotechnic material 21 serves the following purposes. Firstly, it is used for battery activation, i.e., to release the stored liquid battery electrolyte 18 into the battery core 15. Secondly, it generates heat, which is used to heat the liquid electrolyte 18 to allow the battery to function at very low temperatures and at the same time enhance its penetration rate into the battery cell 15 as well as its rate of diffusion. Thirdly, the pressure generated by the initiation of the pyrotechnic material 21 is used to inject the liquid electrolyte 18 into the battery cell 15 under pressure. Fourthly, as is shown in a later embodiment, the pressure generated by the initiation of the pyrotechnic material 18 can also be used to generate vacuum to assist outflow of gasses occupying the voids inside the battery cell 15 between the electrodes that are to be filled with the liquid electrolyte 18, thereby minimizing resistance to the inflow of the liquid electrolyte 18 into the battery cell 15.

The time that it takes for a liquid reserve battery to become fully active following the activation of the initiation device 23, also called the battery "rise time" is dependent on the time that it takes for the liquid electrolyte 18 to fill the battery cell 15 cavities and begin to interact with the battery electrodes. The following two alternative embodiments are modifications to embodiment 10 of the present pyrotechnic activated liquid reserve batteries to achieve significantly faster rise time.

Figure 2:
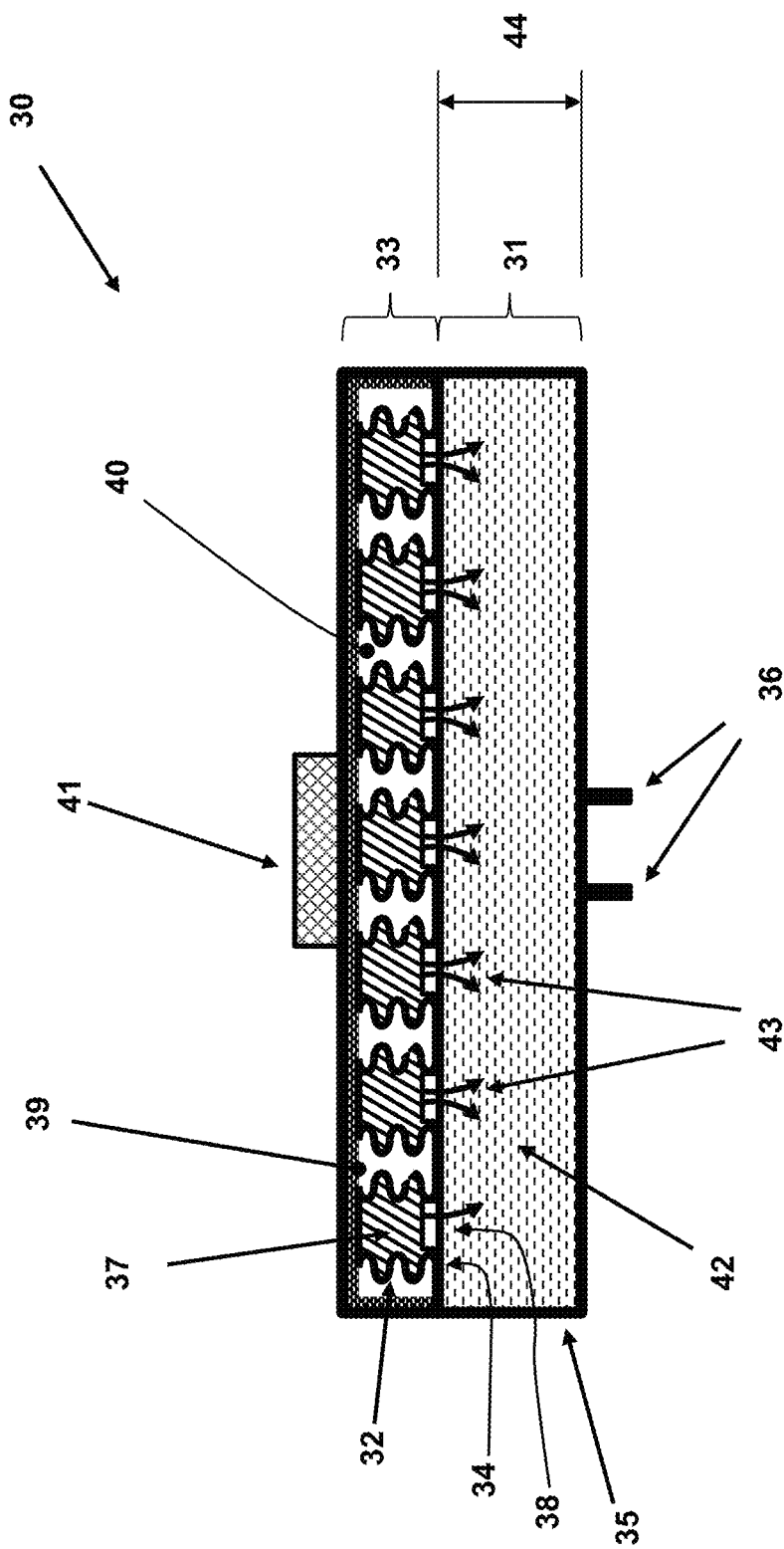
FIG. 2 illustrates a sectional schematic of a first variation of the pyrotechnic activated liquid reserve battery of FIG. 1.

A first modification to the embodiment 10 of FIG. 1 is illustrated schematically in the cross-sectional view of FIG. 2 and is indicated as the embodiment 30. In the embodiment 30, the distance that the liquid electrolyte has to penetrate inside the battery cell is significantly reduced. This is accomplished as shown in FIG. 2 by significantly reducing the height of the battery cell compartment 31 (in the indicated vertical direction-44), while distributing the battery core electrodes over a significantly larger surface area of the battery cell compartment (e.g., in a direction orthogonal to the vertical direction). To shorten the path of liquid electrolyte travel within the battery cell 42, it is also required that the liquid electrolyte be released over as large a surface of the battery cell 42 as possible. To this end, a number of collapsible liquid electrolyte storage units 32 are distributed over the plate separating the liquid electrolyte and pyrotechnic material compartment 33.

The battery compartment 31 is still where the battery electrodes are spaced with gaps to accommodate the battery liquid electrolyte. The compartments 31 and 33 can be divided similarly by a single relatively rigid separating plate 34. The liquid reserve battery body 35, the dividing plate 34 and other structures of the battery can be made out of relatively non-corrosive metal such as stainless steel. The liquid reserve battery 30 terminals are indicated by numeral 36. The terminals 36 of the liquid reserve battery 30 may be located at any convenient location, such as being positioned on a surface of the battery cell compartment 31 to avoid running wires to the electrodes 36 through the compartment 33.

In general, the body 35 and the compartments 31 and 33 of the liquid reserve battery 30 may be formed into any convenient shape, such as to match the available space in the munitions.

In the compartment 33 are located a plurality of collapsible (e.g., bellow like) storage units 32 within which the liquid electrolyte 37 are stored. The collapsible storage units 32 are preferably relatively small but numerous, and can be uniformly distributed over the surface of the dividing plate 34 or non-uniformly distributed depending on the corresponding shape/volume of the compartment 31. The collapsible storage units 32 must obviously contain enough liquid electrolytes 37 to flood the entire battery cell 42 cavities. Each collapsible storage unit 32 is provided with at least one outlet hole 38 in the dividing plated 34. The outlet holes 38 are sealed by relatively thin, such as metallic, diaphragms similar to the embodiment 10 of FIG. 1 (not shown). Pyrotechnic materials 39, preferably in a layer configuration as shown in the schematic of FIG. 2 are provided in the sealed volume 40 between the collapsible liquid electrolyte storage units 32 and the compartment 33 walls. As discussed above with regard to the bellows, the pyrotechnic materials 39 can be uniformly distributed in the compartment 33 or non-uniformly depending on the distribution of the corresponding collapsible storage units 32 and/or corresponding shape/volume of the compartment 31. The liquid reserve battery 30 is also similarly provided with an initiation device 41 for igniting the pyrotechnic materials 39. The initiation device 41 is either of inertial, electrical, or other available types appropriate for the application at hand (such as those listed above).

The liquid reserve battery 30 is activated by the initiation device 41 igniting the pyrotechnic materials 39. The burning pyrotechnic material 39 generates heat, which heats the stored liquid electrolyte 37 in all the collapsible storage units 32. The burning pyrotechnic material 39 also generates pressure within the sealed volume 40 by heating the enclosed gasses as well as by generating new gasses. The generated pressure would then act over the surfaces of all the collapsible liquid electrolyte storage units 32, forcing them to collapse, thereby forcing the pressurized and heated liquid electrolytes 37 to rupture the diaphragms separating them from the battery cell 42 and rapidly injecting the heated liquid electrolytes 37 into the cavities between the battery cell 42 electrodes as shown by the arrows 43. The liquid reserve battery 30 is thereby activated very rapidly without the need for wicks or munitions spin or other additional means. In addition, the heating of the liquid electrolyte 37 (even if it is turned solid due to extreme cold temperatures) would allow activation of the liquid reserve battery 30 at very cold temperatures and ensures its high performance. The heating of the liquid electrolyte 37 would also enhance its diffusion rate inside the battery cell 42.

The collapsible liquid electrolyte storage units 32 can be configured with a relatively large surface area to allow for rapid transfer of heat to the liquid electrolytes 37. The liquid electrolyte storage units 32 can also be configured to deform plastically under the generated pressure so that once the pressure has subsided, only a minimal amount of the liquid electrolyte 37 is returned back to the storage unit 32. Alternatively, particularly when the size of the battery allows, one-way valves (not shown) may be used to prevent the return of the liquid electrolyte 37 back to the liquid electrolyte storage unit 32. Such fluid one-way valves are well known in the art.

As indicated previously, the burning of the provided pyrotechnic material 21 serves the following purposes. Firstly, it is used for battery activation, i.e., to release the stored liquid battery electrolyte 37 into the battery cell 42. Secondly, it generates heat, which is used to heat the liquid electrolyte 37 to allow the battery to function at very low temperatures and at the same time enhance its penetration rate into the battery cell 42 as well as its rate of diffusion. Thirdly, the pressure generated by the initiation of the pyrotechnic material 39 is used to inject the liquid electrolyte 37 into the battery cell 42 under pressure. Fourthly, as it is shown in the next embodiment of the present invention, the pressure generated by the initiation of the pyrotechnic material 39 can also be used to generate vacuum to assist outflow of gasses occupying the voids inside the battery cell 42 between the electrodes that are to be filled with the liquid electrolyte 18, thereby minimizing resistance to the inflow of the liquid electrolyte 37 into the battery cell 42.

It will be appreciated by those skilled in the art that the rise time of the present pyrotechnic activated liquid reserve battery embodiments 10 and 30 of FIGS. 1 and 2, respectively, is dependent on the length of the path of travel of the liquid electrolyte inside the battery cell. In the embodiment 30 of FIG. 2, the electrodes in the battery cell 42 are considered to be positioned and spaced essentially in the vertical direction, thereby resulting in the void spaces to be filled with the liquid electrolytes to be essentially directed in the vertical direction. As a result, the maximum length of the path that the liquid electrolyte 37 that is injected into the battery cell 42 has to travel becomes essentially the height 44 of the battery cell compartment 31. This is the case since a considerable number of collapsible liquid electrolyte storage units 32 are considered to be distributed over the entire surface of the dividing plate 34. As a result, the pressurized and heated liquid electrolyte 37 has to travel a very short distance 44 to fill the cavities between the battery cell 42 electrodes, thereby the liquid reserve battery 30 can be activated very rapidly.

It is thereby shown that for the same volume of the battery cell, i.e., essentially for the same amount of stored electrochemical energy in a liquid reserve battery, by reducing the depth of the battery cell while increasing its electrolyte facing surface area, as described above and shown in the embodiment of FIG. 2, the rise time of the liquid reserve battery is significantly decreased. In the embodiment 30, by distributing many collapsible liquid electrolyte storage units 32 over the dividing plate 34, the liquid electrolyte flooded surface area of the battery cell 42 is increased while the depth of the (44 in FIG. 2) of the battery cell 42, i.e., the distance that the liquid electrolyte inflow has to travel, is decreased. In addition, the total surface area of the collapsible liquid electrolyte storage units 32 is also increased, thereby allowing more heat to be transferred to the liquid electrolyte 37 following pyrotechnic material initiation and while being injected into the battery cell 42 cavities. Thus, the heated liquid electrolyte is injected into the battery cell 42 over a significantly larger area and has to travel significantly shorter paths to engulf the battery cell electrodes. As a result, the activation or rise time of the reserve battery is significantly reduced.

Figure 3:
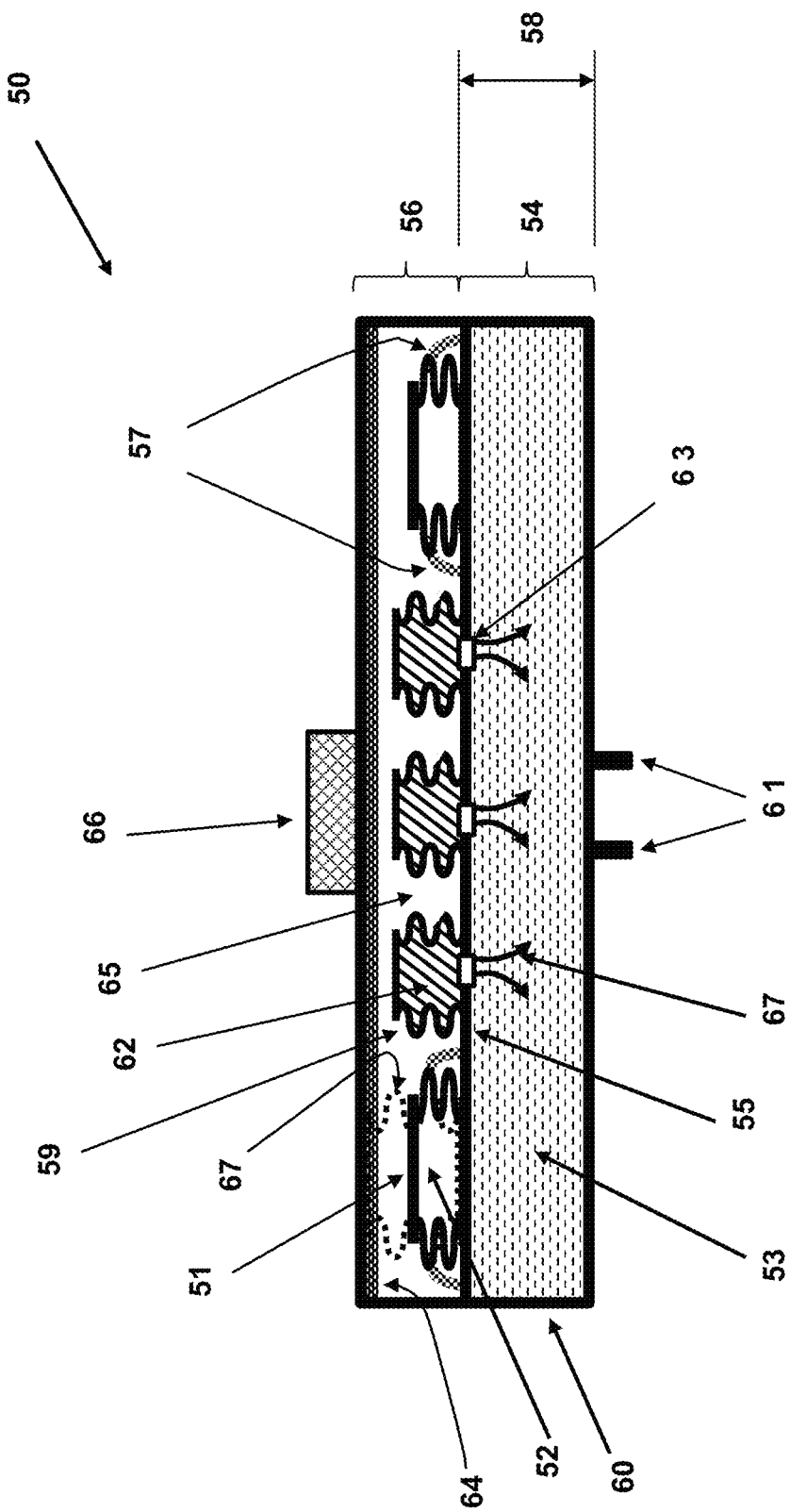
FIG. 3 illustrates a sectional schematic of a second variation of the pyrotechnic activated liquid reserve battery of FIG. 1.

The second modification to the embodiment 10 of FIG. 1 is illustrated schematically in the cross-sectional view of FIG. 3 and is indicated as the embodiment 50. It is noted that in the embodiments of FIGS. 1 and 2, the gasses filling up the battery cell cavities would provide certain amount of resistance to the inflow of the injected liquid electrolyte. This resistance can be minimized by providing certain level of relative vacuum (suction) ahead of the path of the liquid electrolyte exit. In the embodiment 50, the relative vacuum is generated by providing elastic and compressively preloaded (vacuum generating) elements such as bellow type elements 51 shown in the schematic of FIG. 3. The preloaded elements 51 (hereinafter referred to as "vacuum generating elements") are positioned in the liquid electrolyte and pyrotechnic material compartment 56. The preloaded vacuum generating elements 51 provide enclosed volumes 52 that are sealed with opening (not shown) only to the battery cell compartment 54 on the dividing member (plate) 55. The preloaded elements 51 can be fabricated with relatively heat resistant materials, such as stainless steel. The vacuum generating preloaded elements 51 may be bellow type or have any other appropriate shape such that that they could be preloaded elastically to significantly reduce their enclosing volume (52 in the elements 51) so that once they are released from their preloaded configuration; the enclosed volume is significantly increased. The preloaded elements 51 are held in their preloaded configuration shown in FIG. 3 by pyrotechnic material releasing elements 57 such as burnable fibers. Such elements 57 may also be covered with a pyrotechnic material.

The embodiment 50 of FIG. 3 is otherwise similar to the embodiment 30 of FIG. 2 and also operated similarly. The battery cell compartment 54 is relatively shallow, i.e., the depth of the battery cell compartment 58 is relatively small, thereby making the surface area of the battery cell electrodes 53 relatively large for a given volume of battery cell compartment 54 and reducing the length of the path that the injected liquid electrolyte has to travel inside the voids within the battery cell electrodes 53 to engulf the electrodes. A number of relatively small collapsible liquid electrolyte storage units 59 are distributed over the plate 55 separating the liquid electrolyte and pyrotechnic material compartment 56 from the battery cell compartment 58.

The battery compartment 54 is still where the battery electrodes are spaced with gaps to accommodate the battery liquid electrolyte. The liquid reserve battery body 60, the dividing plate 55 and other structures of the battery can be made out of relatively non-corrosive metal such as stainless steel. The liquid reserve battery 50 terminals are indicated by the numeral 61. The terminals 61 of the liquid reserve battery 50 may be located at any convenient location, such as being positioned on a surface of the battery cell compartment 54 to avoid running wires through the compartment 56.

In general, the body 60 and the compartments 54 and 56 of the liquid reserve battery 50 may have any convenient shape, preferably to match the available space in the munitions.

The collapsible storage units 59 can be relatively small but numerous, and can be uniformly distributed over the surface of the dividing plate 55. The collapsible storage units 59 must obviously contain enough liquid electrolytes 62 to flood the entire battery cell 53 cavities. Each collapsible storage unit 59 is provided with at least one outlet hole 63 in the dividing plated 55. The outlet holes 63 are sealed by relatively thin, such as metallic, diaphragms similar to the embodiment 10 of FIG. 1 (not shown in FIG. 3). Pyrotechnic materials 64, such as in a layer configuration as shown in the schematic of FIG. 3 are provided in the sealed volume 65 between the collapsible liquid electrolyte storage units 59 and the vacuum generating preloaded elements 51 and the compartment 54 walls. The liquid reserve battery 50 is also similarly provided with an initiation device 66 for igniting the pyrotechnic materials 64. The initiation device 66 is either of inertial, electrical, or other available types appropriate for the application at hand.

The liquid reserve battery 50 is activated by the initiation device 66 igniting the pyrotechnic materials 64. The burning pyrotechnic material 64 generates heat, which heats the stored liquid electrolyte 62 in all the collapsible storage units 59. The burning pyrotechnic material 64 also generates pressure within the sealed volume 65 by heating the enclosed gasses as well as by generating new gasses. The generated pressure would then act over the surfaces of all the collapsible liquid electrolyte storage units 59, forcing them to collapse, thereby forcing the pressurized and heated liquid electrolytes 62 to rupture the diaphragms separating them from the battery cell 53 and rapidly inject the heated liquid electrolytes 62 into the cavities between the battery cell 53 electrodes as shown by the arrows 67.

However, upon ignition of the battery pyrotechnic materials 64, the releasing elements 57 are released, such as by being burned, thereby releasing the preloaded vacuum generating elements 51. The preloaded vacuum generating elements 51 would then expand (shown with dotted line and indicated by the numeral 67 in FIG. 3) and generate a relative vacuum within their enclosed spaces 52, which are connected to the battery cell gas exit passage openings in the dividing plate 55 (not shown but similar to the openings 63—with or without rupturing thin diaphragms), thereby allowing the gasses within the battery cell 53 cavities that are being filled with the injected liquid electrolytes 62 to be sucked out into the expanding vacuum generating elements 51. The generated vacuum will then assist the inflow of the liquid electrolyte into the battery cell cavities. As a result, the reserve battery activation or rise time is further reduced.

The liquid reserve battery 50 is thereby activated very rapidly without the need for wicks or munitions spin or other additional means. In addition, the heating of the liquid electrolyte 62 (even if it is turned solid due to extreme cold temperatures) would allow activation of the liquid reserve battery 50 at very cold temperatures and ensures its high performance. The heating of the liquid electrolyte 62 would also enhance its diffusion rate inside the battery cell 53.

In the embodiment 50 shown schematically in FIG. 3, the releasing elements 57 are "fibers" that are brought into tension to keep the vacuum generating elements 51 in their preloaded state shown in FIG. 3. The initiation of the pyrotechnic materials 64 will then cause the elements 57 to burn, thereby releasing the preloaded vacuum generating elements 51.

The collapsible liquid electrolyte storage units 59 can be configured with a relatively large surface area to allow for rapid transfer of heat to the liquid electrolytes 62. The liquid electrolyte storage units 59 can also be configured to deform plastically under the generated pressure so that once the pressure has subsided, a minimal amount of the liquid electrolyte 62 is returned back to the storage units 59. Alternatively, particularly when the size of the battery allows, one-way valves (not shown) may be used to prevent the return of the liquid electrolyte 62 back to the liquid electrolyte storage unit 59. Such fluid one-way valves are well known in the art.

As indicated previously, in the embodiment 50 shown in the schematic of FIG. 3, the burning of the provided pyrotechnic material 64 will serve the following purposes. Firstly, it is used for battery activation, i.e., to release the stored liquid battery electrolyte 62 into the battery cell 53. Secondly, it generates heat, which is used to heat the liquid electrolyte 62 to allow the battery to function at very low temperatures and at the same time enhance its penetration rate into the battery cell 53 as well as its rate of diffusion. Thirdly, the pressure generated by the initiation of the pyrotechnic material 64 is used to inject the liquid electrolyte 62 into the battery cell 53 under pressure. Fourthly, the pressure generated by the initiation of the pyrotechnic material 64 is used to generate vacuum in the vacuum generating elements 51 to assist outflow of gasses occupying the voids inside the battery cell 53 between the electrodes that are to be filled with the liquid electrolyte 62, thereby minimizing resistance to the inflow of the liquid electrolyte 62 into the battery cell 53.

It will be appreciated by those skilled in the art that similar to the embodiments 10 and 30 of FIGS. 1 and 2, respectively, the rise time of these liquid reserve batteries is dependent on the length of the path of travel of the liquid electrolyte inside the battery cell. In the embodiment 50 of FIG. 3, the electrodes in the battery cell 53 are also considered to be positioned and spaced essentially in the vertical direction, thereby resulting in the void spaces to be filled with the liquid electrolytes to be essentially directed in the vertical direction. As a result, the maximum length of the path that the liquid electrolyte 62 that is injected into the battery cell 53 has to travel becomes essentially the height 58 of the battery cell compartment 54. This is the case since a considerable number of collapsible liquid electrolyte storage units 59 are considered to be distributed over the entire surface of the dividing plate 55. As a result, the pressurized and heated liquid electrolyte 62 has to travel a very short distance 58 to fill the cavities between the battery cell 53 electrodes while being assisted by the vacuum (suction) generated by the released vacuum generating elements 51, thereby the liquid reserve battery 50 can be activated even faster, i.e., have a faster rise time, than a similar embodiment 30 of FIG. 2.

In the embodiment 50, the releasing elements 57 of the vacuum generating elements 51 were indicated to be "fibers" that are brought into tension to keep the vacuum generating elements 51 in their preloaded state shown in FIG. 3. The initiation of the pyrotechnic materials 64 will then cause the elements 57 to burn, thereby releasing the preloaded vacuum generating elements 51. It will be, however, appreciated by those skilled in the art that numerous other methods and designs also exists that use heat to release a mechanism, for example shape memory alloys or bimetal based mechanisms, etc., and that any one of these methods may be used in the construction of the disclosed embodiment of the present invention. Furthermore, other means may be used to release the vacuum generated elements that do not utilize heat, such as mechanisms that activate upon a firing acceleration of the munition.

Figure 4:
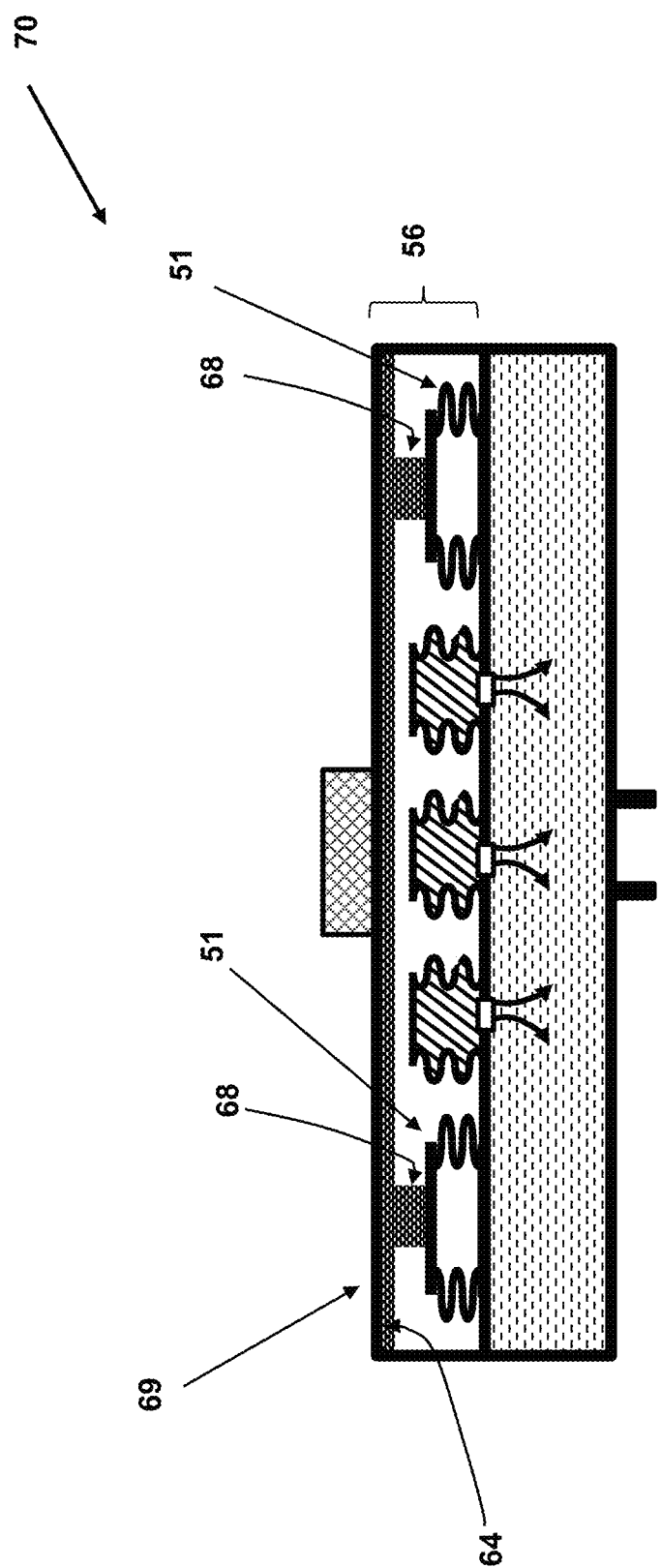
FIG. 4 illustrates a sectional schematic of a variation of the pyrotechnic activated liquid reserve battery of FIG. 3.

The vacuum generating elements 51 are released in the shortest possible time by using the pyrotechnic material itself to keep the vacuum generating elements 51 in its preloaded configuration. An example of such an embodiment 70 is shown in the schematic of FIG. 4. In the schematic of FIG. 4, all elements of the liquid reserve battery are the same as the embodiment 50 of FIG. 3, except for the vacuum generating elements 51 releasing elements 57, which are replaced by the pyrotechnic material "block" 68, which is positioned between the top surface of the vacuum generating elements 51 and the top surface 69 of the liquid electrolyte compartment 56. The pyrotechnic material used in the construction of the pyrotechnic block 68 must be strong enough to withstand the preloading force and may be constructed with adequate type and amount of binding agents and/or be provided with reinforcing fibers which are preferably easy to burn such as cotton fibers.

It will be appreciated by those skilled in the art that in all the above disclosed embodiments, the burning pyrotechnic materials will not only heat the liquid electrolyte before it is injected into the battery cell, but it would also transfer heat to the battery cell compartment afterwards. As a result, the activated liquid reserve battery is kept warm in a cold environment and can operate properly longer in environments with temperatures that are below the temperatures at which it can operate efficiently or is close or below its deactivation temperatures.

In certain applications, the liquid reserve battery is required to operate for a significant amount of time in temperatures that are below the effective operational temperature of the liquid reserve batteries, usually below 25 degrees F. In such cases, even though in the above embodiments illustrated schematically in FIGS. 1-4 the pyrotechnic materials initially heats the battery electrolyte before injecting it into the battery cell to activate the battery, in a very cold environment, the battery and its liquid electrolyte will cool down over time and eventually become deactivated when the liquid electrolyte temperature drops below the deactivation temperature or is at temperatures that are too cold for the liquid reserve battery to operate efficiently, i.e., at fill or required power. In such cases, one or more of the following modifications can be made to the design of each one of the above embodiments.

Figure 5:
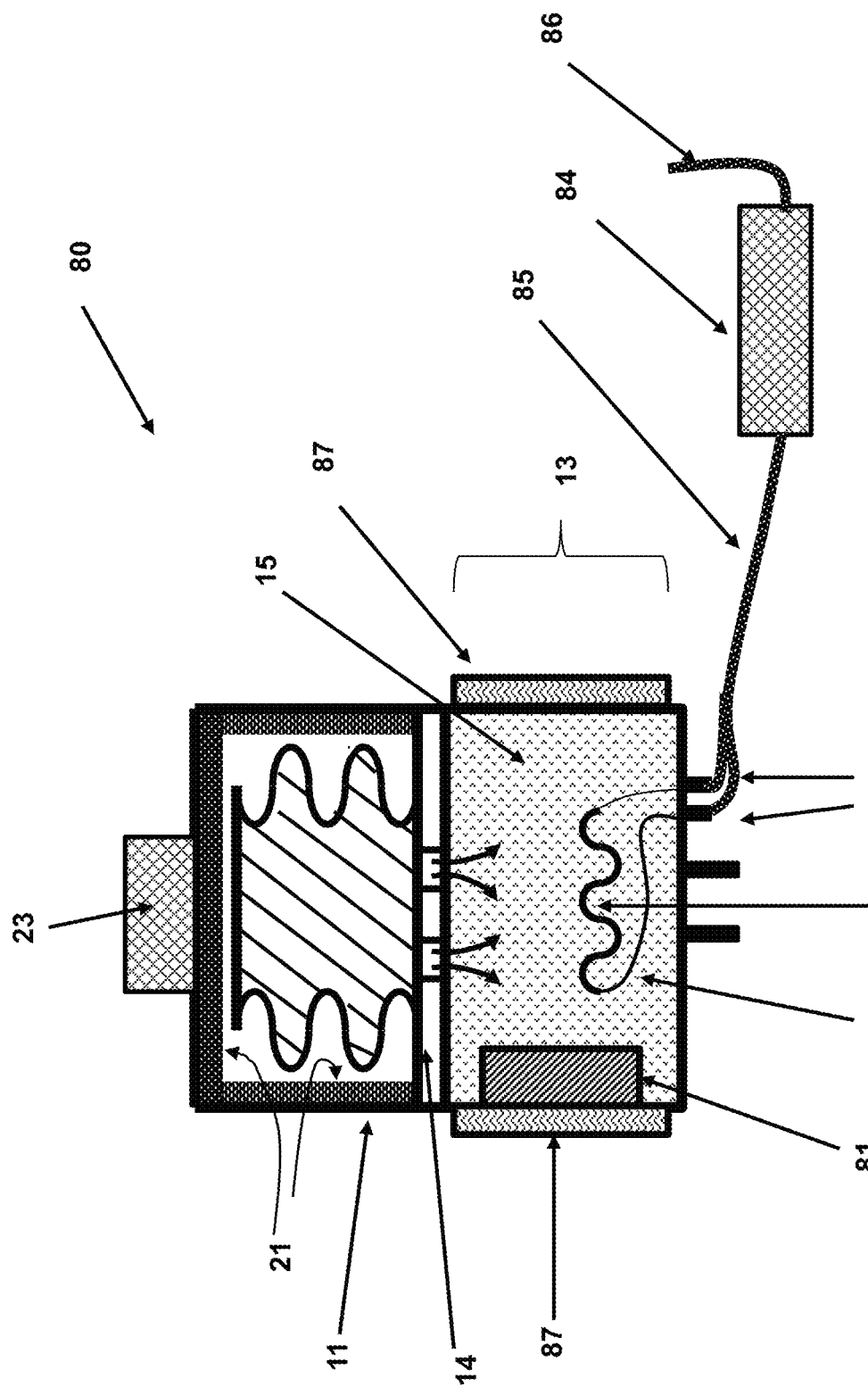
FIG. 5 illustrates sectional schematic of a third variation of the pyrotechnic activated liquid reserve battery of FIG. 1.

The embodiment 80 shown schematically in the cross-section view of FIG. 5 embodies three such run-time extending modifications to the embodiment 10 of FIG. 1. These three modifications may be used alone or as a combination to provide an optimal liquid reserve battery run time performance depending on the mission requirements. It will also be appreciated by those skilled in the art that one or more of these modifications may also be made to the embodiments 30, 50 and 70 of FIGS. 2-4, respectively. In the schematic of FIG. 5, all elements of the embodiment 80 are the same as those shown in the schematic of the embodiment 10 in FIG. 1 and are identically enumerated, except the elements added to achieve the run-time extending modifications as described below.

In the first of the modifications shown in the embodiment 80 of FIG. 5, a "heat storage" element 81 is provided that is heated by the heat generated by the pyrotechnic material 21 initiation during the liquid reserve battery activation. The heat storage element 81 is preferably made out of materials with high volumetric heat capacity that are either electrically non-conductive or are covered by a layer of electrically insulating material. The material must also be non-reactive to the liquid electrolyte. A good compromise may, for example, be ceramic. Then when the liquid reserve battery 80 is activated, the heat stored in the heat storage element 81 would keep the battery cell 15 and its liquid electrolyte above the operational temperature of the battery longer than it would without the heat storage element 81. As a result, the run-time of the liquid reserve battery is increased.

It is appreciated by those familiar with the art that the heat storage element 81 may be positioned anywhere within the battery cell 15 and even in the electrolyte compartment, including at or close to its wall surfaces of the battery cell 15. In one configuration, the separating plate 14 is used to serve for this purpose, particularly for the embodiments such as 30, 50 and 70 of FIGS. 2-4 that have relatively large such surface plates and battery cell 15 depths. The separating plate 14 can be constructed with materials with high volumetric heat capacity and appropriate amount of volume (mass). The use of the separating plate 14 as the heat storage element 81 has the advantage that it is close to the heat source and occupies minimal or no additional battery volume, thereby leads to the construction of volumetrically more efficient liquid reserve batteries. In such applications, the surfaces of the separating plate 14 facing the pyrotechnic materials is preferably increased by making it rough or by providing ridges or fins to increase its surface area, thereby allowing the separating plate 14 to absorb and store more heat.

In the second of the aforementioned modifications shown in embodiment 80 of FIG. 5, at least one electrical heating coil element 82 is provided. The terminals of the heating coil element 82 are indicated with numerals 83 and connected to a power control system 84 by wires 85 such that when the voltage and/or current and/or power provided by the battery 80 drops below a predetermined amount (such as the performance level of the battery), electrical power (from the battery 80 or other power sources) is diverted to the coil 82 (the input power line to the power control system 84 is shown by the numeral 86) to heat the battery cell 15 and its liquid electrolyte. Alternatively and particularly for relatively larger liquid reserve batteries, a temperature sensor (not shown) may be used to determine when to power the coil element 82 and how much power to provide to the coil. Furthermore, such as for irregular shaped batteries 80, several sensors/heaters may be employed in the battery cell 15 to ensure that all portions of the same are operating efficiently.

In the third of the aforementioned modifications shown in embodiment 80 of FIG. 5, at least one pyrotechnic material filled container 87 is provided and can be positioned around the outer surface of the battery cell compartment 13 of the liquid reserve battery. Then when the voltage and/or current and/or power provided by the battery 80 drops below the predetermined amount, such as a performance level of the battery, the pyrotechnic material inside at least one of the containers 87 is igniter (preferably by an electrical igniters—not shown) to heat the battery cell 15 and its liquid electrolyte. Alternatively and particularly for relatively larger liquid reserve batteries, a temperature sensor (not shown) may be used to determine when the at least one pyrotechnic materials filled container 87 must be ignited.

In many applications, the liquid reserve battery is required to provide full or close to full power a very short time after initiation. This capability is particularly challenging when the reserve battery is at very low temperatures such as the aforementioned −65 degrees F. For this reason, the electrolyte must be at relatively high temperature before it is injected into the battery cell since it is also required to provide the required amount of heat to rapidly heat the cell elements while staying warm enough to ensure proper operation of the reserve power source. The following embodiments are modifications of the embodiment 10 of FIG. 1 to provide such a capability to liquid reserve batteries. As will be shown, the provided capabilities allows liquid reserve power sources to provide full power in a relatively short time following initiation as well as to keep the reserve power source fully active longer even in a very cold environment.

Figure 6:
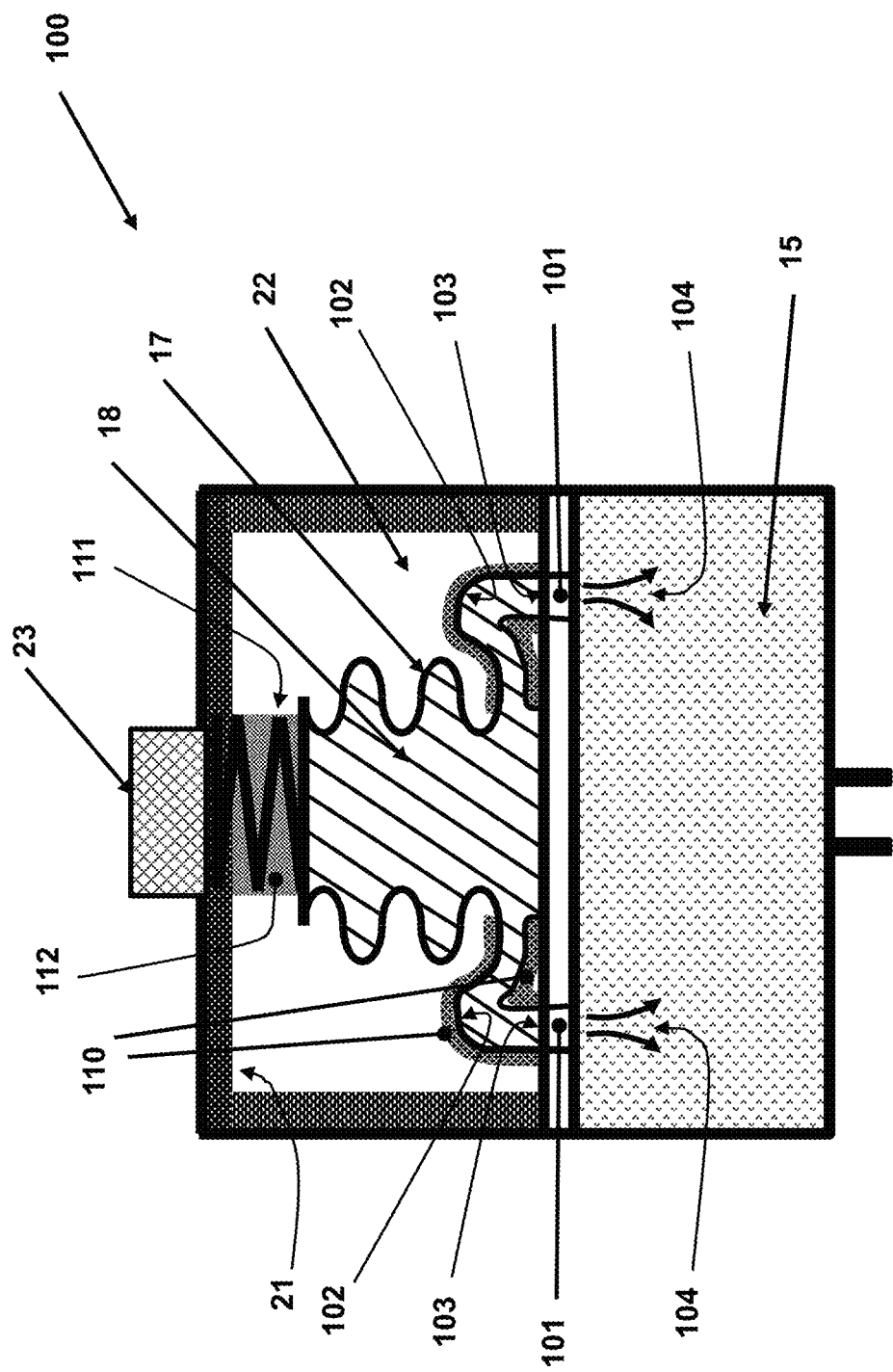
FIG. 6 illustrates a sectional schematic of a fourth variation of the pyrotechnic activated liquid reserve battery of FIG. 1 with electrolyte liquid heated in a heat-exchanger element prior to injection into the battery cell.

The embodiment 100 shown schematically in the cross-section view of FIG. 6 embodies one such fast activation and run-time extending modification to the embodiment 10 of FIG. 1. It will be appreciated by those skilled in the art that one or more of these modifications may also be made to the embodiments 30, 50 and 70 of FIGS. 2-4, respectively. In the schematic of FIG. 6, all elements of the embodiment 100 are the same as those shown in the schematic of the embodiment 10 in FIG. 1 and are considered to be identically enumerated, except the elements added or modified which are enumerated accordingly in FIG. 6 and as described below.

In the first of the modification shown in the embodiment 100 of FIG. 6, the at least one outlet hole 19 (see FIG. 1) is eliminated, thereby preventing the electrolyte 18 stored in the liquid electrolyte storage unit 17 to be directly discharged into the battery cell 15 upon the battery initiation as was previously described. At least one alternative outlet holes (ports) 101 are then provided as shown in FIG. 6, to allow the electrolyte 18 stored in the liquid electrolyte storage unit 17 to be discharged via the "heat exchanger elements" 102.

The aforementioned "heat exchanger elements" 102 may be constructed using any number of well-known shapes and structures commonly used in the design and construction of heat exchangers. As is well known in the art, such heat exchangers are designed to efficiently transfer heat from the outside of the heat exchanger, in this case from the sealed volume 22 to the fluid (in this case the electrolyte 18) through the heat exchanger (in this case the heat exchanger 102) through a combination of conduction and convection processes. For this reason, the surface area of the heat exchanger is desired to be as large as possible to maximize the heat transfer rate. The outside surfaces of the heat exchanger may also be provided, at least partially with fins elements.

In the present liquid reserve battery embodiment of FIG. 6, this goal can be accomplished by providing the heat exchanger element 102 with relatively large surface areas. This can be done in numerous ways, two examples of which are provided here without intending to limit the options to the indicated designs.

In the first example, the at least one heat exchanger element 102 is essentially a relatively long tube which is attached to a lower side of the liquid electrolyte storage unit 17 as shown in the schematic of FIG. 6. Then, when the reserve battery 100 is initiated and its internal pyrotechnic materials 21 are ignited to generate pressure inside the sealed volume 22 as well and heat the liquid electrolyte storage unit 17, thereby heating the liquid electrolyte 18, the surfaces of the at least one heat exchanger element 102 are also heated, thereby further heating the fluid electrolyte 18 inside the at least one heat exchanger element 102 as well as further heating the fluid electrolyte 18 as it passes through the at least at one heat exchanger element 102. It is noted that as was previously described for the embodiment 10 of FIG. 1, the pressure generated by the initiation of the initiation device 23 and the pyrotechnic material, some of which may be mostly of gas generating type, would act over the surface of the at least one collapsible liquid electrolyte storage unit 17, forcing it to collapse, thereby forcing the pressurized liquid electrolyte 18 to rupture the diaphragm(s) 103 separating it from the battery cell 15 and rapidly injecting the heated liquid electrolyte 18 into the cavities between the battery cell 15 electrodes as shown by the arrows 104. The liquid reserve battery 100 is thereby activated very rapidly without the need for wicks or munitions spin or other additional means. In addition, the heating of the liquid electrolyte 18 (even if it is turned solid due to extreme cold temperatures) would allow activation of the liquid reserve battery 100 at very cold temperatures and ensures its high performance. The heating of the liquid electrolyte 18 would also enhance its diffusion rate inside the battery cell 15. It will be appreciated by those skilled in the art that the relatively long heat exchanger tube(s) 102 may have any cross-sectional shape, including circular, oval, etc., but to provide larger surface area for a given cross-sectional area to increase the rate of heat transfer to the electrolyte fluid, a relatively flat oval shaped cross-sectional area can be used. Here, by flat, it is meant oval shapes in which the semi-major of the elliptical cross-section is significantly longer than its semi-minor axis. Such cross-sectional shapes are also readily manufactured. In addition, depending on the amount of heat to be transferred to the passing liquid electrolyte and the limitations on the length of the heat exchanger element due to space availability, the heat exchanger may be corrugated or provided with external fin rings (not shown) commonly used in tubular heat exchangers to increase the heat transfer rate to the passing liquid electrolyte.

Figure 7A:
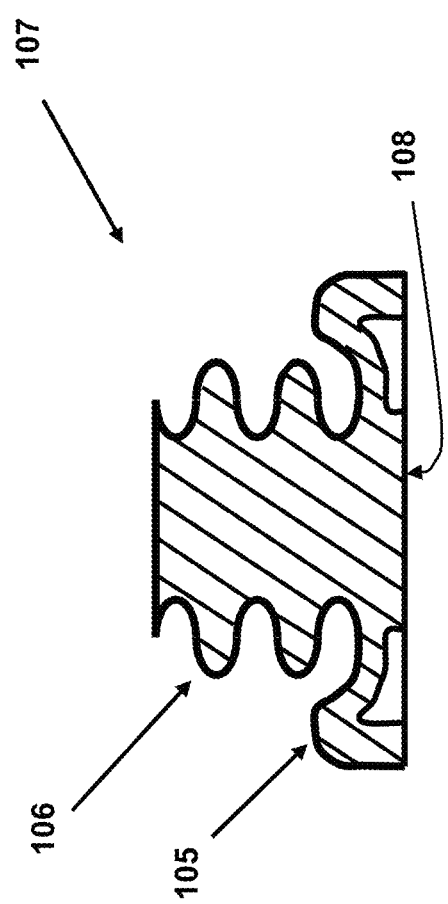
FIGS. 7A and 7B illustrate cross-sectional and base views, respectively, of an example of the design of the liquid electrolyte storage unit with its integral heat exchanger component of the liquid reserve battery embodiment of FIG. 6.
Figure 7B:
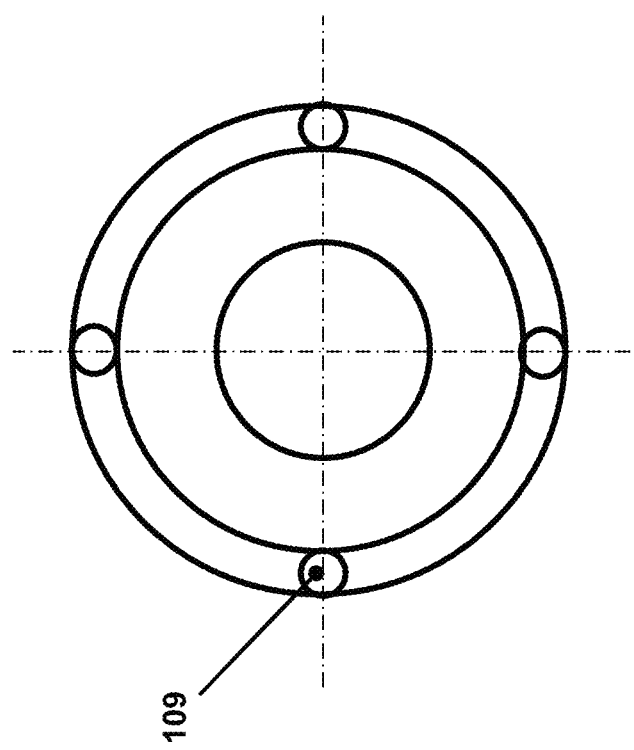

In the another example shown in the cross-sectional view and base view of FIGS. 7A and 7B, respectively, the heat exchanger element 105 can essentially be an integral part of the collapsible liquid electrolyte storage unit 106. The resulting heat exchanger integrated collapsible liquid electrolyte storage unit 107 can be made symmetric about the long axis of the unit as shown in the longitudinal cross-sectional view of FIG. 7A and the base view of FIG. 7B. The base plate 108 of the unit 107 is then provided with at least one port 109 (four such ports are shown in the view of FIG. 7B) to provide outlet holes (ports) similar into the battery cell (similar to ports 101 and 19 of FIGS. 7 and 1, respectively). One of the advantages of the embodiment 100 of FIG. 6 with the heat exchanger integrated collapsible liquid electrolyte storage unit 107 of FIGS. 7A and 7B is that it can be readily manufactured, particularly by seam welding of preformed layers as will be described later in this disclosure. In addition, it provides a relatively large heat exchanger surface area; the heat exchanger portion 105 of the integrated unit 107 can be designed to be partially collapsible, thereby assisting in the process of injecting the heated liquid electrolyte 18 into the battery cell 15; can provide multiple and properly distributed outlet holes (ports) to ensure a uniform and rapid distribution of the injected liquid electrolyte within the battery cell, thereby accelerating the process of battery activation.

It will be appreciated by those skilled in the art that, when in the embodiment 100 of FIG. 6, the heat exchanger integrated collapsible liquid electrolyte storage unit 107 of FIG. 7A is used, then the relatively rigid plate 14 separating the compartments 12 and 13 of the battery (see the embodiment of FIG. 1) may be an integral part of the unit 107, i.e., form the base 108 of the heat exchanger integrated collapsible liquid electrolyte storage unit 107.

When it is desired to provide more heat to the liquid electrolyte 18 as it passes through the heat exchangers 102 or 105 of FIGS. 6 and 7A, respectively, the outer surfaces of the heat exchangers may be covered by additional heat generating pyrotechnic material 110 as shown in the schematic of FIG. 6.

In addition, the embodiment 100 of FIG. 6 may be provided with a compressively preloaded spring 111 between the collapsible liquid electrolyte storage unit 17, FIG. 1 (or the unit 106 of FIG. 7A) and the reserve battery body 11 as shown in the schematic of FIG. 6. To prevent the compressively preloaded spring 111 from applying pressure to the collapsible liquid electrolyte storage unit (17 or 106), readily combusting fabrics such as soft cotton fabrics and pyrotechnics materials 112, which can be provided with any one of the known organic binders used in pyrotechnic materials, can be used to firmly hold the spring 111 in its compressively preloaded condition. Then, upon initiation of the reserve battery (10 and 100 of FIGS. 1 and 6, respectively), the pyrotechnic material and holding fabric combination 112 are also ignited, thereby releasing the compressively preloaded spring 111. The compressively preloaded spring 111 will then further assist the pressurized compartment 12 to collapse the collapsible liquid electrolyte storage units to inject the heated electrolyte fluid 18 into the battery cell 15.

Figure 8B:
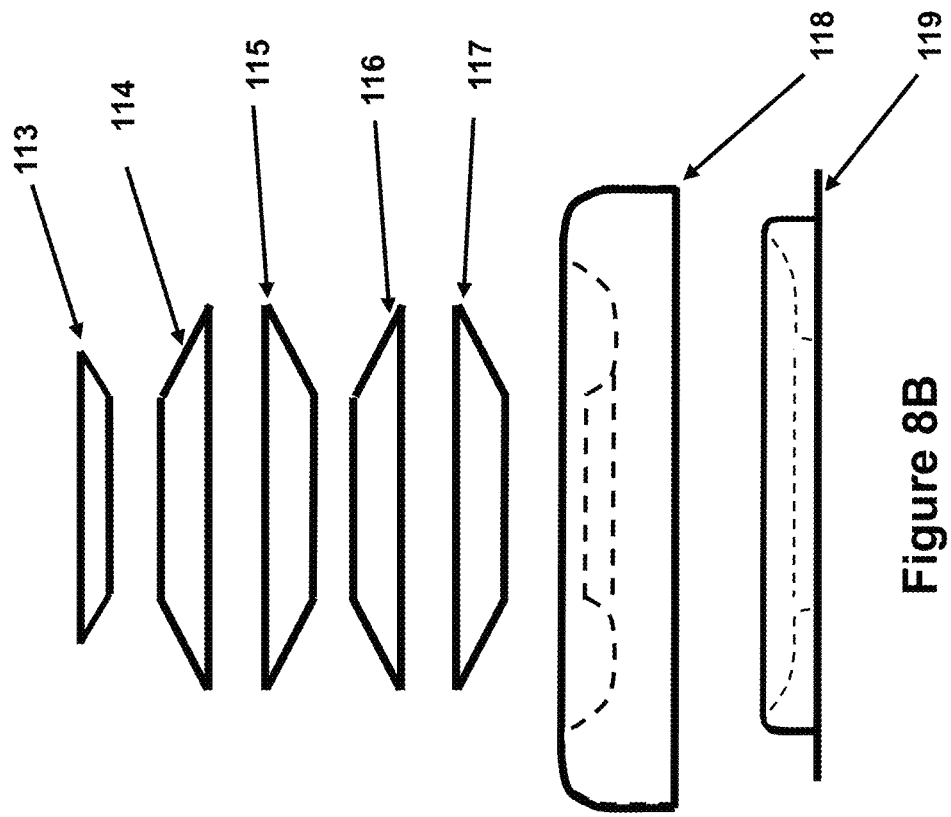
FIG. 8B illustrates the formed components used in the construction of the liquid electrolyte storage unit with integral heat exchanger of FIG. 8A.
Figure 8A:
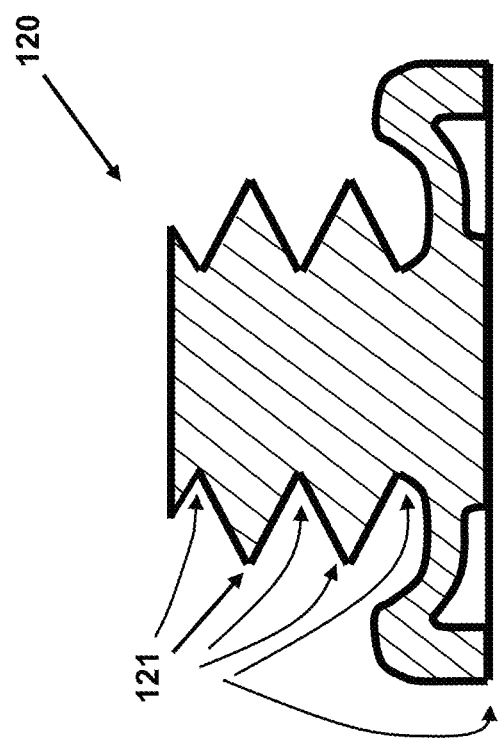
FIG. 8A illustrates the construction of a liquid electrolyte storage unit with integral heat exchanger constructed with formed and seam welded elements for low cost manufacture.

As was previously indicated, the heat exchanger integrated collapsible liquid electrolyte storage unit 107 of FIG. 7A (and similarly the collapsible liquid electrolyte storage unit 17 of FIG. 1) may be manufactured by seam welding of preformed layers (sections) at relatively low cost. The cross-sectional view of an example of a heat exchanger integrated collapsible liquid electrolyte storage unit of this type 120 which is constructed very similar in shape to the heat exchanger integrated collapsible liquid electrolyte storage unit 107 of FIG. 7A is shown in FIG. 8A. The aforementioned preformed sections 113, 114, 115, 116, 117, 118 and 119, which are seam welded to form the heat exchanger integrated collapsible liquid electrolyte storage unit 120 of FIG. 8A, are shown in FIG. 8B. The six seams 121 between the above seven preformed sections 113-119 to be welded are indicated in the schematic of FIG. 8A.

In addition, in certain applications, such as when the battery may be used at relatively high as well as very cold temperatures, and if the amount of heat generated by all pyrotechnic materials provided in the compartment 12 (including the pyrotechnic materials 110, FIG. 6, over the heat exchanger surfaces) for heating of the liquid electrolyte 18 may be excessive when the battery is activated at elevated temperatures, then a portion of the pyrotechnic material (which can include pyrotechnic material 110 covering the heat exchanger surfaces) can be covered by heat insulating material (such as a relatively thick layer of silica or carbide powder with any organic binder commonly used for such purposes as is well known in the art). In such configuration, a temperature sensor can be provided (not shown) inside or outside of the battery and used to initiate the ignition protected (heat insulation covered) pyrotechnic material via provided electrical initiation elements (such as the regularly used filaments) as is well known in the art.

It will also be appreciated by those skilled in the art that the at least one heat exchanger "tube" element 102 could be extended into the cell 15 compartment 13 (see FIG. 1) thereby providing heat to the cell 15 as well as injecting the liquid electrolyte 18 further into the core of the battery cell 15.

Figure 9:
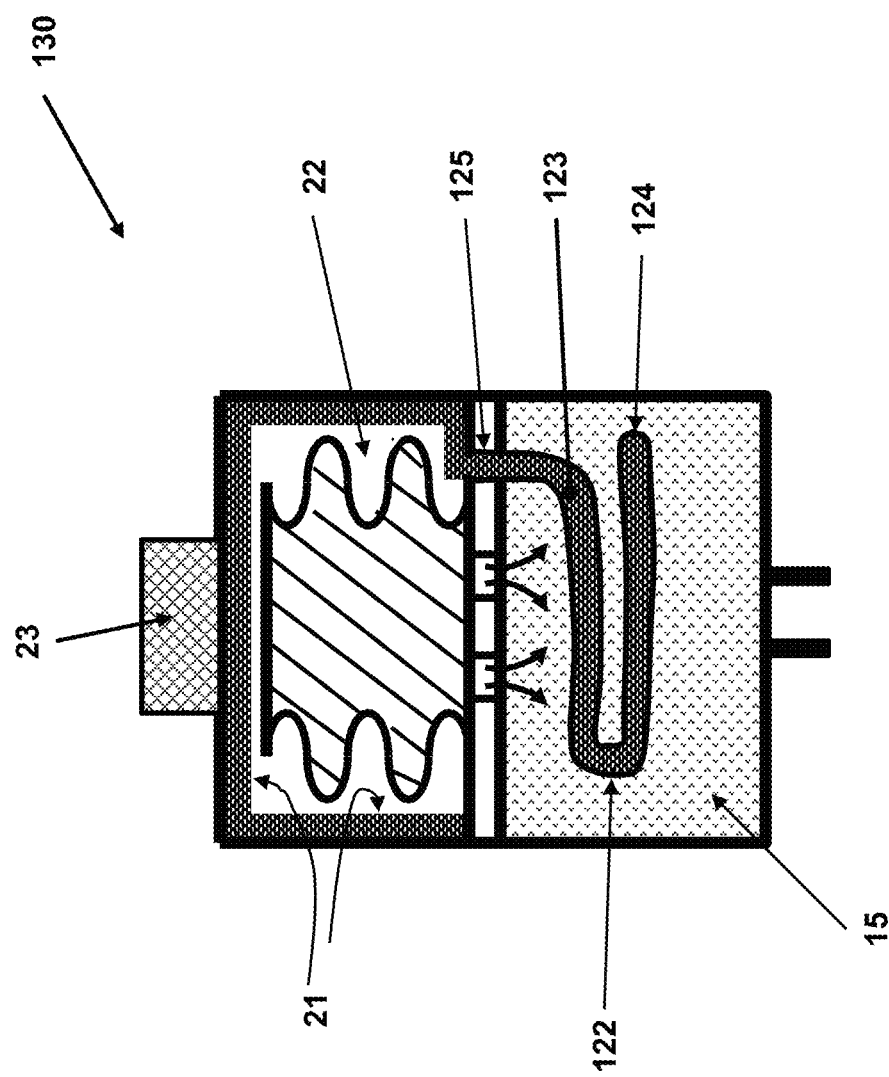
FIG. 9 illustrates a sectional schematic of a fifth variation of the pyrotechnic activated liquid reserve battery of FIG. 1 with battery cell heated internally by the burning of heat generating pyrotechnic materials.

It will further yet be appreciated by those skilled in the art that the battery cell 15 may be heated internally by heat generating pyrotechnic materials as can be seen in the embodiment 130 of the schematic of FIG. 9. The embodiment 130 shown schematically in the cross-section view of FIG. 9 illustrates a fifth modification to the embodiment 10 of FIG. 1. It will also be appreciated by those skilled in the art that one or more of these modifications may also be made to the embodiments 30, 50 and 70 of FIGS. 2-6, respectively. In the schematic of FIG. 6, all elements of the embodiment 100 are the same as those shown in the schematic of the embodiment 10 in FIG. 1 and are considered to be identically enumerated, except the elements added or modified which are enumerated accordingly in FIG. 9 and as described below.

In the embodiment 130 of FIG. 9, the liquid reserve battery is provided with at least one heat exchanger tube 122 similar to the heat exchanger elements 102 of the embodiment of FIG. 6, which is at least partially filled with heat generating pyrotechnic material 123. The pyrotechnic material 123 may be provided with its separate initiation (such as an electrical initiation) element (not shown), or can be ignited by the initiated pyrotechnic material 21 inside the compartment 12 of the battery (see FIG. 1) following the reserve battery initiation as was previously described for the embodiment 10 of FIG. 1. In such configuration, an end 124 of the heat exchanger tube 122 can be closed, while its other end 125 is open into the sealed volume 22 of the compartment 12 of the battery. Then, the pyrotechnic material 123 inside the heat exchanger tube 122 will be ignited by the initiated pyrotechnic material 21 following the battery initiation. Otherwise, the pyrotechnic material 123 may be initiated separately by its own initiation device as was previously indicated, such as via an input from the aforementioned temperature sensor(s) if extra heat is required for heating the battery core 15 for its proper operation.

It will be appreciated by those skilled in the art that the at least one heat exchanger tube 122 may be required to be made out of, or be covered by, electrically nonconductive material to ensure proper operation of the battery cell. In addition, the at least one heat exchanger tube 122 may have any appropriate cross-sectional area and can be small in cross-section and long enough and "wound around" the interior of the cell 15 to nearly uniformly heat the battery cell volume 15.

Current liquid reserve batteries commonly use glass ampules as a reservoir to store battery electrolyte prior to activation. Glass ampules are fragile for handling and in for use in gun-fired munitions. The glass ampule use in liquid reserve batteries for electrolyte storage has presented a wide range of manufacturing and safety problems. It is thereby highly desirable to replace glass ampules with relatively ductile metallic or the like containers for electrolyte storage in liquid reserve batteries. Such relatively ductile metallic electrolyte storage containers must, however, be readily "collapsible" and eject nearly all their electrolyte content into the battery core when subjected to the activation force/pressure. It is also highly desirable that the collapsed containers stay in their collapsed state once the activation force/pressure has ceased so that the ejected electrolyte could not return into the electrolyte storage container.

One type of metallic electrolyte storage container that has been used in liquid reserve batteries is the so-called bellow type structures such as the bellow 22 of FIG. 1. Bellows are generally designed to function as coupling between shafts or for connecting various components with a relatively flexible element that would allow for misalignment and slight axial or lateral displacement or rotations. They are also designed for injecting small amounts of fluids. In all such applications, they are designed to act as a spring, and always return to their original state once the indicated relatively small misalignments or displacements and/or lateral rotations are relieved.

Such bellows have several shortcomings for liquid reserve battery use for storage of their electrolyte. Firstly, due to their design, in which each layer (like layers 114-117 in FIG. 8B), act like Bellville washers, thereby exhibit relatively high resistance to deformation, making the bellows relatively stiff. As a result, they are made not to readily undergo plastic deformation, thereby requiring relatively large forces to fully collapse to their solid length. In addition, even after being collapsed to their solid length, once the applied compressive force has ceased, they would bounce back a certain amount.

In addition, after electrolyte ejection into the battery core, the force applied to compress the bellows to eject the stored electrolyte needs to be maintained since the bellow would otherwise rebound towards its pre-activation length, which could suck back a portion of the ejected electrolyte from the battery core. As a result, more space is occupied by the retaining spring or other mechanism, thereby causing the reserve battery to become larger than when glass ampules are used.

In addition, even at their solid length, a very large portion of the stored electrolyte would remain inside the collapsed bellow, sometime and depending on the design of the bellow, over 50% of the electrolyte cannot be ejected from the bellow. As a result, more space is occupied by the retaining spring or other mechanism, thereby causing the reserve battery to become larger than when glass ampules are used.

The electrolyte reservoir design and the method of designing such liquid storage containers are intended to address the above shortcomings of the glass ampules as well as bellows, such as the bellow 22 of FIG. 1. The developed method is described below by its application to the design of the electrolyte storage container embodiment 150 of FIG. 10.

Figure 10:
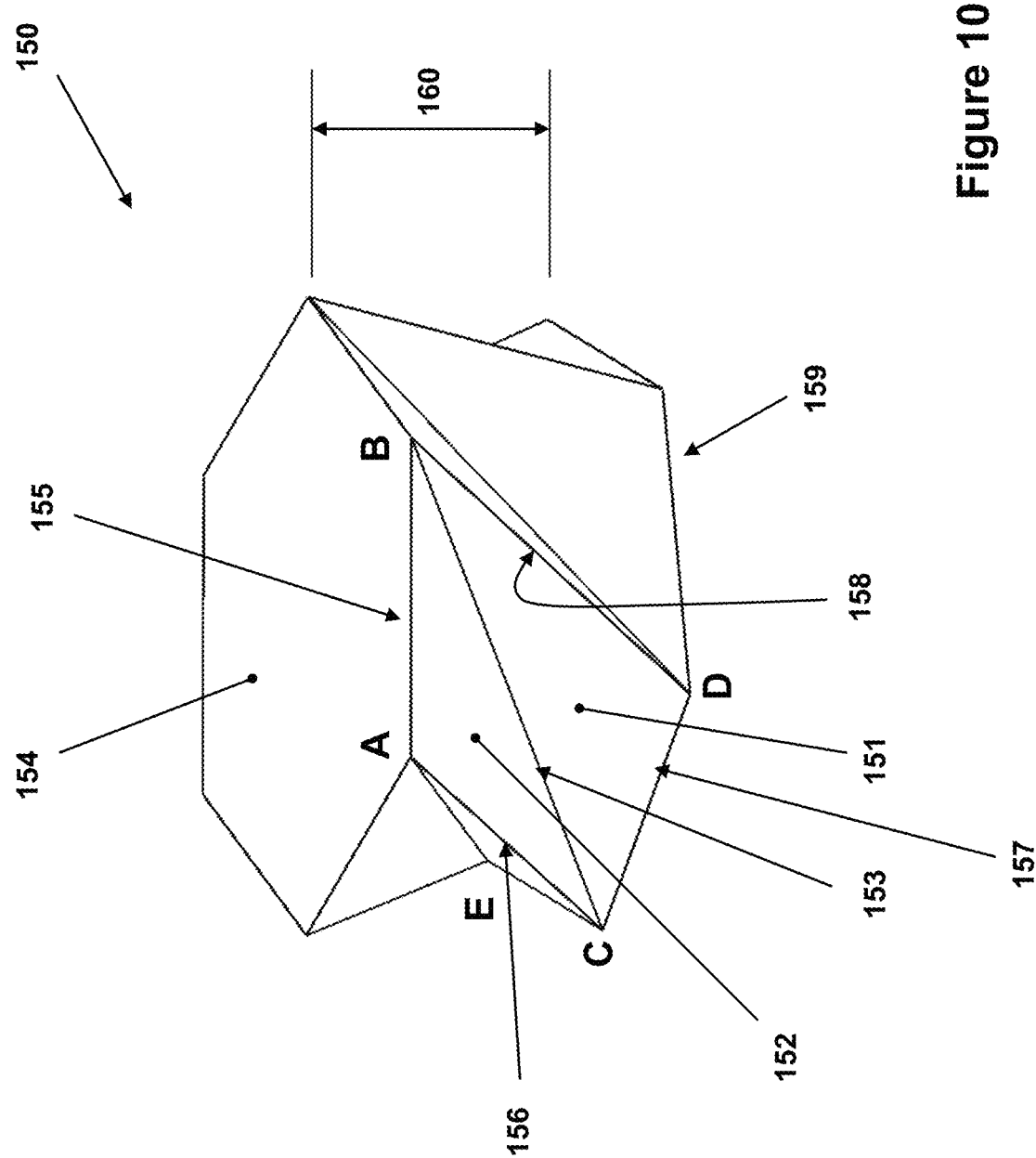
FIG. 10 illustrates the isometric view of the first electrolyte storage container unit embodiment.

FIG. 10 shows the isometric view of the embodiment 150 of the liquid electrolyte storage container designed based on the method that is being disclosed. In this method, the geometry of the electrolyte storage container is designed as follows. The top and bottom surfaces, 154 and 159, respectively, of the container are identical equal side polygons, which in the example of FIG. 10 is selected to be a hexagon, but in general may have any number of sides. The top and bottom surfaces 154 and 159, respectively, are parallel and are initially positioned at certain distance (height of the container) 160 and at this height, at an angle 161 relative angular orientation (about a line passing through the center of the polygon) as shown in the top view of FIG. 11.

Now consider two opposite edges (sides) 155 (from the top polygon 154, connecting the vertices A and B) to and 157 (from the bottom polygon 159, connecting the vertices C and D), FIG. 10. A triangular surface 152 is then formed with the edges AB, AC and CB and another triangular surface 151 from the edges BC, BD and CB, with the edge CB connecting the two triangular surfaces 152 and 151. Identical pairs of triangular surfaces are formed with the remaining five opposite polygon edges (sides) and connected to each other. For example, the edge 156 (the edge AC) to the triangular surface of the pair of triangular surfaces formed with the polygon edges to the left of the edge AB and the edge 158 (the edge BD) to the triangular surface of the pair of triangular surfaces formed with the polygon edges to the right of the edge AB. As a result, a totally enclosed volume is formed between the top and bottom polygons, 154 and 159, respectively.

It is appreciated that once a polygon size is selected for the top and bottom surfaces 154 and 159, respectively, two design parameters are available for the construction of the electrolyte storage container 150, FIG. 10. The two design parameters are the height 160 and angle 161, FIGS. 10 and 11, of the initial constructed geometrical shape of the container 150.

It is also appreciated that the equal side polygons 154 and 159, FIG. 10, may have any number of sides instead of being six sides (hexagon). A triangular shape is obviously the minimum but is usually not highly desirable for electrolyte storage in liquid reserve batteries due to the resulting relatively small storage volume. Higher number of polygon equal sides are generally desirable as the circumscribing diameter of the polygon is increased.

It is also appreciated that for a selected number of side polygon, by varying the above two design parameters, the total enclosed volume is varied. In addition, as is described later in this disclosure, certain other physical characteristics of the container that are of interest for different applications are also varied and may be used for their optimal design for each application.

The storage container 150 of FIG. 10 may then be used to store electrolyte in liquid reserve batteries in place of the bellows shown in the embodiments of FIGS. 1-9. In these applications, similar rupture diaphragm(s) 20, FIG. 1, are provided such that as the container is collapsed by the application of downward force/pressure to the top surface 154 (assuming that the exit diaphragm is on the bottom side 159), the diaphragm is ruptured by the liquid electrolyte pressure and with or without provided cutting members (as described later in this disclosure), allowing the electrolyte fluid to be pushed out of the storage container.

The electrolyte storage container 150 of FIG. 10 is generally constructed with soft stainless steel, aluminum, brass, or other appropriate thin metal sheets depending on the electrolyte chemistry and method of container fabrication and the top and bottom plate materials. The wall of the container consisting of six pairs of triangular surfaces 152 and 151 (for the case of the present hexagonal shaped top and bottom surfaces of the container) may be formed using various manufacturing technique. In a relatively low-cost method and since the wall material is desired to be relatively thin (on the order of 0.003-0.010 inch thick), the walls can be constructed from tubes of the same material thickness by forming using a retractable inner and outer forming molds. Such multi-piece retractable inner forming molds and methods of forming are well known in the art. The walls may also be formed using well known hydroforming or more expensive electroplating methods.

Figure 12A:
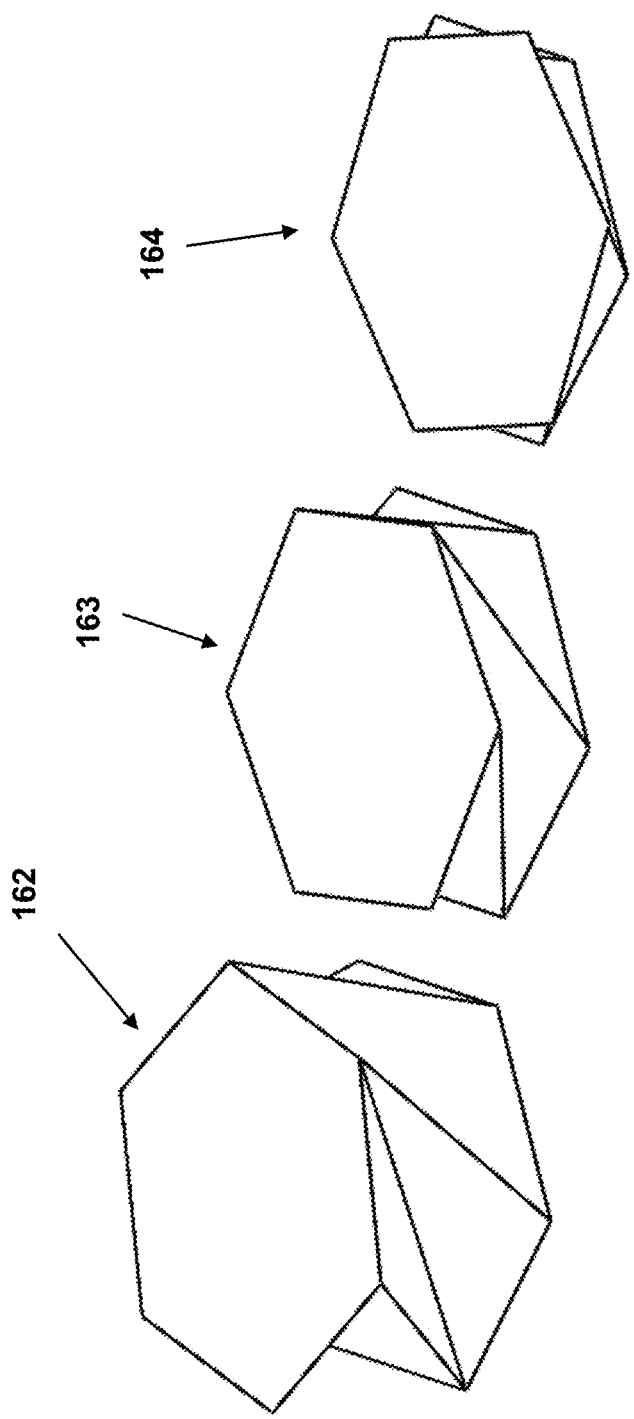
FIG. 12A illustrates the electrolyte storage container unit embodiment in its initial un-collapsed state, after being collapsed halfway and as fully collapsed.

Now by applying a force/pressure to the top surface 154 of the electrolyte storage container 150 of FIG. 10 while keeping the bottom surface 159 fixed and leaving the top surface 154 free to rotate relative to the bottom surface 159, then the top surface can be pushed down to reduce the height 160. As the height, thereby the internal volume of the container 150 is reduced, the electrolyte fluid contained in the container is ejected from the provided exit hole after the provided diaphragm has been ruptured. In FIG. 12A, the electrolyte storage container is shown in its initial state 162, after the application of force/pressure and partial reduction of its height 163 and after the container has been fully collapsed 164.

It is noted that as the top surface 154 of the electrolyte storage container 150 of FIG. 10 is displaced down towards its bottom surface 159 while leaving the top surface 154 free to rotate relative to the bottom surface 159, the container wall (constructed with what hereinafter will be called wall pairs of wall panels 152 and 151) will "collapse" as follows. The triangular panel BCD starts to rotate about the edge CD towards the bottom surface 159, while the triangular panel ABC begin to fold over the panel BCD while rotating about the edge AB towards the top surface 154. The same motions occur with all (six) pairs of panels 152 and 151 and each pair of panels also folds about their edges BD and AC to allow for continuous collapsing of their adjacent pairs of panels. The described relative rotations of the pairs of panels 152 and 151 are assisted by the thin material with which the walls are fabricated with and also since the downward displacement of the top surfaces induces bending moments that tend to affect all the above panel rotations relative to each other and relative to the top and bottom surfaces. As a result, the pairs of panels 152 and 151 undergo negligible distortion as the container is collapsed from its initial state 162 to its mid-collapsed state 163 and to its fully collapsed state 164 of FIG. 12A.

Figure 11:
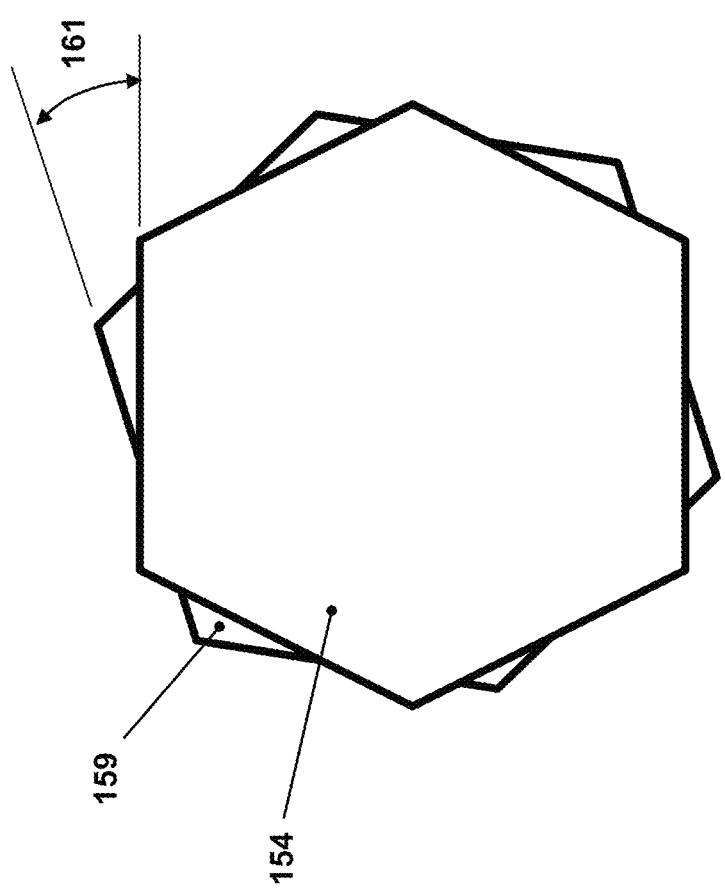
FIG. 11 illustrates the relative initial angular orientation of the top and bottom polygons used in the construction of the electrolyte storage container about a line passing through their centers.

It is also noted that with continued downward displacement of the top surface 154 towards the bottom surface 159, due to rotations of the AC and BD, the top surface 154 would also slightly rotate in the clockwise direction relative to the bottom surface as seen in the views of FIGS. 10 and 11.

It is also noted that once the container has fully collapsed, state 164 in FIG. 12A, the total height of the collapsed wall structure between the top and bottom surface members is approximately three times the thickness of the wall material, for example 0.009 inch to 0.030 inch for the aforementioned wall material thicknesses of 0.003 inch to 0.010 inch. Thereby, a minute amount of electrolyte material will be left in such electrolyte storage container geometries following their full collapse.

In addition, since the edges AC, BC, BD, AB and CD effectively act as living joints for relative rotation of the pairs of panels 152 and 150, which are folded by applied moments due to the applied force/pressure to the top surface 154 and since the thickness of the wall material is very low, therefore the required force/pressure that is required to fully collapse the electrolyte storage container 150, FIGS. 10 and 12A, is relatively low. The folding of the edges AC, BC, BD, AB and CD is achieved by large plastic deformation of the thin wall material along these edges, therefore once the applied force/pressure to collapse the container has ceased, the collapsed structure would undergo negligible rebound.

It is appreciated by those skilled in the art that when the material used for the construction of the storage container embodiment 150 of FIG. 10 is relatively thick, e.g., above 0.005 inch to 0.010 inch, and if the force to collapse the storage container is desired to be further reduced, the one or more of the edges AC, BC, BD, AB and CD may be machined to, e.g., 0.002 inch to 0.003 inch thickness to significantly reduce the moment required to fold the related wall panels.

Figure 12B:
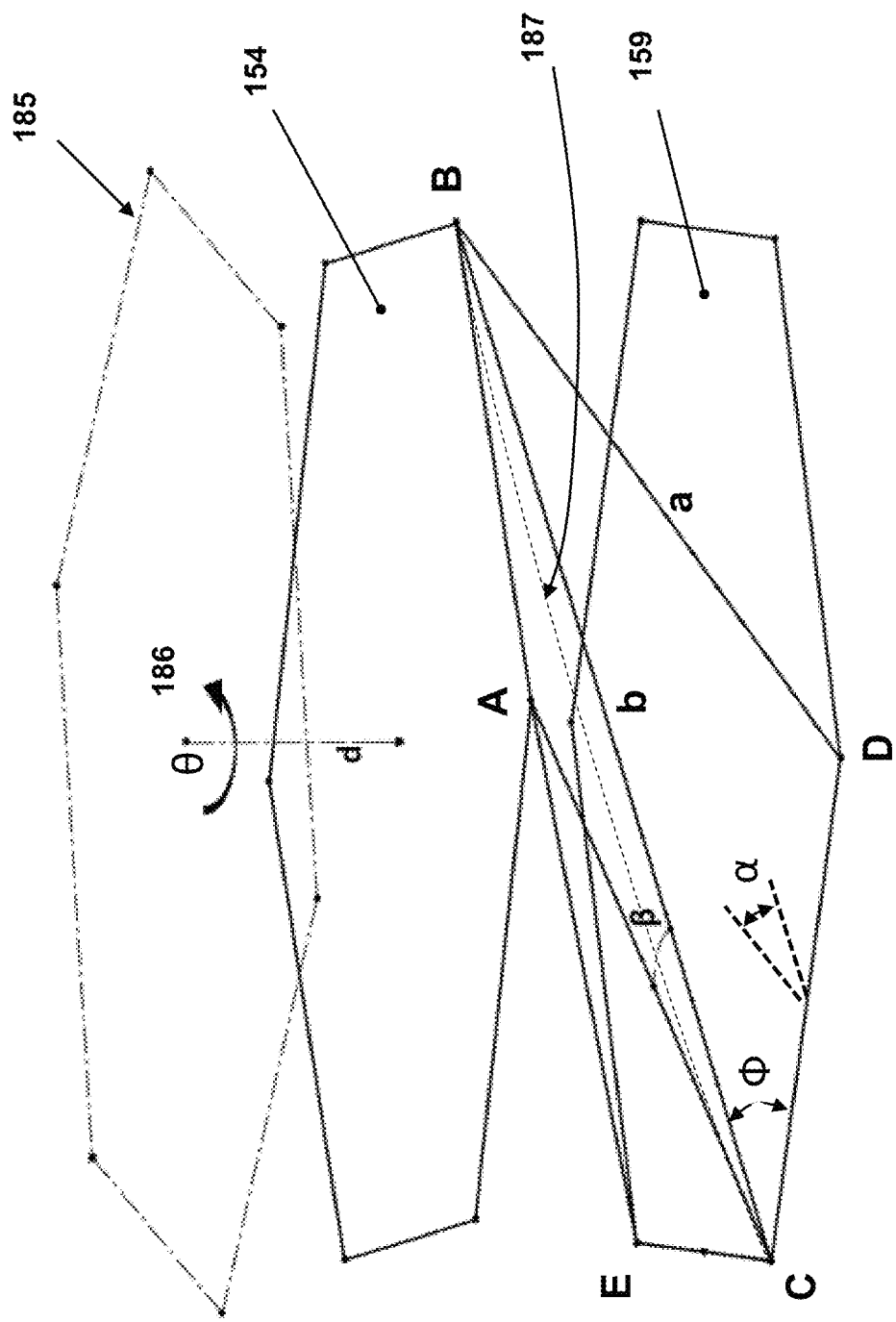
FIG. 12B illustrates the geometry of the storage container wall panels as it is forced to collapse.

FIG. 12B is now used to describe the changes in the geometry of the storage container embodiment 150 of FIG. 10 as the container is forced to collapse from its initial configuration 162, FIG. 12A to the partially collapsed configuration 163 and its fully collapsed configuration 164. In FIG. 12B only the triangular panels ABC, CBD and ACE are shown for clarity and the other container wall panels undergo the same motions as the container is collapsed. In FIG. 12B, the initial configuration of the storage container is indicated by the position of its top surface 185, which is shown with a dotdash line. The top surface 154 is then the position of the top surface 185 after it has been displaced down a distance d, noting that as the top surface is displaced downward, it also rotates in the direction of the arrow 186. In the present storage container design and due to the basic symmetry of the container geometry, the vertices of the top and bottom surface polygons 154 (185) and 159, respectively, would always stay on the cylindrical surface containing them as they were initially generated as previously described.

In FIG. 12B, the top surface 154 of the container is shown with solid lines after it has been displaced a distance d towards the bottom surface 159. In FIG. 12B, β is the angle between the line AC and BC of the triangle ABC; α is the angle between the surface of the triangle CBD and the bottom surface 159; and the angle θ indicates the rotation of the top surface 154 relative to the bottom surface 159.

As can be seen in FIG. 12B, as the top surface 154 moves down, the triangle CBD rotates towards the bottom surface 159, thereby reducing the angle α and since the corner B is to stay on a circular path (located on the cylinder within which the both top and bottom surface hexagons are located), the top surface 154 has to rotate in the direction of the arrow 186 certain angle θ to keep the corner B on the surface of the said cylinder. As a result, the corner A would also similarly follow on the surface of the said cylinder. As a result, the distance of the line BC is slightly varied and therefore the angles β and Φ would also slightly vary.

Figure 12C:
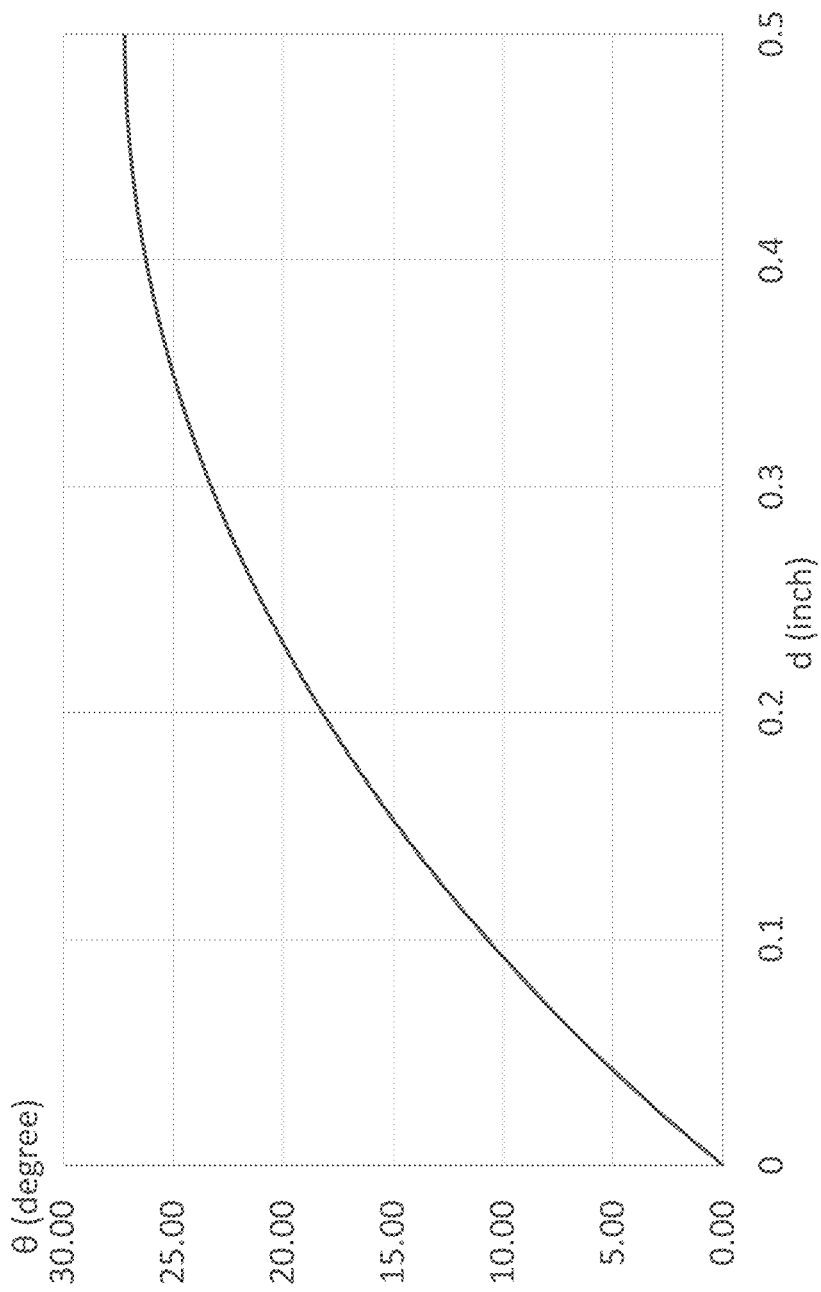
FIG. 12C illustrates the plot of storage container top surface rotation as the storage container is collapsed.

As an example, let the circumscribing circle of the hexagon surfaces 185 and 159 be 1.108 inch and the initial distance between the top surface 185 and bottom surface 159 be 0.5 inch, FIG. 12B. In their initial position, the top and bottom hexagons, 185 and 159, are oriented at a relative angle of $\theta_0$=46.4 degrees, FIG. 12B, in which configuration, the length of the side BD is a=0.664 inch. Now as the top surface 185 is forced to move towards the bottom surface 159, as was described above, the top surface 185 rotates in the direction of the arrow 186, FIG. 12B, as indicated by the angle θ. In FIG. 12C, the angle θ (considered to be zero at the initial position of the top surface, i.e., at the distance d=0) is plotted as a function of the distance d, FIG. 12B, that the top surface 185 is moved towards the bottom surface 159. As can be seen in FIG. 12C, the rate of top surface rotation with increased displacement towards the bottom surface, i.e., as the corresponding storage container is collapsed, is decreased.

Figure 12D:
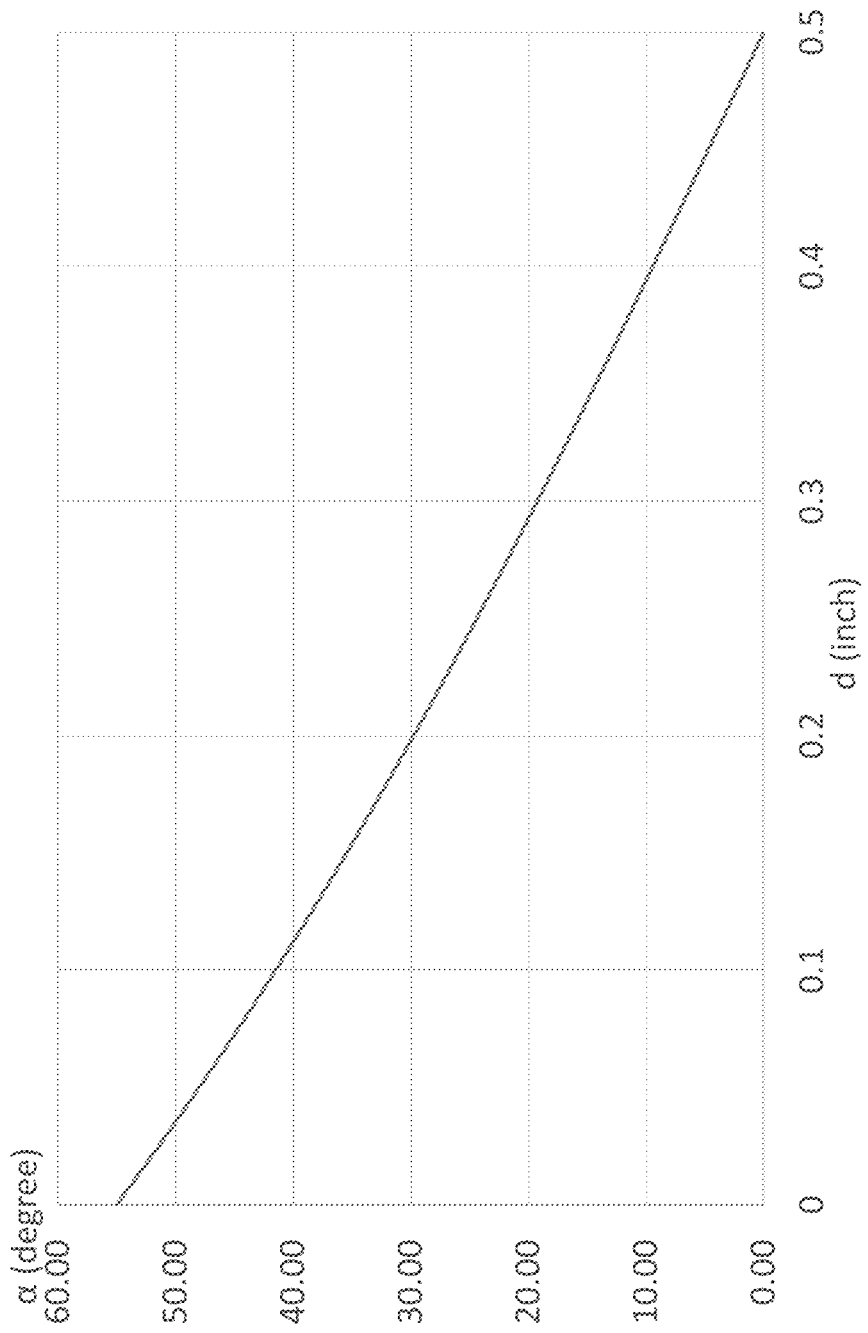
FIG. 12D illustrates the plot of the storage container side wall rotation as the storage container is collapsed.

FIG. 12D shows the plot of the changes in the angle α (the angle between the panel BCD and the bottom surface 159, FIG. 12B) as a function of the distance d, FIG. 12B, that the top surface 185 is moved towards the bottom surface 159, i.e., as the storage container is collapsed.

Figure 12E:
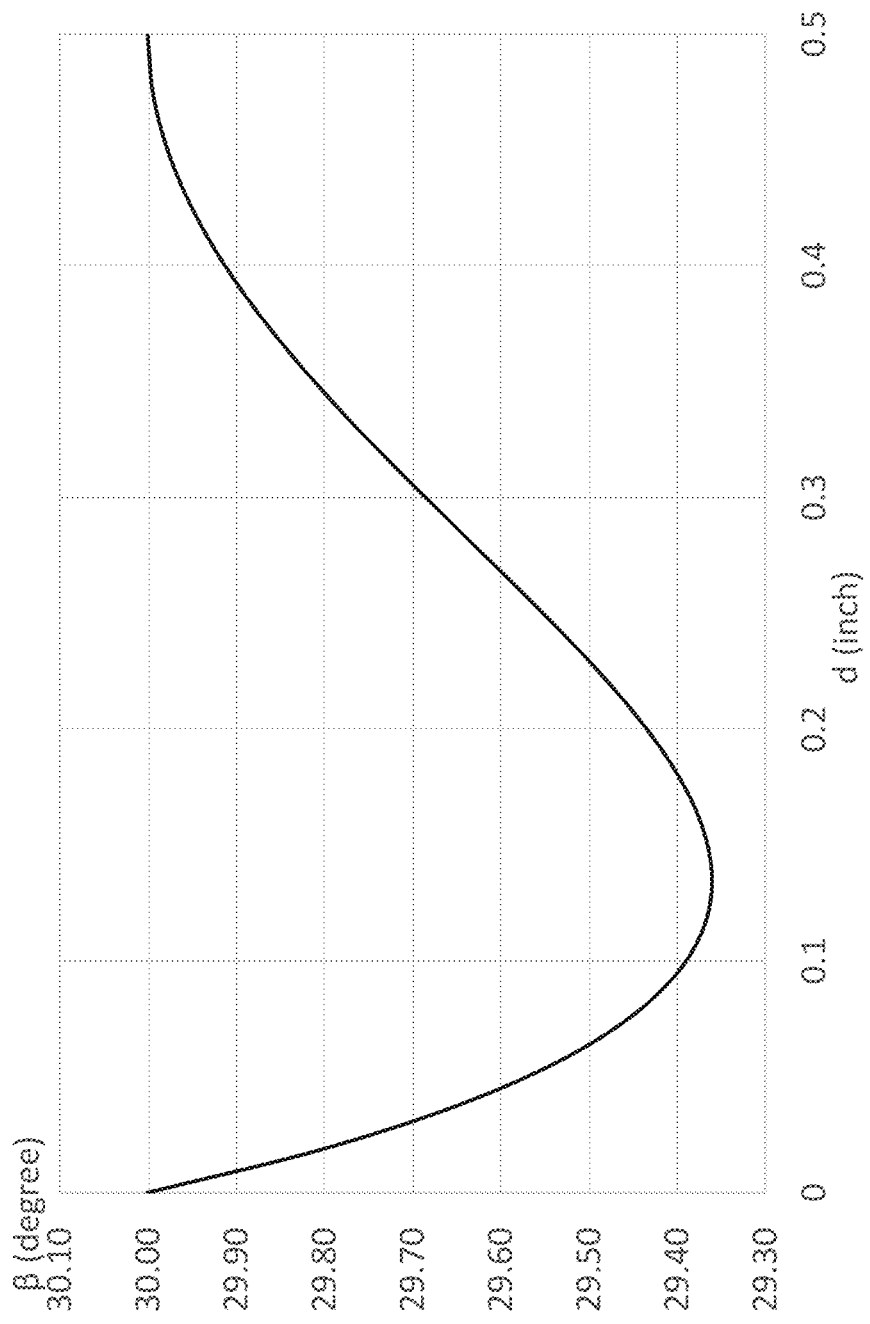
FIGS. 12E-12G illustrate the plots of geometrical changes in the storage container wall panels as the storage container is collapsed.
Figure 12F:
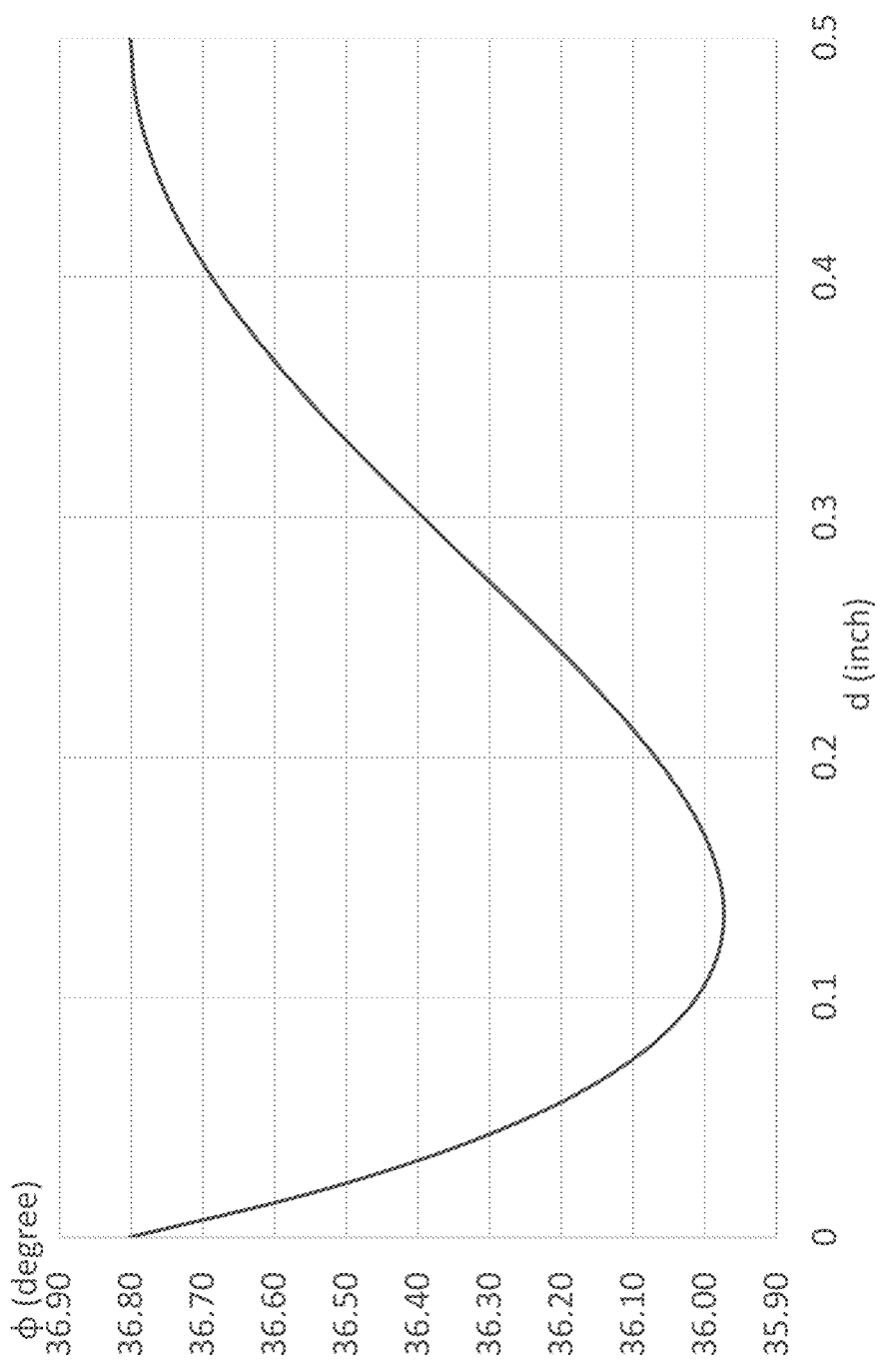
Figure 12G:
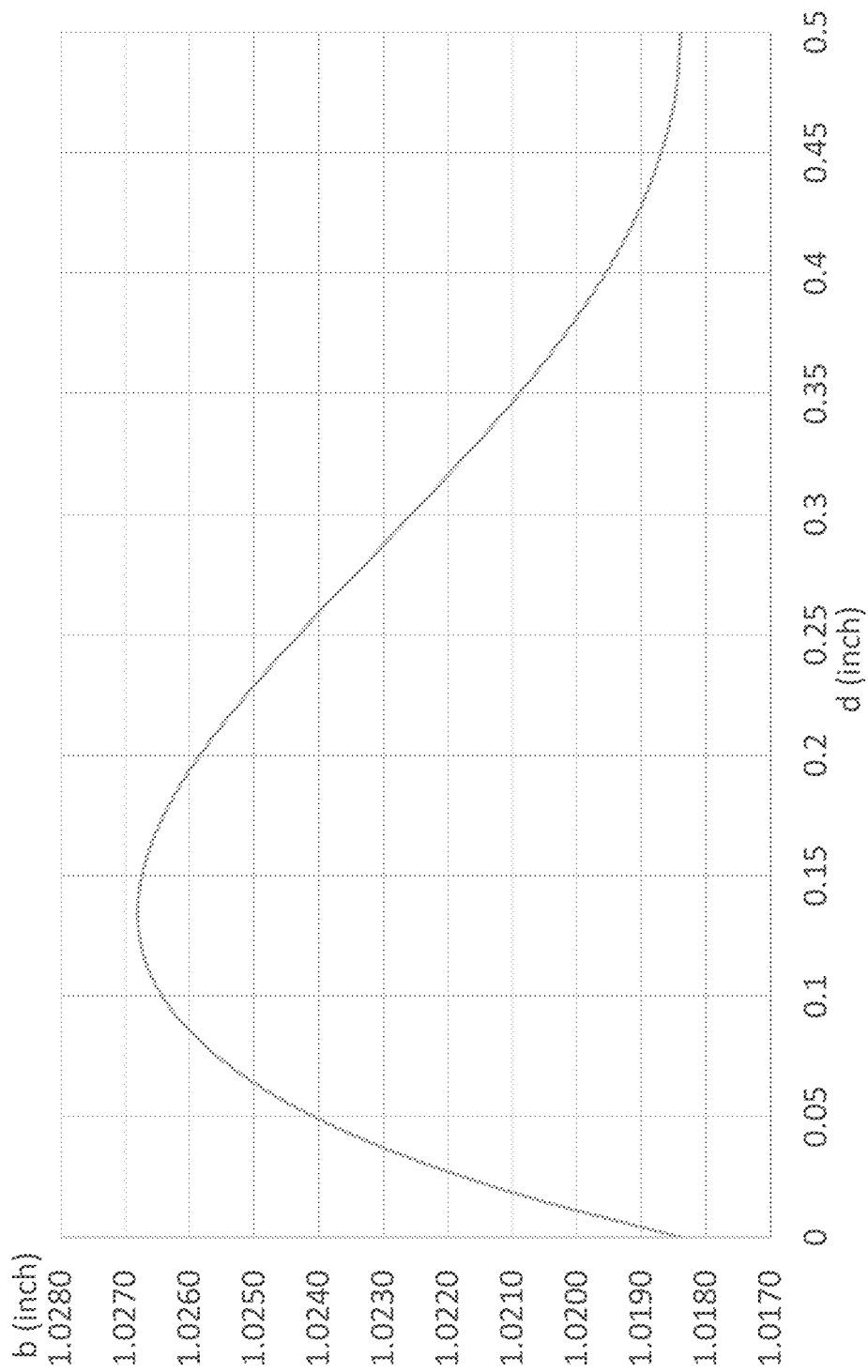

FIGS. 12E-12G show the changes in the geometry of the storage tank wall panels as a function of the distance d, FIG. 12B, that the top surface 185 is moved towards the bottom surface 159, i.e., as the storage container is collapsed. FIG. 12E is the plot of the angle β (between the sides AC and BC of the triangle panel ABC, FIG. 12B) as a function of the distance d, FIG. 12B. FIG. 12F is the plot of the angle Φ (between the sides BC and CD of the triangle panel BCD, FIG. 12B) as a function of the distance d, FIG. 12B. FIG. 12G is the plot of the length b, FIG. 12B, of the line BC as a function of the distance d, FIG. 12B.

As can be seen in the plots of FIGS. 12E-12G, the variations in the angles β and (and the change in the length of the line BC that connects the triangular panels ABC and BCD are all very small and since the storage containers are generally constructed with soft metals as was previously described of thicknesses in the range of 0.003 inch to 0.010 inch, the force/pressure needed to force to fully collapse the storage container is very small. For example, storage containers with the geometry of the above example and constructed with a soft aluminum material with a thickness of 0.005 inch has been tested to require less than 7 lbs of force to start to collapse and the collapsing force drops to around 4 lbs as the storage container is fully collapsed.

It is noted that the change in the angles β and Φ are due to the increase in the length of the line BC since the other sides of the triangles ABC and BCD are fixed. In practice, the small variation of around 0.008 inch (0.8 percent) in the length of the BC side of the above two triangles is readily compensated by small deformation of the side panels as the storage container is collapsed. By examining the plot of FIG. 12G, it is seen that the length of the line BC is increased around 0.008 inch as the storage container is collapsed and then brought back to essentially its starting length as the storage container is fully collapsed.

It is appreciated by those skilled in the art that the size of the top and bottom surface hexagons, the initial height of the storage container, and the initial relative angle $\theta_0$ determine the variations in the angles β and Φ and the rotation angle θ shown in the plots of FIGS. 12C, 12E and 12F, respectively, would determine the amount of change in the length of the line BC. It is also appreciated that the geometry of the storage container as provided above were optimized to minimize the amount of change in the length of the line BC. It is noted that the change in the length of the line BC is mostly responsible for the variation in the stiffness of the storage container (i.e., variation in the required collapsing force). The required force to accommodate the change in the length of the line BC can, however, be significantly reduced as follows.

As can be seen in the plot of FIG. 12G, as the storage container is collapsed, the length of the line BC increases up to a distance of around d=0.13 inch and then begin to decrease back to its initial length and reaches it when the storage container is fully collapsed. The increase in the length of the line BC may be accommodated in several ways. One method, which is also easy to accommodate in the manufacturing process of the storage container is to form the "triangular" panels ABC and BCD with a slightly inwardly curved side BC (shown with dashed line 187 in FIG. 12B) to accommodate the aforementioned 0.008 inch (0.8 percent), i.e., the inward curved edge b (connecting the corners B and C) must be slightly larger than 0.008 inch longer than the initial length of the straight line BC of 1.018 inch (FIGS. 12B and 12G). In general, it is desired for the said inward curved edge b to be slightly longer than the maximum increase of 0.008 inch so that when the maximum distance BC of 1.0268 inch is reached, FIG. 12G, the edge b is still slightly curved inward so that as the storage container is further collapsed, the edge b could "buckle" inward with minimal resistance.

For assembly into a liquid reserve battery such as the one shown in FIG. 1, the electrolyte storage container 150 of FIG. 10 may be assembled with a top and a bottom cap member as shown in the isometric view of FIG. 13A and as described below.

Figure 13B:
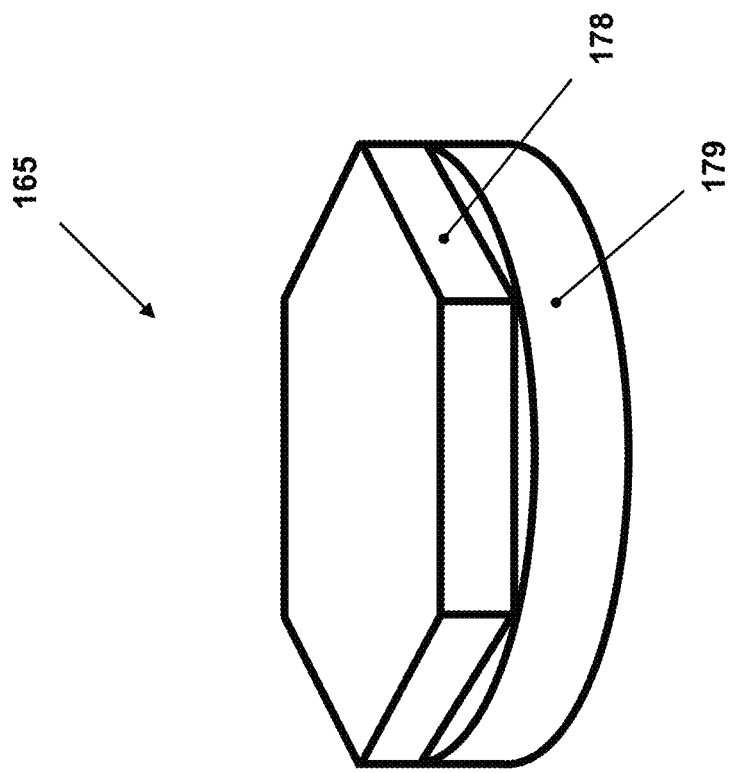
FIG. 13B illustrates one design of the top members of the electrolyte storage container of FIG. 10 as shown in the assembly of FIG. 13A.
Figure 13A:
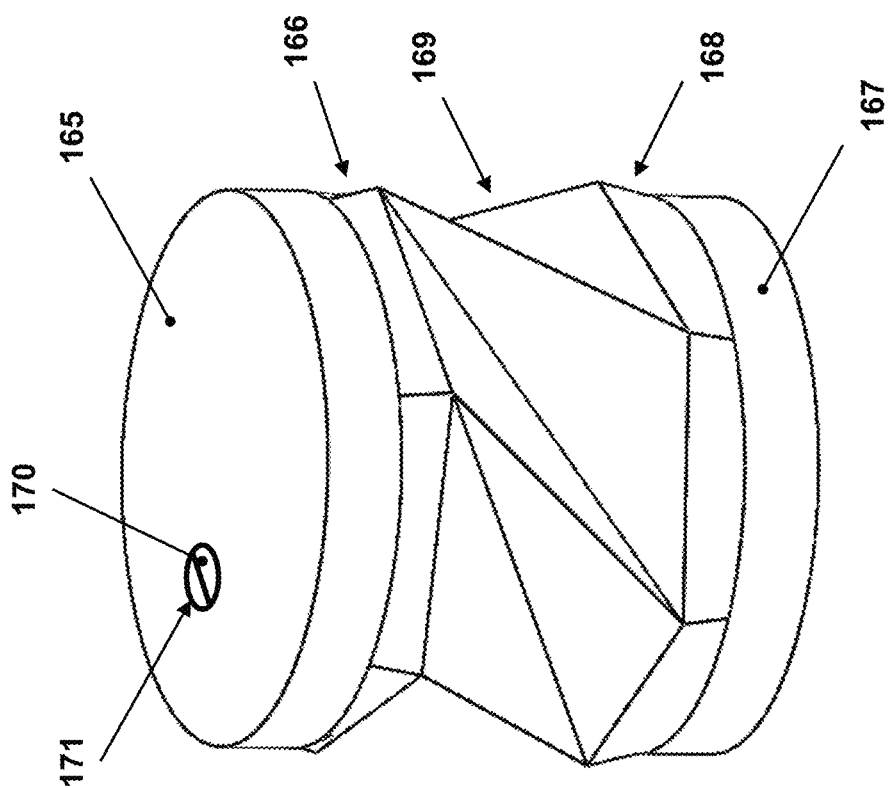
FIG. 13A illustrates the isometric view of the electrolyte storage container unit embodiment of FIG. 10 as assembled with a top and a bottom surface member.

In the schematic of FIG. 13A, the wall 169 of the storage container 150 is shown to be provided with a top member 165 and a bottom member 167. In practice, the wall 169 together with a relatively short hexagonal shaped sections 166 and 168 are formed from a tube of soft metallic material (usually aluminum, stainless steel or brass) with the desired wall thickness (usually 0.003 inch to 0.010 inch).

The top member 165 is provided with a relatively short bottom hexagonal section (not seen in FIG. 13A but shown in FIG. 13B), which fits inside the top hexagonal section 166 and welded to the section 166 to provide for a hermetically sealed connection. In FIG. 13A, the member 165 is shown to be provided with a section above the hexagonal section 166 that is circular in cross-section. This section may be the continuation of the hexagonal cross-section portion that is welded to the section 166 and is usually provided if the welded section is too thin to receive the applied force/pressure for collapsing the storage container section 169.

The geometry of the top member 165, FIG. 13A, is shown in the isometric view of FIG. 13B. In FIG. 13B the top member 165 is shown upside down as compared to the view of FIG. 13A so that the hexagonal section 178 of that fits inside the storage container wall 169 is clearly shown. The circular cross-sectional section (if present) 179 is also shown. The electrolyte filling hole is also not shown in this view for clarity.

The bottom member 167 is also provided with a relatively short bottom hexagonal section (not seen in FIG. 13A), which fits inside the bottom hexagonal section 168 and welded to the section 168 to provide for a hermetically sealed connection. In FIG. 13A, the member 167 is shown to be provided with a section below the hexagonal section 168 that is circular in cross-section. This section and the hexagonal cross-section portion that is welded to the section 168 make up an assembly that is described later in this disclosure to provide a hermetically sealed diaphragm to keep the battery electrolyte in a hermetically sealed storage container and the means of heating the electrolyte at low temperature at low temperatures as it is being discharged into the battery core during the battery activation. The circular cross-section of the member 167 is sometimes sized for assembly inside the liquid reserve battery housing. The circular cross-section of the member 167 may also be provided with a flange or beveled edge (neither option shown) for ease of being welded to the liquid reserve battery housing.

To fill the electrolyte storage container of FIG. 13A following its fabrication and with the aforementioned discharge diaphragm in place, a small through hole 171 in the top member 165, which is at least partially tapped, is provided that is used to fill the electrolyte storage container. Once the storage container is filled, a short set screw 170 or the like with sealing Teflon or epoxy or nitrocellulose or the like is used to close and seal the provided hole. Alternatively, the screw 170 of the same material as the top member 165 is used and is welded to the top member or soldered or the like as applicable depending on the metal material is being used.

Figure 13C:
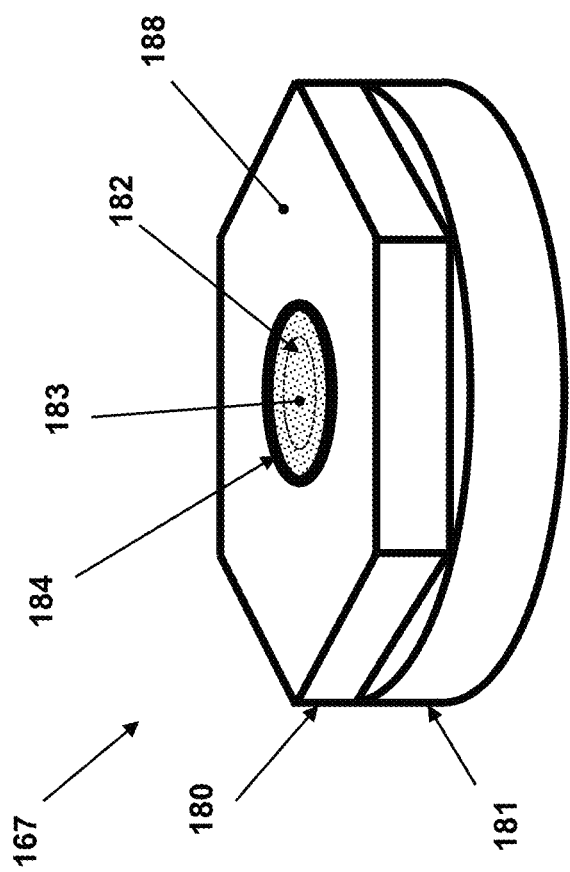
FIG. 13C illustrates one design of the bottom members of the electrolyte storage container of FIG. 10 as shown in the assembly of FIG. 13A, also showing discharge hole of the storage container as covered with a sealed membrane.

The geometry of the bottom member 167, FIG. 13A, is shown in the isometric view of FIG. 13C. The hexagonal section 180 and the circular cross-sectional section (if present) 181 are also shown. FIG. 13C illustrates one possible exterior design of the bottom member 167 for the electrolyte storage container of FIG. 10 as shown in the assembly of FIG. 13A. FIG. 13C also shows the entrance hole 182, which is connected to the electrolyte passages into the battery core as will be illustrated and described later in this discloser. While the electrolyte is stored in the storage container, FIG. 13A, the entrance hole 182 is covered by the membrane 183. The membrane 183 can be a very thin (of the order of 0.001 inch 0.004 inch thick) metal of the type used for the construction of the bottom member 167 so that it could be welded to the top surface 188 around the edges 184 of the membrane, thereby providing a hermetic seal. The surface of the membrane 183 over the entrance hole 182 may be scored to facilitate its rupture by the electrolyte pressure as the electrolyte filled storage container is forced/pressured to collapse. The membrane 182 may also be ruptured by a cutting element that is actuated by the collapsing storage container as is described later in this disclosure.

Figure 13D:
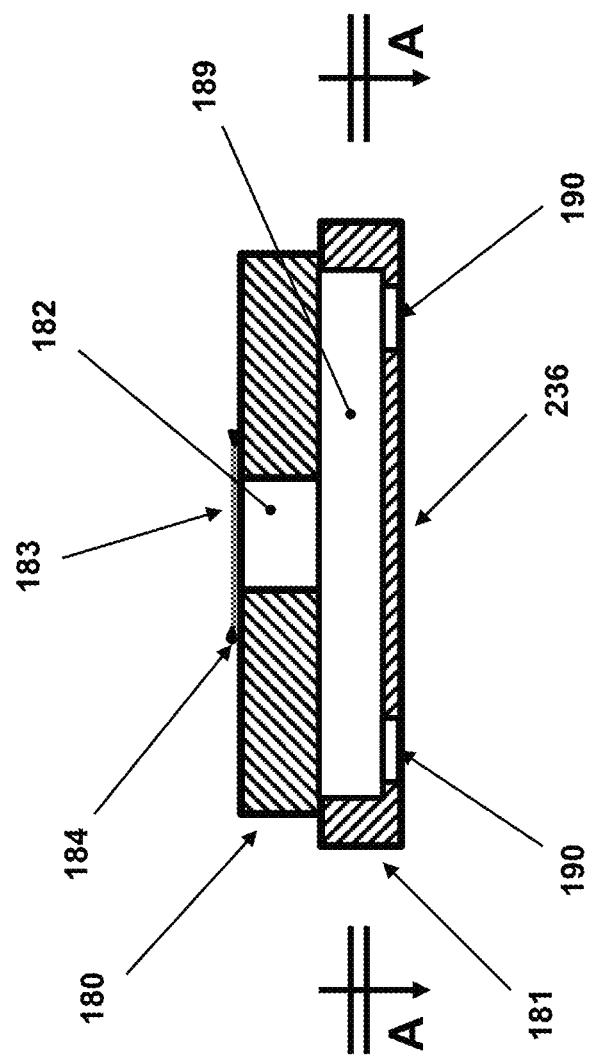
FIG. 13D illustrates the longitudinal cross-sectional view of the bottom member of the electrolyte storage container of FIG. 13C.

FIG. 13D shows the longitudinal cross-sectional view of the bottom member 167 of the electrolyte storage container of FIG. 13C. The hexagonal section 180 and the circular cross-sectional section 181 are two different parts that are joined together, preferably by welding. As can be seen in FIG. 13D, the hole 182 is connected to the electrolyte discharge channels 189 (shown in more detail in FIG. 13E) and the exist holes 190 are provided to allow the electrolyte to be discharged into the battery cell (shown in more detail in the cross-sectional view of FIGS. 15 and 16). Here, as the electrolyte storage container of FIG. 13A is forced/pressured to collapse, the membrane 183 is ruptured (either by the pressure exerted by the electrolyte and/or by a provided cutting element to be described later in this disclosure), allowing the electrolyte fluid to be discharged through the hole 182, through the channels 189 (FIGS. 13D and 13E) and out through the exit holes 190 into the battery core.

Figure 13E:
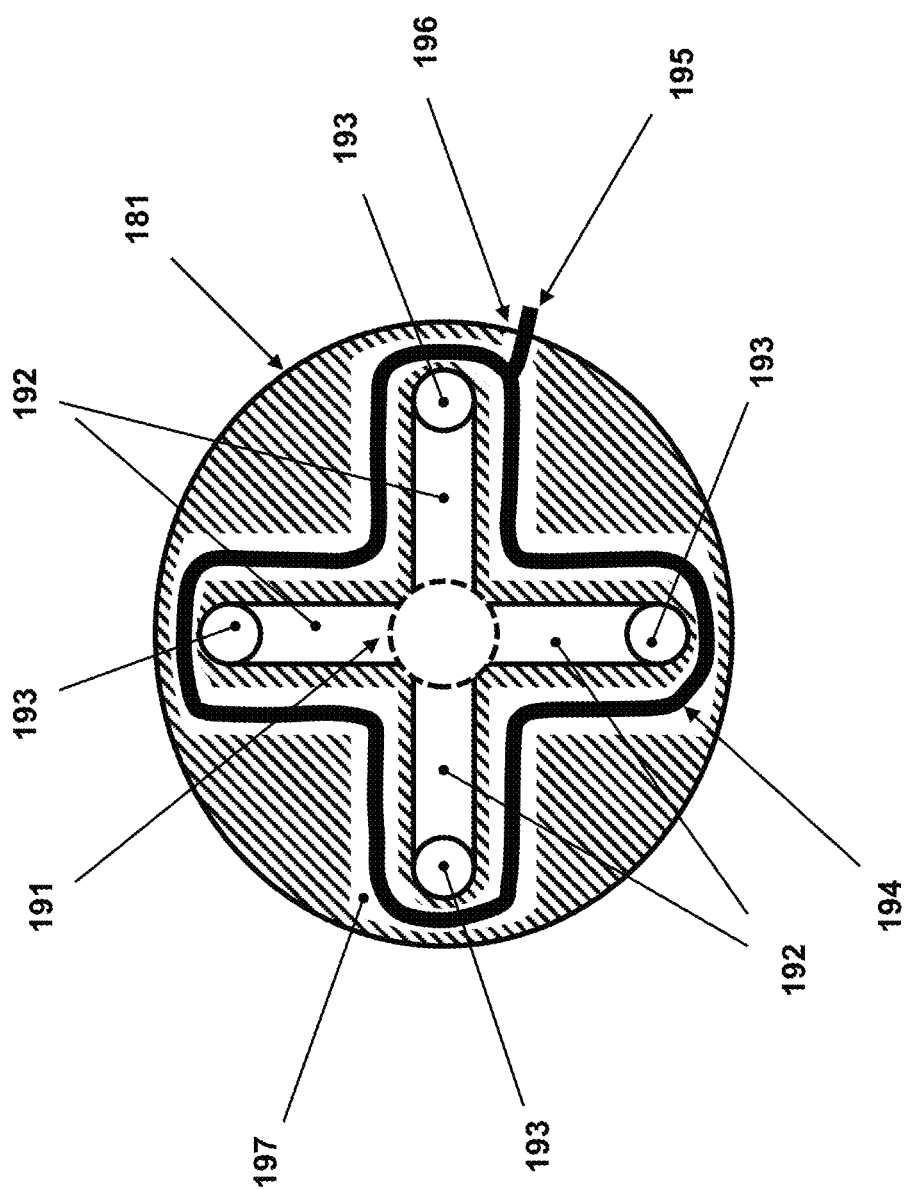
FIG. 13E illustrates the cross-sectional view A-A of the bottom member shown in FIG. 13D.

The cross-sectional view A-A of the bottom member 167, FIG. 13D, is shown in FIG. 13E. This cross-sectional view is in effect the top view of the section 181 of the bottom member 167 of the storage container, FIG. 13C. As can be seen, the channels 192 (189 in FIG. 13D) are provided on the top surface of the section 181. The hole 182 in the section 180 of the bottom member 167, FIG. 13D, is shown with dashed line 191 to indicate its location above the central ends of the channels 192 for electrolyte being ejected from the storage tank to travel through the channels and exit from the provided holes 193 (190 in FIG. 13D) into the battery core located below the bottom member 167, FIGS. 15 and 16.

As can be seen in the cross-sectional view of FIG. 13D, a grove 197 is also provided that run on both sides of the channels 192 and close to the walls of the channels 192. A pyrotechnic-based heating fuse 194 is then placed inside the groove 197. The pyrotechnic-based heating fuse 194 is then extended to the outside (as indicated by the numeral 195) of the section 181 through a hole 196 that is provided from the groove 197 to the outside of the section 181 as shown in FIG. 13E (the hole 196 and the exiting fuse 195 are not shown in FIGS. 13C and 13D).

Figure 15:
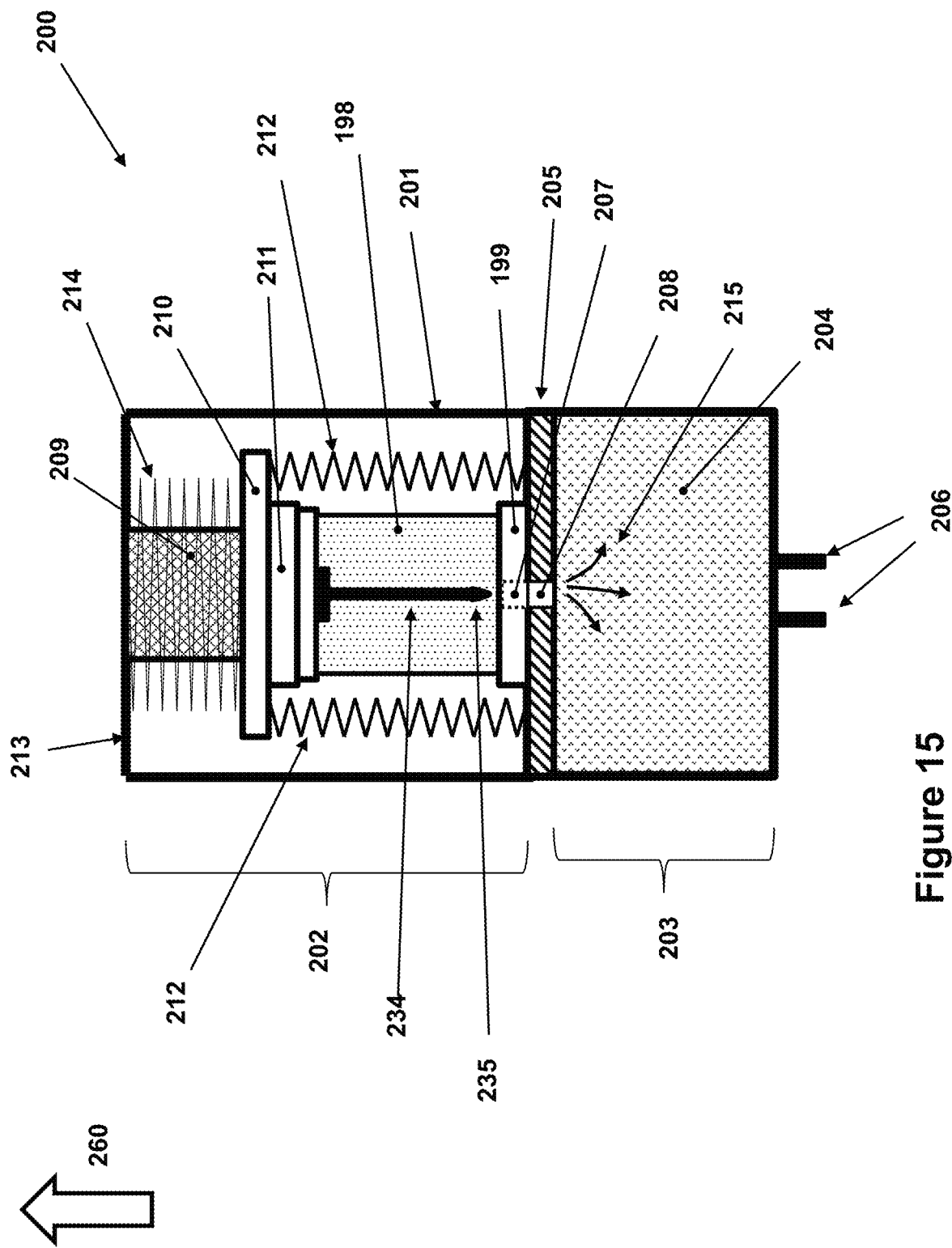
FIG. 15 illustrates a sectional schematic of one embodiment of the liquid reserve battery constructed with the electrolyte storage container of FIG. 13A.

FIG. 15 shows the sectional schematic of the embodiment 200 of the liquid reserve battery of the present invention that is constructed with the electrolyte storage container of FIG. 13A, which is indicated by the numeral 198. In this embodiment, the bottom member 167 of the storage container, FIG. 13C, is provided only with the section 180 (FIG. 13D), which is constructed with a circular cross-section (like the eliminated bottom section 181) and indicated in FIG. 15 by the numeral 199.

Similar to the embodiment 10 of FIG. 1, the liquid reserve battery 200 consists of a body 201, which is divided into two compartments 202 and 203. The compartment 202 is where the liquid electrolyte filled storage container 198 is located. The compartment 203 is where the battery core (battery cell) 204 is located with appropriate space to accommodate the battery liquid electrolyte. The compartments 202 and 203 can be divided by a single relatively rigid separating plate 205. The battery body 201, the dividing plate 205 and other structures of the battery can be made from relatively non-corrosive metal such as stainless steel. The liquid reserve battery 200 terminals are indicated by numeral 206. The terminals 206 of the liquid reserve battery 200 may be located at any convenient location, such as being positioned on a surface of the battery cell compartment 203.

In general, the body 201 and the compartments 202 and 203 of the liquid reserve battery 200 may be formed to have any convenient shape, such as to match an available space in the munitions.

In the compartment 202 is located at least one electrolyte storage container 198 of the type shown in FIG. 13A, within which the liquid electrolyte is stored. At least one outlet hole 207 (182 in FIG. 13D) in the section 180 bottom member 167 of the storage container and a matching hole in the dividing plate 205 are provided for electrolyte discharge from the electrolyte storage container 198. The outlet 207 is sealed by relatively thin, such as metallic, diaphragms (183 in FIG. 13D) as was previously described. The liquid reserve battery 200 is also provided with an activation device 209. The activation devices that may be used for this purpose are described later in this disclosure. The function of the activation device 209 is to "lock" the relatively rigid plate 210 to the top cap 213 of the battery body 201 and release it when the activation event (e.g., munitions firing in munitions) is detected as described later in this disclosure. The rigid plate 210 is fixedly attached to the top member 211 (165 in FIG. 13A) of the electrolyte storage container 198. At least one preloaded tensile spring 212 is then used to connect the plate 210 to separating plate 205, so that upon battery activation, the preloaded tensile springs 212 would apply the required force to the electrolyte storage container 198 to collapse it and eject the stored electrolyte as described later.

Alternatively, instead of the at least one preloaded tensile spring 212, at least one preloaded compressive spring 214 is positioned between the top cap 213 of the battery body 201 and the relatively rigid plate 210 so that upon battery activation, the preloaded compressive spring 214 would apply the required force to the electrolyte storage container 198 to collapse it and eject the stored electrolyte as described later in this disclosure.

It is appreciated by those skilled in the art that the rigid plate 210 and the top member 211 may be combined as a single piece to reduce the total height of the battery. Similarly, the bottom member 167, FIG. 13C, and the separating plate 205 may also be combined as a single piece that is then attached to the interior wall of the battery body 201, for example by soldering or the like.

The liquid reserve battery 200 is activated by the activation device 209 releasing the rigid plate 210 as described later. The at least one preloaded tensile spring 212 and/or the preloaded compressive spring 214 would then force the electrolyte storage container 198 to collapse, thereby forcing the pressurized liquid electrolyte to rupture the diaphragm(s) 183 (FIG. 13D) and injecting the liquid electrolyte into the battery core 204 as indicated by the arrows 215. The liquid reserve battery 200 is thereby activated.

Figure 16:
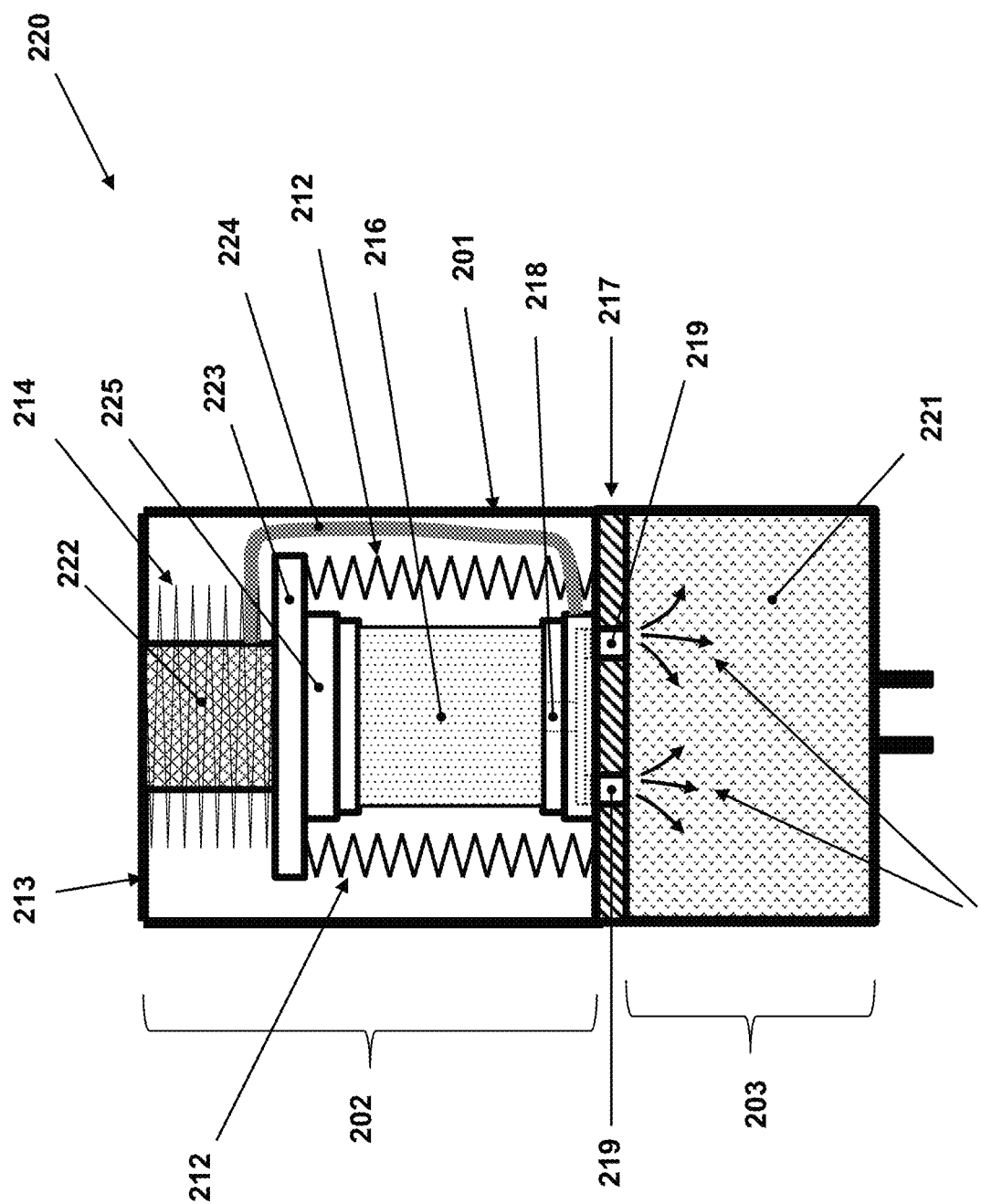
FIG. 16 illustrates a sectional schematic of the second embodiment of the pyrotechnic activated liquid reserve battery for fast activation and high and low temperature performance constructed with the electrolyte storage container of FIG. 13A.

FIG. 16 shows the sectional schematic of the embodiment 220 of the pyrotechnic activated liquid reserve battery of the present invention that is constructed with the electrolyte storage container of FIG. 13A, which is indicated by the numeral 216. In this embodiment, unlike the embodiment 200 of FIG. 15, the bottom member 167 of the storage container as shown in FIGS. 13C-13E is used and its components are indicated with the same numerals. All other components of the pyrotechnic activated liquid reserve battery embodiment 220 are identical to those of the embodiment 200 of FIG. 15 except the following.

Like the embodiment 200 of FIG. 15, the pyrotechnic activated liquid reserve battery 220 has the body 201 and is divided into two compartments 202 and 203. The compartment 202 is where the liquid electrolyte filled storage container 216 (198 in FIG. 15) is located. The compartment 203 is where the battery core (battery cell) 204 is also located. The compartments 202 and 203 are similarly divided by a single relatively rigid separating plate 217 (205 in FIG. 15). The battery body 201, the dividing plate 205 and other structures of the battery can be made from relatively non-corrosive metal such as stainless steel. The liquid reserve battery 220 terminals (206 in FIG. 15) may be similarly located at any convenient location.

Like the embodiment 200 of FIG. 15, the body 201 and the compartments 202 and 203 of the pyrotechnic activated liquid reserve battery 220 may also be formed to have any convenient shape, such as to match an available space in the munitions.

In the compartment 202 is located at least one electrolyte storage container 216 of the type shown in FIG. 13A, within which the liquid electrolyte is stored. At least one outlet hole 218 (182 in FIG. 13D) in the section 180 of the bottom member 167 of the storage container 216 is provided for electrolyte discharge from the electrolyte storage container 218 through the channels 189 (FIG. 13D and 192 in FIG. 13E), exiting through the holes 190 (FIG. 13D and 193 in FIG. 13E) and matching holes 219 into the battery core (battery cell) 221 (204 in FIG. 15). The outlet hole 218 is similarly sealed by relatively thin, such as metallic, diaphragm (183 in FIG. 13D) as was previously described. The liquid reserve battery 220 is similarly provided with an activation device 222. The activation devices that may be used for this purpose are described later in this disclosure. The function of the activation device 222 is to "lock" the relatively rigid plate 223 (210 in FIG. 15) to the top cap 213 of the battery body 201 and release it when the activation event (e.g., munitions firing in munitions) is detected as described later in this disclosure. The activation device 222 also functions as an initiation device as is later described to ignite the fuse element 224, which extends from the activation device into the bottom member 167 of the storage container 216 and fills the groove 197 (FIG. 13E) as indicated by the numeral 194 in FIG. 13E.

Like the embodiment of FIG. 15, the rigid plate 223 is fixedly attached to the top member 225 (211 and 165 in FIGS. 15 and 13A, respectively) of the electrolyte storage container 216. At least one preloaded tensile spring 212 is then used to connect the plate 223 to separating plate 217, so that upon battery activation, the preloaded tensile springs 212 would apply the required force to the electrolyte storage container 216 to collapse it and eject the stored electrolyte as is described later.

Alternatively, instead of the at least one preloaded tensile spring 212, at least one preloaded compressive spring 214 is positioned between the top cap 213 of the battery body 201 and the relatively rigid plate 223 so that upon battery activation, the preloaded compressive spring 214 would apply the required force to the electrolyte storage container 216 to collapse it and eject the stored electrolyte as is described later.

It is appreciated by those skilled in the art that the rigid plate 223 and the top member 225 may be combined as a single piece to reduce the total height of the battery. Similarly, the bottom member 167, FIG. 13C, and the separating plate 217 may also be combined as a single piece that is then attached to the interior wall of the battery body 201, for example by soldering or the like.

The liquid reserve battery 220 is activated by the activation device 222 releasing the rigid plate 223 and igniting the fuse element 224 as described later. The at least one preloaded tensile spring 212 and/or the preloaded compressive spring 214 would then force the electrolyte storage container 216 to collapse, thereby forcing the pressurized liquid electrolyte to rupture the diaphragm(s) 183 (FIG. 13D) and injecting the liquid electrolyte into the battery core 221 as indicated by the arrows 225. The liquid reserve battery 220 is thereby activated.

It is appreciated by those skilled in the art that the burning of the fuse element 224 inside the compartment 202 provides a source of heat to warm up the electrolyte contained in the electrolyte storage container 216 while also generating burning gas pressure to assist in the collapsing of the electrolyte storage container 216. The burning of the fuse element 224 inside the grooves 197, FIG. 13E, which are very close to the channels 192 through which the electrolyte that is being ejected from the storage container 216 must pass also provides the means to further heat the electrolyte before being injected into the battery core 221.

It is also appreciated by those skilled in the art that the electrolyte needs to be heated at low temperatures and should only be minimally heated at room temperature and higher. It is also appreciated that at low temperatures, usually below zero degree C. and particularly below −20 degrees C. the performance of the liquid reserve battery is degraded and the electrolyte heating before injection into the battery core becomes critical. It is also appreciated by those skilled in the art that as the electrolyte temperature is decreased, the viscosity of the electrolyte is also increased. This phenomenon is used in this invention to ensure that at high enough temperatures, the electrolyte of the battery is minimally heated and at low temperatures the electrolyte is heated significantly and lower the battery temperature at the time of activation, larger amount of heat is transferred to the electrolyte as it is being injected into the battery core. In the present invention, this method is applied to the liquid reserve battery embodiment 220 of FIG. 16 and functions as follows.

It is appreciated that the viscosity of a liquid reserve battery increases as its temperature is lowered. The amount of change in the viscosity as a function of temperature is dependent on the type of electrolyte used and its additives. As it was previously described, upon activation of the pyrotechnic activated liquid reserve battery embodiment 220 of FIG. 16, the pressure exerted by the spring 212 and/or 214 would force the storage container to begin to collapse, thereby rupturing the membrane 183 and causing the electrolyte to begin to flow through the channels 192 (FIG. 13E) and exit from the outlets 193 into the battery core as shown by the arrows 225. It is appreciated that as the reserve battery 220 is activated by the activation device 222 releasing the rigid plate 223, the activation device would also ignite the fuse element 224 as described later in this disclosure. The rate of burning, i.e., heat generation, of the fuse element 224 is dependent on its type. Fuse elements are regularly designed with burning rates of several inches per second to 2-8 seconds per inch and with different heat generation capacity per inch. In the present method of accommodating low and high temperature liquid reserve activation, the hole 191, channels 192 and exit holes 193 (FIG. 13E) are sized considering room temperature (or other selected normal operating temperature level) viscosity of the electrolyte being used so that the entire electrolyte volume is ejected into the battery core 221 rapidly before it is significantly heated by the heat generated by the fuse element (particularly inside the grooves 197, FIG. 13E). This is readily achievable since the size of the hole 191, channels 192 and exit holes 193 determines the resistance to the electrolyte flow and since heat generated by the fuse element 194 takes time to reach the walls of the channel 197 to heat the flowing electrolyte, FIG. 13E.

However, the opposite happens at low temperatures. That is, the lower the battery temperature the lower will be the electrolyte temperature and the higher will be its viscosity. The electrolyte would therefore flow slowly through the hole 191, channels 192 and exit holes 193, FIG. 13E, thereby the heat generated by the fuse element has the time to reach the walls of the channel 197 and heat the flowing electrolyte before it is injected into the battery core. As a result, depending on the viscosity of the electrolyte being used and its relationship with the channels 197 and the inlet hole 182 diameter and exit hole 190 diameter (FIG. 13D) and the speed of burning of the fuse 194 (FIG. 13E) and its heat release per unit length can be varied to make it possible for the liquid reserve battery embodiment 220 of FIG. 16 to properly operate at very low as well as higher environmental temperatures.

It is appreciated by those skilled in the art that even though only four electrolyte channels and one fuse strip filled groove are shown in the cross-sectional view of FIG. 13E, more or less number of channels and more or less number of fuse filled grooves may be used depending on the battery size and the operational range of temperatures. As a result, the pyrotechnic activated liquid reserve battery embodiment 220 of FIG. 16 becomes temperature adaptive and can operate at the designed performance levels within its intended environmental temperature range.

It is also appreciated by those skilled in the art that the liquid reserve battery embodiment 220 of FIG. 16 may be provided with one activation device 222 for releasing the preloaded spring(s) 214 and/or 212 to apply the required force/pressure to the storage container 216 to inject the electrolyte into the battery core and at least one initiation (igniter) device for igniting the electrolyte heating fuse strip 224. Such a modified version of the liquid reserve battery embodiment 220 of FIG. 16 is shown in FIG. 17.

Figure 17:
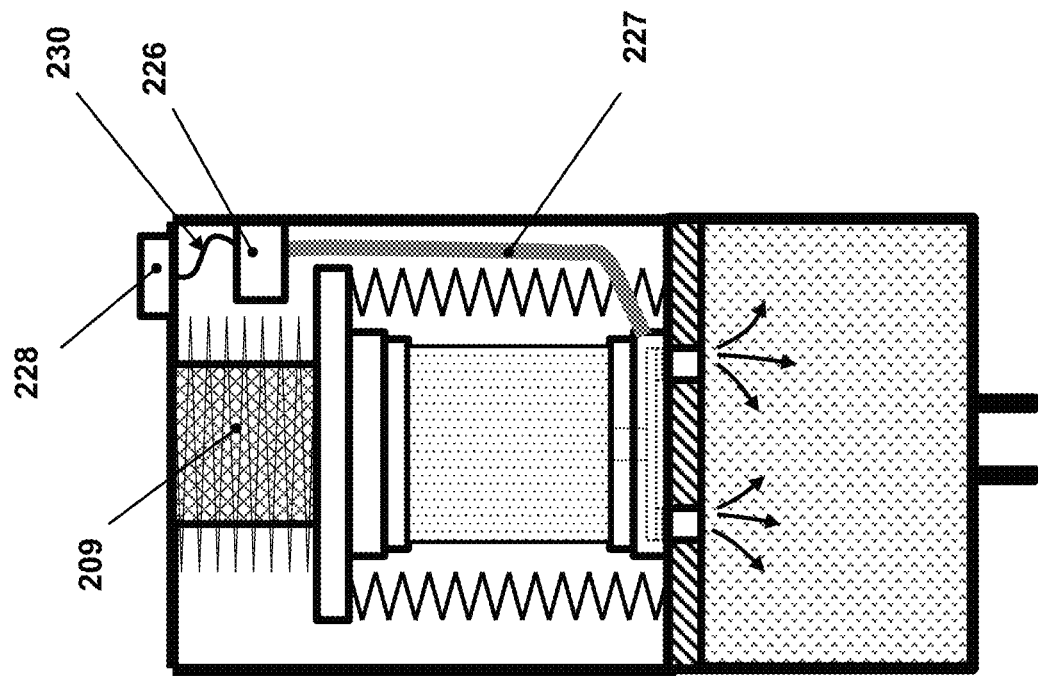
FIG. 17 illustrates a sectional schematic a modified embodiment of the pyrotechnic activated liquid reserve battery of FIG. 16 for high and low temperature performance.
Figure 17:
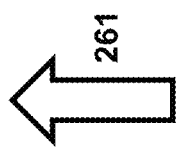

In the modified version of the liquid reserve battery embodiment 220 of FIG. 16 shown in FIG. 17, the heating fuse element 227 (224 in FIG. 15) is not ignited by the activation device 209 (222 in FIG. 15) at the time of battery activation. In contrast, the modified liquid reserve battery FIG. 17 is provided with at least one temperature sensor 228, which is used to determine if the battery temperature is below a prescribed threshold requiring heating of the stored electrolyte before and while being injected into the battery core. Then if the battery temperature is below the prescribed threshold, an initiation signal is transmitted to the (for example, electrical) initiation device 226 via a line 230 to ignite the heating fuse element 227.

It is appreciated by those skilled in the art that the modified liquid reserve battery FIG. 17 may be provided with more than one heating fuse elements 227, which may then be ignited by more than one provided initiation device 226 if the battery temperature is significantly lower than the aforementioned prescribed low temperature threshold or if the duration of heating fuse burning is desired to be increased, for example, to allow more time for the generated heat to warm up a very cold electrolyte.

It is also appreciated by those skilled in the art that when the activation device is not designed to activate the battery, i.e., to release the springs 212 and/or 214 (FIG. 15) as a result of the firing setback (or set forward) or spin acceleration or spin rate, for example, if the activation device 209 is electrically operated, then in the modified liquid reserve battery FIG. 17, the at least one heating fuse element 227 may be ignited by at least one initiation device 226 when a low temperature threshold is detected by the temperature sensor 228, before initiating battery activation. This sequence of initiating the heating fuse element(s) 227 before activating the activation device 209 is highly desirable at very low temperatures so that the electrolyte is warm enough before being injected into the cold battery core to rapidly activate the battery and without performance degradation that occurs at low battery core temperatures.

Figure 14:
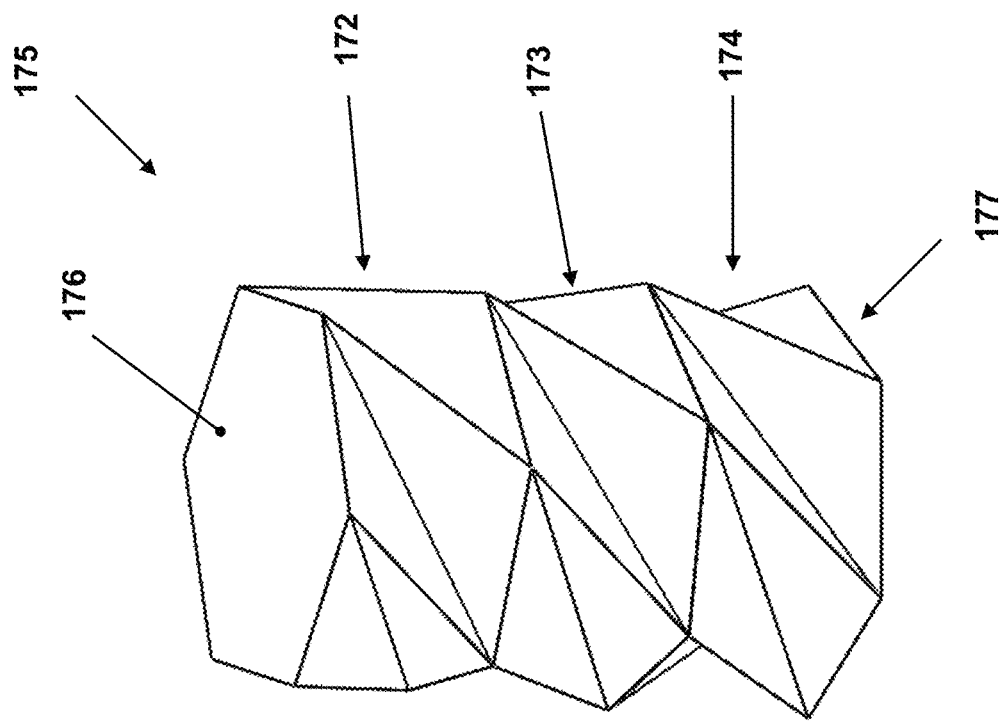
FIG. 14 illustrates the isometric view of a multi-stage construction of an electrolyte storage container using two or more electrolyte storage container unit embodiments of FIG. 10.

The liquid reserve battery embodiments of FIGS. 15-17 were indicated to be constructed with the (single stage) electrolyte storage container of FIG. 13C. It is, however, appreciated by those skilled in the art that the liquid reserve battery embodiments of FIGS. 15-17 and other similar liquid reserve batteries may also be constructed with multi-stage electrolyte storage containers, a three stage one of which is shown in the schematic of FIG. 14. In general, by using such multi-stage electrolyte storage containers, more electrolyte is stored and ejected in a smaller (polygon) diameter but taller container.

It is also appreciated by those skilled in the art that the electrolyte storage containers of FIGS. 13A and 14 may also be constructed with polygons that do not have all equal sides and even with polygons that are not fully convex. Such irregular shapes may be desired, particularly when the reserve battery itself is not cylindrical with circular cross-section or when the force to collapse the container cannot be applied close to the center of the top surface or when the container is to be collapsed with a "scissor-shaped" or the link mechanism due to the available volume or shape of the overall battery.

It is also appreciated by those skilled in the art that the method of designing the disclosed electrolyte storage container design, which is based on constructing container shapes with flat or curves panels that are essentially subjected to bending at their connecting edges, can be used to develop numerous other shaped containers that provide minimal resistance to being collapsed and once collapsed, would essentially stay in their collapsed state with no or negligible rebound.

Therefore, the disclosed electrolyte storage containers would be a suitable replacement for currently used glass ampules and metal bellows by addressing their aforementioned shortcomings and resulting in safer and smaller liquid reserve batteries in general and for munitions in particular.

It is appreciated that upon activation of the liquid reserve battery embodiments of FIGS. 15-17, as the electrolyte storage container (FIG. 13A) is collapsed to eject the stored electrolyte into the battery core as was previously described, the membrane 183 (FIG. 13C) must first be ruptured to allow for the flow of the electrolyte into the battery core.

The membrane 183 is provided with a very thin and scored soft (preferably metallic) material such as aluminum or stainless steel. For example, the membrane may be constructed as shown in the cross-sectional and top views of FIGS. 18A and 18B, respectively, where the central scored section 231 is around 0.001-0.003 inch thick. The thicker rim 232 shown in the cross-sectional view of FIG. 18A is provided for ease of welding to the surface 188 of the bottom member 167, FIG. 13C. The scoring marks 233 are provided to significantly reduce the pressure/force needed to rupture the membrane 183 to allow the electrolyte to flow into the battery core. Several methods may be used to rupture the membrane 183, including the following, depending on the size of the electrolyte storage container and the construction of the battery core.

In one method, upon battery activation by the release of the preloaded springs 212 and/or 214, FIG. 16, the force applied by the springs and if the pyrotechnic element 224 is present and ignited with the additional pressure applied to the electrolyte storage container 216, the generated electrolyte pressure is designed to rupture the scored area 231 of the membrane 183 (FIG. 13D) an allow the electrolyte to be injected into the battery core (204 and 221 in FIGS. 15 and 16, respectively).

In another method, a cutting "pin" 234 is attached to the bottom of the top member 211 as shown in FIG. 15. The tip 235 of the cutting pin 234 is relatively wide and sharp and close to the membrane surface 231 (FIG. 18B), so that as the electrolyte storage container begins to collapse following the battery activation as was previously described, the tip 235 of the cutting pin 234 would rupture the membrane surface 231, allowing the electrolyte to flow into the battery core 204. In some applications, this method is not desirable since it requires the provision of another hole in the bottom surface 236 (FIG. 13D) below the hole 183 and its coverage by another membrane (not shown) like the membrane 183.

It is appreciated by those skilled in the art that the cutting pin 234 (cutting member) may be attached to any of the electrolyte storage container walls 169 (FIG. 13A). This may be preferable if it is not desirable to inset the cutting pin deep into the battery core, for example if the center of the battery core does not have a large enough empty space or if the battery core is not deep enough to accommodate the cutting pin 234. In which case, by attaching the cutting pin (cutting member) to the lower regions of the electrolyte storage container wall panels 169 (not shown), the cutting pin does not have to enter into the battery core and the aforementioned requirement of additional hole in the bottom surface 236 (FIG. 13D) and its coverage by a second membrane is eliminated.

Alternatively, since the amount of force required to rupture the membrane surface 231 (FIG. 18B) by the sharp tip of a cutting member (such as the tip 235 of the cutting pin 234, FIG. 15) is very low, the cutting pin 234 may be constructed as soft helical spring with a stop member that eliminates the need for penetration of the cutting tip into the battery core. Such a membrane cutting (rupturing) member is shown in the schematic of FIG. 19A.

Figure 19B:
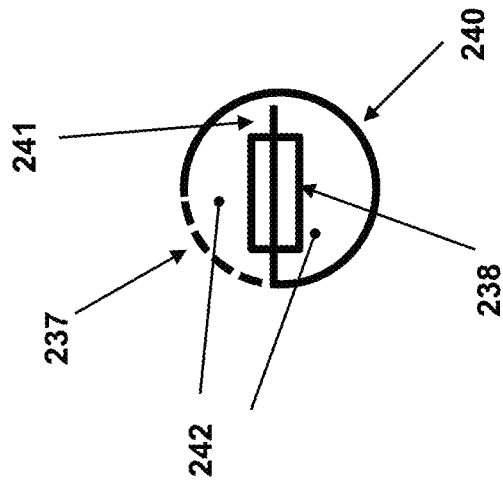
FIGS. 19A and 19B illustrates one method of rupturing the electrolyte storage container sealing membrane during the battery activation process.
Figure 19A:
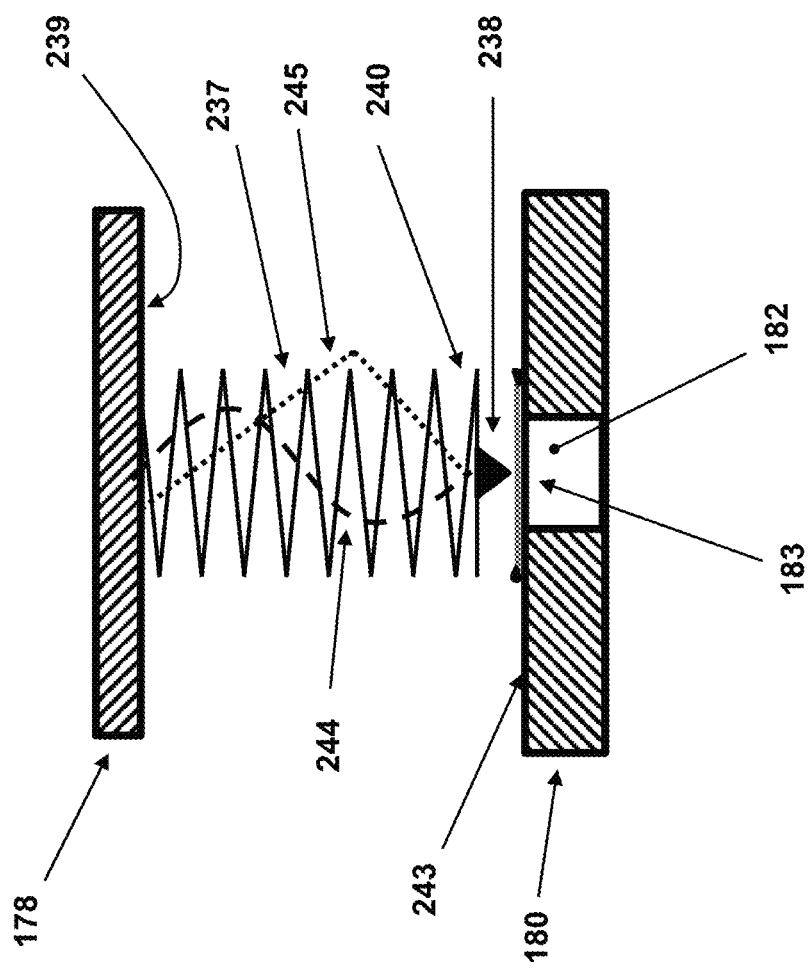

In the schematic of FIG. 19A and for the sake of clarity, only the hexagonal section 178 of the top member 165, FIG. 13B, and the hexagonal section 180 of the bottom member 167, FIG. 13D, are shown. One end of a relatively soft spring 237 is then fixedly attached to the bottom surface 239 of the hexagonal section 178 as shown in FIG. 19A. A sharp cutting member 238 is attached to the other end 240 of the spring 237. The sharp cutting member 238 is preferably attached as shown in the view 19B to the internally bent end 241 of the end 240 of the spring 237 so that the electrolyte liquid would be free to flow past the cutting member 238 and the spring end 240 into the exit hole 182 of the hexagonal section 180 of the bottom member 167 (spaces indicated by the numeral 242 in FIG. 19B).

It is also appreciated that as can be seen in the schematic of FIG. 19A, since the diameter of the soft spring 237 is larger than the diameter of the inlet hole 182, as the electrolyte storage container begins to be collapsed, once the cutting member 238 has ruptured the membrane 183, the end 240 of the spring 237 is stopped against the top surface 243 of the hexagonal section 180 of the bottom member 167, FIG. 13D, thereby preventing the cutting member 238 from entering the battery core. It is also appreciated that the spring 237 is designed to be very soft, thereby adding a negligible force to the required force to collapse the electrolyte storage container and generate a very small rebounding force to deform the collapsed electrolyte storage container.

It is also appreciated by those skilled in the art that the soft spring 237 does not have to be a helical spring as shown in the schematic of FIG. 19A. In general, a small diameter wire of soft material like aluminum that is formed to deform in bending and/or in a buckling mode, such as the ones shown in dashed lines 244 or dotted lines 245 in FIG. 19A may replace the soft spring 237 and would perform the same function of rupturing the membrane 183, FIG. 13D, with the tip provided cutting member 238. Such formed wires require very small force to deform and apply essentially no rebounding force to the collapsed electrolyte storage container and with the provided cross-member 241, FIG. 19B, which is longer than the diameter of the exit port 182, would ensure that the cutting member 238 does not enter the battery core.

To assist with the downward movement of the cutting pin 234 before the membrane rupture, the electrolyte storage container may be provided with a very small unfilled volume to absorb the slight change in the electrolyte storage container volume as the container is slightly collapsed before the membrane surface 231 rupture. In general, this empty volume is not needed since the walls 169 (FIG. 13A) of the electrolyte storage container are thin, thereby have enough flexibility to absorb the small volume change due to the downward movement of the top member 211 before the membrane surface 231 is ruptured.

As was previously described, the liquid reserve battery embodiment 200 of FIG. 15 and the liquid reserve battery embodiment of FIG. 17 are activated by the activation device 209 releasing the rigid plate 210. It is appreciated by those skilled in the art that for use in gun-fired munitions, the release mechanism of the activation device must release the rigid plate 210 only when the all-fire condition, i.e., when a prescribed minimum firing setback acceleration level that lasts a prescribed period of time has been detected. In the cross-sectional view of FIG. 20 an activation device with such a release mechanism is illustrated.

Figure 20:
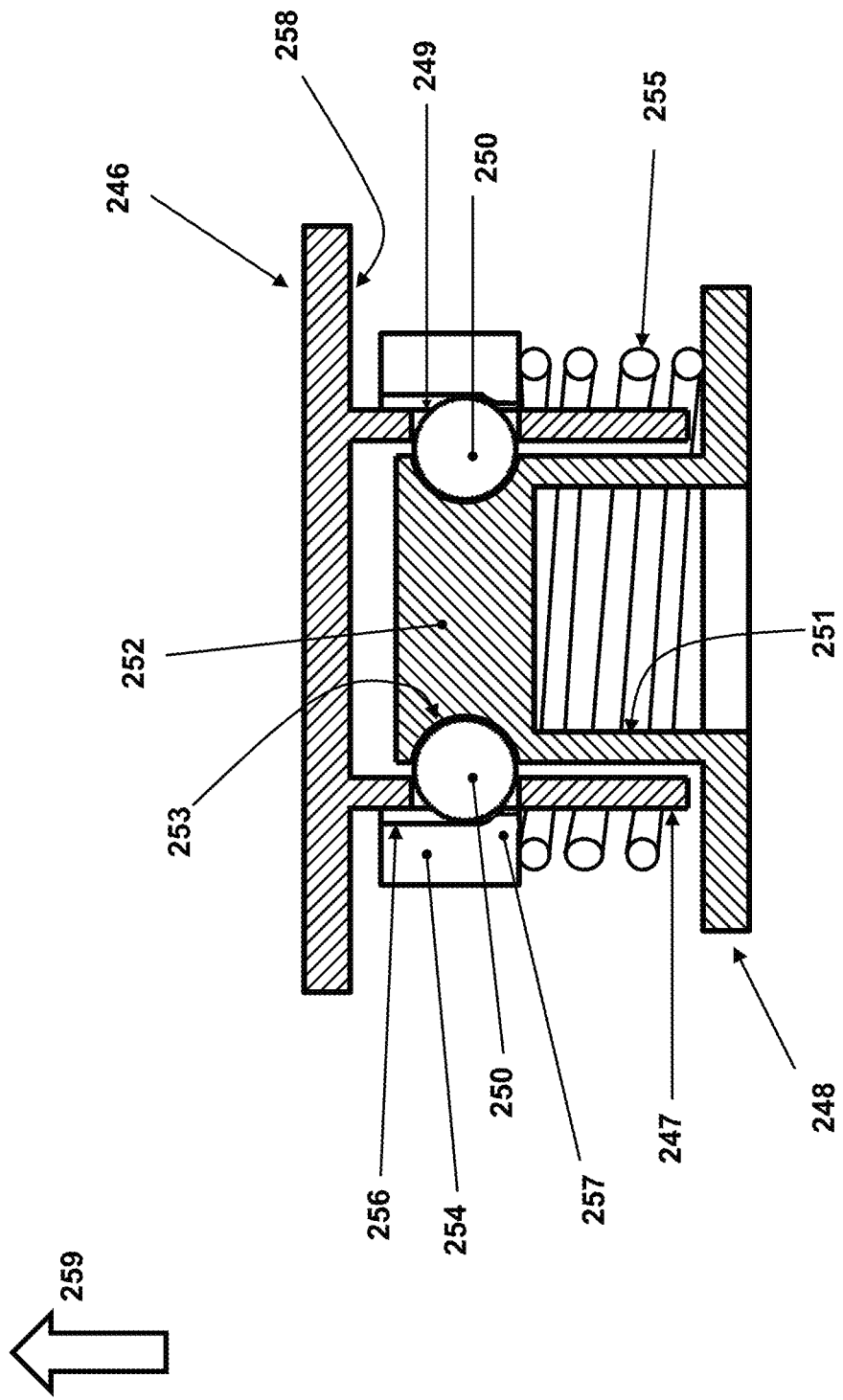
FIG. 20 illustrates one inertial activation device for the liquid reserve battery embodiments of FIGS. 15 and 17.

In the activation device of FIG. 20, only the activation mechanism as attached to the top cap 246 (213 in FIG. 15) of the liquid reserve battery embodiment 200 and the rigid plate 248 (210 in FIG. 15) of the liquid reserve battery embodiments of FIGS. 15 and 17 are shown. The top cap 246 is provided with a cylindrical extension 247, in which are provided preferably three or more holes 249, through which the balls 250 can pass. The rigid plate 248 is also provided with a structure 251 (cylindrical in FIG. 20) that supports a "locking head" 252. The locking head 252 is provided with spherical dimples 253 that matches the number of holes 249 in the cylindrical extension 247 to accommodate the balls 250.

A collar member 254 is also provided with the guides 256 in which the balls 250 are positioned as seen in the schematic of FIG. 20. The bottom 257 of the guides 256 are closed as seen in FIG. 20 so that the compressively preloaded spring 255 can push the collar 254 up against the balls 250 and the closed ends 257 would prevent the collar 254 from further upward displacement.

It is appreciated by those skilled in the art that alternatively, the collar 254 is not provided any guides 256 and its inner diameter is large enough to be assembled around the balls 250 as seen in the schematic of FIG. 20. However, the collars 254 are made large enough in height to be pushed by the compressively preloaded spring 255 to come to rest against the bottom surface 258 of the top cap 246.

It is appreciated by those skilled in the art that the dimples 253 in the locking head 252 provides the means of preventing the rigid plate 248 from rotating relative to the top cap 246, i.e., inside the liquid reserve battery (FIGS. 15 and 17). This feature is important for munitions that are subjected to spinning. Otherwise, in place of the dimples 253, a groove that accommodate the balls 250 may be provided around the locking head 252.

The liquid reserve battery embodiments of FIGS. 14 and 17 with the activation mechanism of FIG. 20 are then activated by firing setback acceleration as follows. When the liquid reserve battery is subjected to an acceleration in the direction of the arrow 259 (260 and 261 in FIGS. 15 and 117, respectively), the acceleration acts on the mass of the collar 254 and exerts a downward inertial force on the collar against the compressively preloaded spring 255. If the generated inertial force is below the level of spring 255 preload, the collar would not move downward. If the applied acceleration is above the prescribed firing setback acceleration threshold level, the spring 255 preload level is designed to be overcome, thereby allowing the collar 254 to begin to move downwards. Then if the applied acceleration is applied long enough, i.e., if the prescribed acceleration threshold is reached and its duration is at or longer than the prescribed all-fire acceleration duration, then the collar 254 is designed to move down enough to clear the path for the balls 250 to be pushed out of the holes 249 in the cylindrical extension 247, thereby freeing the locking head 252, thereby allowing the preloaded spring 214 and/or 212 (FIG. 15) to begin to collapse the electrolyte storage container 198, thereby to begin to activate the liquid reserve batteries of FIGS. 15 and 17. Otherwise, if the acceleration in the direction of the arrow 259 is at or above the prescribed acceleration threshold but its duration is much shorter than the prescribed threshold (like accelerations that are encountered due to accidental drops on hard surfaces), then the collar 254 would move down, but not enough to clear a path for the balls 250 to be push out of engagement with the locking head 252 and the collar 254 would return back to its state shown in FIG. 20.

Figure 21:
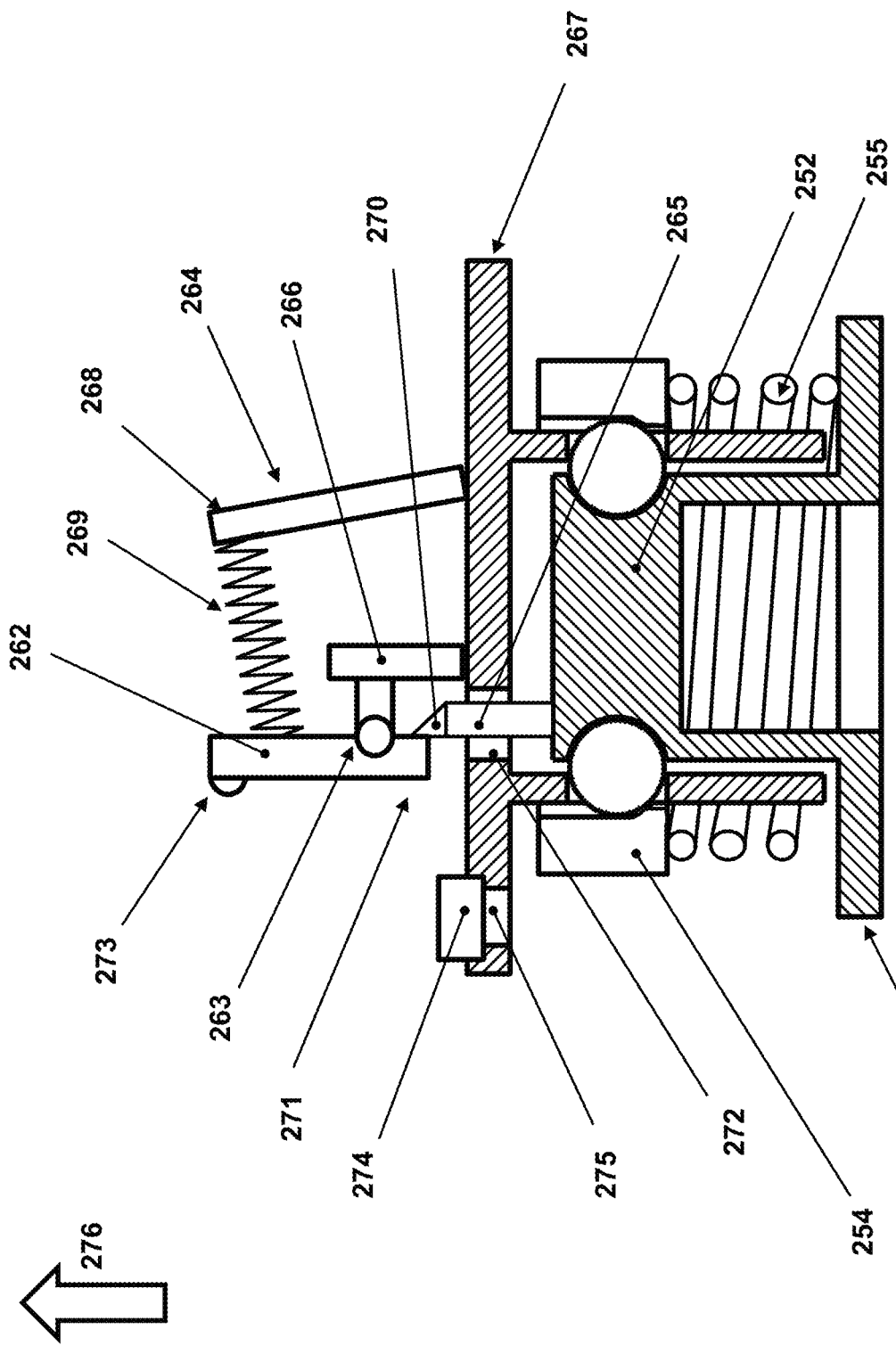
FIG. 21 illustrates one inertial activation device for the liquid reserve battery embodiments of FIGS. 15 and 17 with an integrated primer initiation mechanism.

FIG. 21 illustrates the activation device of FIG. 20 with an integrated percussion primer initiation mechanism. In this activation mechanism, the following modifications are made to the activation device of FIG. 20 to allow for a percussion primer to be initiated as the liquid reserve battery is being activated as described above for the activation device of FIG. 20. The activation device of FIG. 21 can then be used for activation of the liquid reserve battery embodiment of FIG. 16 (as indicated by the numeral 222).

In the activation device of FIG. 21, a rotating link 262 is provided that is attached to the support member 266 by the rotary joint 263. The support member 266 is in turn fixedly attached to the top surface of the plate 267 (246 in FIG. 20). It is appreciated that as is described later in this disclosure, in the activation device of FIG. 21, the plate 267 is no longer the top cap of the liquid reserve battery, FIG. 16.

A support structure 264 is also fixedly attached to the top surface of the plate 267 as shown in FIG. 21. A compressively preloaded spring 269 is then attached on one end to the tip 268 of the structure 264 and to the free end of the link 262 on the other end to bias the link to rotate in the counterclockwise direction as viewed in the plane of FIG. 21 if unconstrained. However, in the pre-activation state shown in FIG. 21, the tip 270 of the stop member 265, which is fixedly attached to the locking head 252, is used to engage the end 271 of the link 262 as shown in FIG. 21, thereby preventing the link 262 from rotating in the counterclockwise direction. It is noted that an opening 272 is provided in the plate 267 for the stop member 265 to pass and engage the end 271 of the link 262.

It is noted that in the schematic of FIG. 21 the spring 269 in shown as a preloaded compressive helical spring. However, it is appreciated by those skilled in the art that the spring 269 may also be a torsional spring that is acting about the rotary joint 263 and fixed on one end to the structure 266 and on the other end to the link 262 and that it is preloaded and biased to accelerate the link 262 rotationally in the counterclockwise direction as seen in the view of FIG. 21, i.e., to act as described for the preloaded compressive spring 269.

A pointed tip 273 is also provided on the free end of the link 262, which is positioned to strike the percussion primer 274 upon the liquid reserve battery (FIG. 16) activation as described below. The liquid reserve battery of FIG. 16 is redrawn with the activation device of FIG. 21 in FIG. 22 for this purpose.

Figure 22:
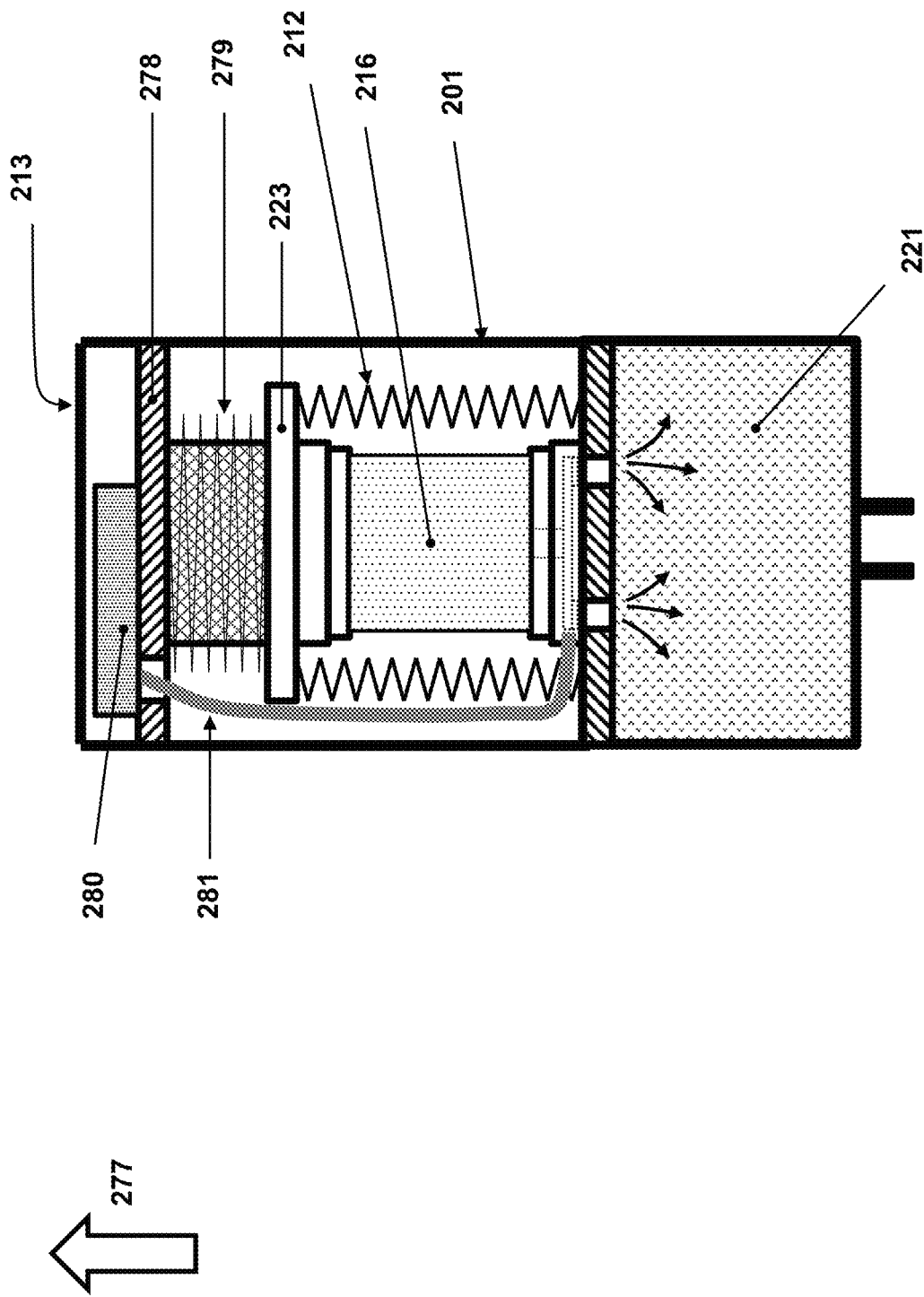
FIG. 22 illustrates a sectional schematic of the liquid reserve battery embodiment of FIG. 16 with the assembled inertial activation device of FIG. 21.

As can be seen in FIG. 22, the plate 278 (267 in FIG. 22) of the activation device of FIG. 21 is fixedly attached to the interior wall of the battery housing 201 of the liquid reserve battery. The compressively preloaded spring 279 (214 in FIG. 16) is then positioned between the plate 278 and the rigid plate 223.

The liquid reserve battery embodiments of FIG. 22 with the activation mechanism of FIG. 21 is activated by firing setback acceleration as follows. When the liquid reserve battery is subjected to an acceleration in the direction of the arrow 277, the acceleration acts on the mass of the collar 254 and exerts a downward inertial force on the collar against the compressively preloaded spring 255 (FIG. 20). If the generated inertial force is below the level of spring 255 preload, the collar would not move downward. If the applied acceleration is at or above the prescribed firing setback acceleration threshold level, the spring 255 preload level is overcome, thereby allowing the collar 254 to begin to move downwards. Then if the acceleration is applied long enough, i.e., if the prescribed acceleration threshold is reached and its duration is at or longer than the prescribed all-fire acceleration duration, then the collar 254 is designed to move down enough to clear the path for the balls 250 to be pushed out of the holes 249 in the cylindrical extension 247, FIG. 20, thereby freeing the locking head 252, thereby allowing the preloaded spring 279 (214 in FIG. 16) and/or 212 (FIG. 16) to begin to collapse the electrolyte storage container 216, thereby to begin to activate the liquid reserve battery of FIG. 22. Otherwise, if the acceleration in the direction of the arrow 277 is at or above the prescribed acceleration threshold but its duration is much shorter than the prescribed threshold (like accelerations that are encountered due to accidental drops on hard surfaces), then the collar 254 (FIG. 20) would move down, but not enough to clear a path for the balls 250 to be push out of engagement with the locking head 252 and the collar 254 would return back to its state shown in FIG. 20.

In the meantime, as the locking head 252 moves down, i.e., away from the plate 267, FIG. 21, the tip 270 of the stop member 265 disengages the tip 271 of the link 262, thereby allowing the preloaded compressive spring 269 to accelerate the link 262 rotationally in the counterclockwise direction and cause the pointed tip 273 to strike the percussion primer 274 and initiate it. The ignition flame and sparks of the percussion primer 274 (the entire components of the percussion cap initiation mechanism above the plate 267 of FIG. 21 are collectively shown as the member 280 in FIG. 22) would then ignite the fuse 281 (224 in FIG. 16) to perform the electrolyte heating function as was previously described for the embodiment of FIG. 16.

Figure 23:
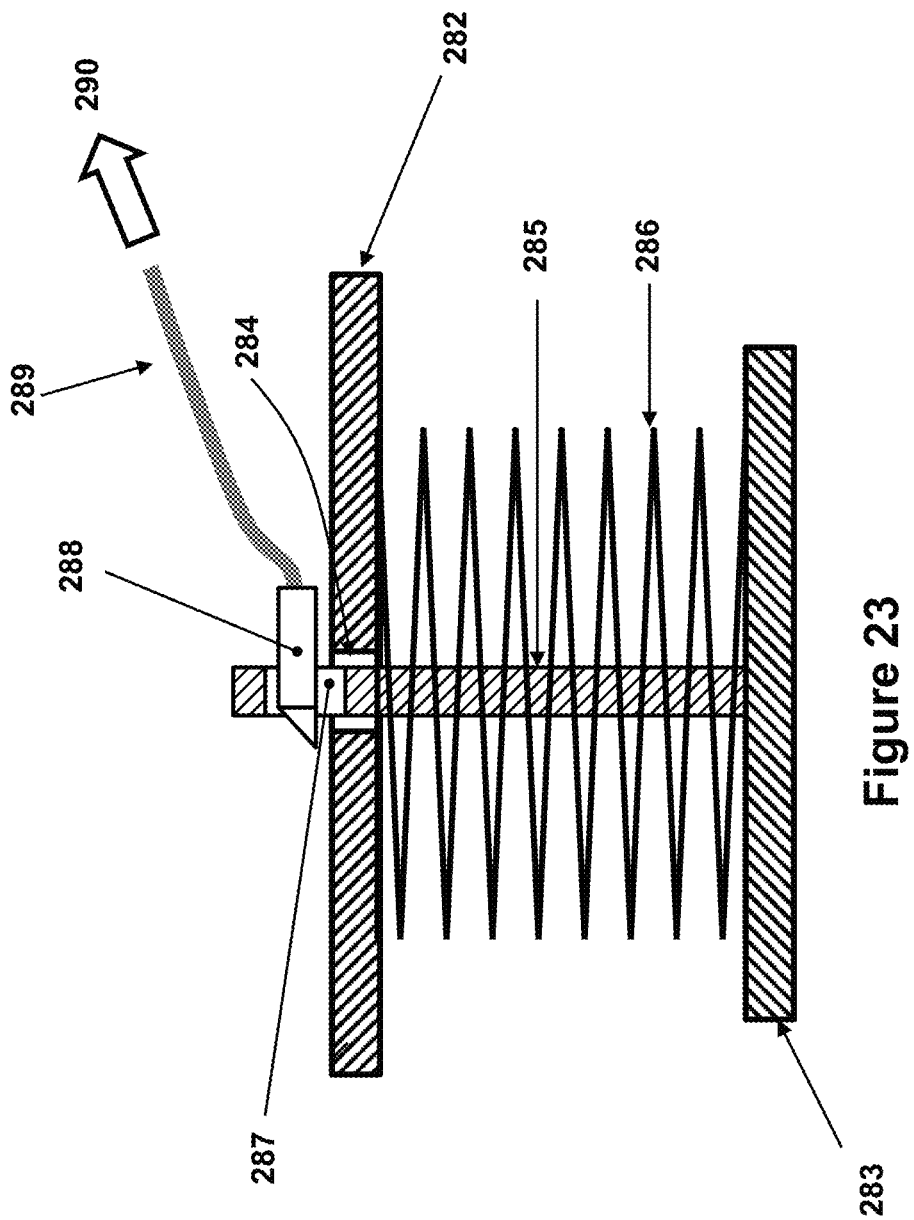
FIG. 23 illustrates a lanyard pulled activation device for the liquid reserve battery embodiments of FIGS. 15-17 and 22.

As was previously described, the liquid reserve battery embodiment 200 of FIG. 15 and the liquid reserve battery embodiment of FIG. 17 are activated by the activation device 209 releasing the rigid plate 210. The release mechanisms described in the embodiments of FIGS. 20 and 21 are for use in gun-fired munitions in which the activation device must release the rigid plate 210 only when the all-fire condition, i.e., when a prescribed minimum firing setback acceleration level that lasts a prescribed period of time has been detected. In certain applications, the liquid reserve battery is required to be initiated by the pulling of a lanyard. In FIG. 23, such an embodiment of the present invention is illustrated.

In the activation device of FIG. 23, only the activation mechanism as attached to the plate 282 (267 in FIG. 21) and the rigid plate 283 (210 in FIG. 15) of the liquid reserve battery embodiments of FIGS. 15 and 17 are shown. The rigid plate 283 is provided with a post 285 that is fixedly attached to it and in the configuration shown in FIG. 23, passes through the opening 284 that is provided in the plate 282. A preloaded compressive spring 286 is then positioned between the plates 282 and 283, which would tend to separate the two plates. However, in the configuration shown in FIG. 23, the pin 288 which is passed through the opening 287 in the post 285 would limit the distance between the two plates 282 and 283. A lanyard 289 is then provided that can be pulled in the direction of the arrow 290 to pull the pin 288 out of the opening 287, thereby allowing the plate 283 to be pushed away from the plate 282 without any restriction.

Figure 24:
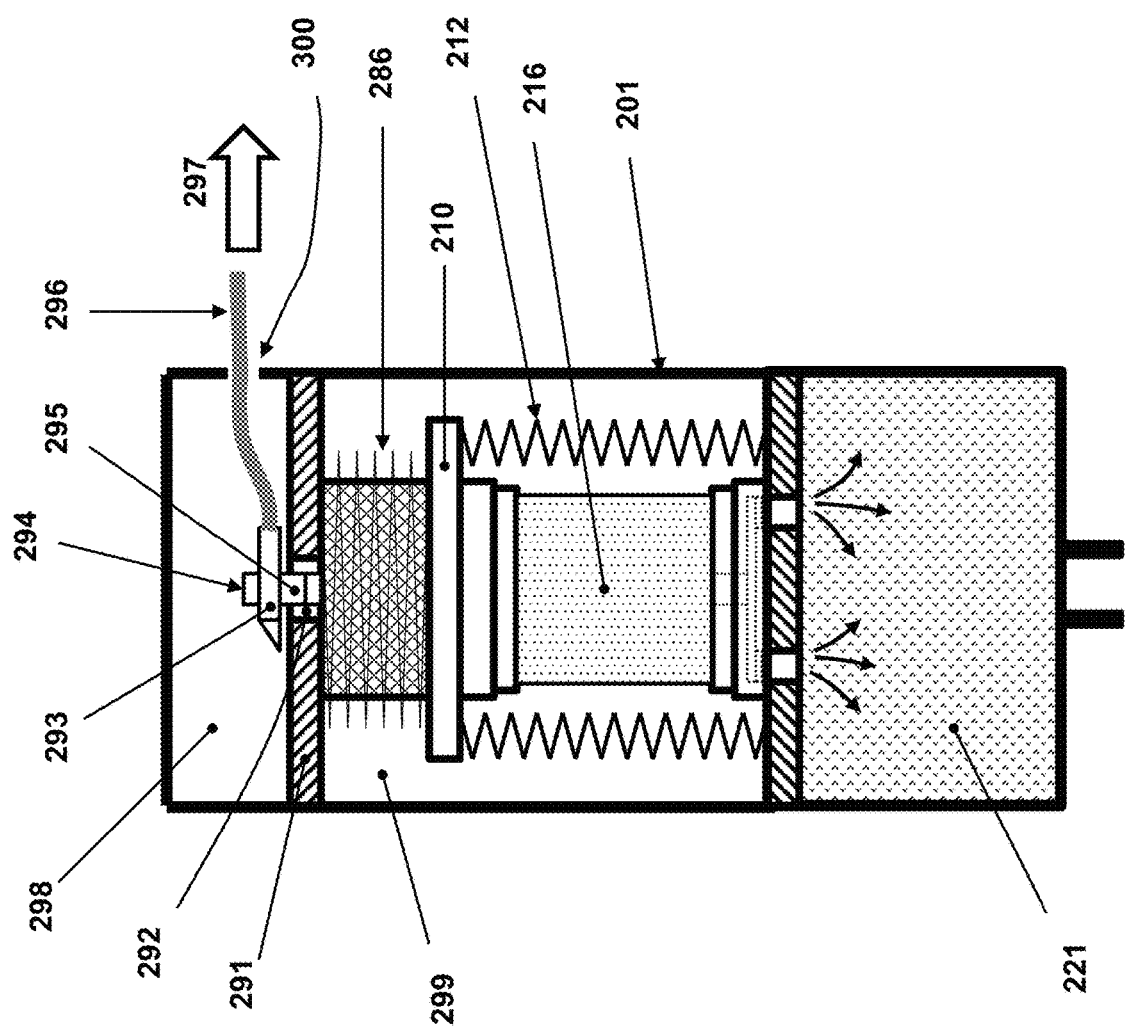
FIG. 24 illustrates a sectional schematic of the liquid reserve battery embodiment of FIGS. 15 and 17 with the lanyard pulled activation device of FIG. 24.

The lanyard pulled activation mechanism of FIG. 23 may then be used to activate the liquid reserve battery embodiments of FIGS. 15 and 17 as shown in FIG. 24. As can be seen in FIG. 24, the plate 291 (282 in FIG. 23) of the activation device of FIG. 23 is fixedly attached to the interior wall of the battery housing 201 of the liquid reserve battery. The compressively preloaded spring 286 is now positioned between the plate 291 and the rigid plate 210 (283 in FIG. 23). The post 294 (285 in FIG. 23), which is fixedly attached to the plate 210 is then passed through the opening 292 (284 in FIG. 23) in the plate 291, and locked in place by insertion of the pin 293 (288 in FIG. 23) through the opening 295 (287 in FIG. 23) as shown in FIG. 24. The lanyard 296 (289 in FIG. 23), which is attached to the pin 293, provides the means of releasing the post 294 by pulling it in the direction of the arrow 297 to pull the pin 293 out of engagement with the post 294. The liquid reserve battery of FIG. 24 is therefore activated by the pulling of the lanyard 296 by certain means provided by the system using the battery.

It is appreciated by those skilled in the art that in the liquid reserve battery of FIG. 24, the above compartment 298 and the volume around the electrolyte storage container 216 cannot be hermetically sealed due to the opening 300 in the battery housing 201. The battery core and the electrolyte storage container are, however, hermetically sealed. This shortcoming of the liquid reserve battery embodiment of FIG. 24 can be addressed using one of the following two design modifications.

Figure 25A:
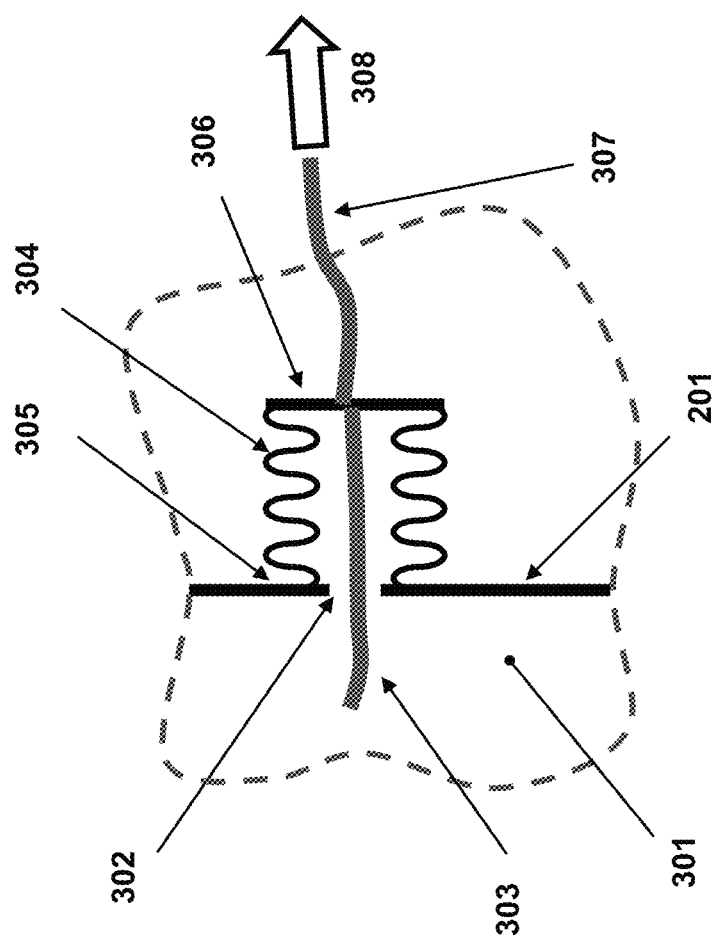
FIGS. 25A and 25B illustrate bellow based lanyard attachment designs for the liquid reserve battery embodiment of FIG. 24 to achieve fully hermetically sealed battery.

FIG. 25A shows the first method of achieving a fully hermetically sealed liquid reserve battery with lanyard pulled activation device. In FIG. 25A, the area enclosed by the dashed line is intended to show the area around the opening 302 (300 in FIG. 24) in the battery housing 201, through which the activation lanyard 296, FIG. 24, is passed. The side indicated by the numeral 301 is the battery interior side of the housing 201. In this method, a metal (such as stainless-steel) bellow 304 is welded on one end 305 to the battery housing 201 around the opening 302. The other end of the bellow 304 is closed by welding of a cap plate 306. The welding of the bellow to the housing on one end and to the cap plate 306 on the other end ensures that the interior of the housing is rendered fully and hermetically sealed. The lanyard 303 (296 in FIG. 24), which is attached to the activation pin 293 is then fixedly attached to the bellow side of the cap plate 306. A lanyard 307 is attached to the other side of the cap plate 306 as can be seen in FIG. 25A. Then to activate the liquid reserve battery of FIG. 24, the lanyard 307 is pulled in the direction of the arrow 308, thereby causing the bellow to extend, thereby pulling the lanyard 303, thereby causing the activation pin 293 being pulled out of engagement with the post 294, FIG. 24, causing the liquid reserve battery of FIG. 24 to be activated as was previously described.

Figure 25B:
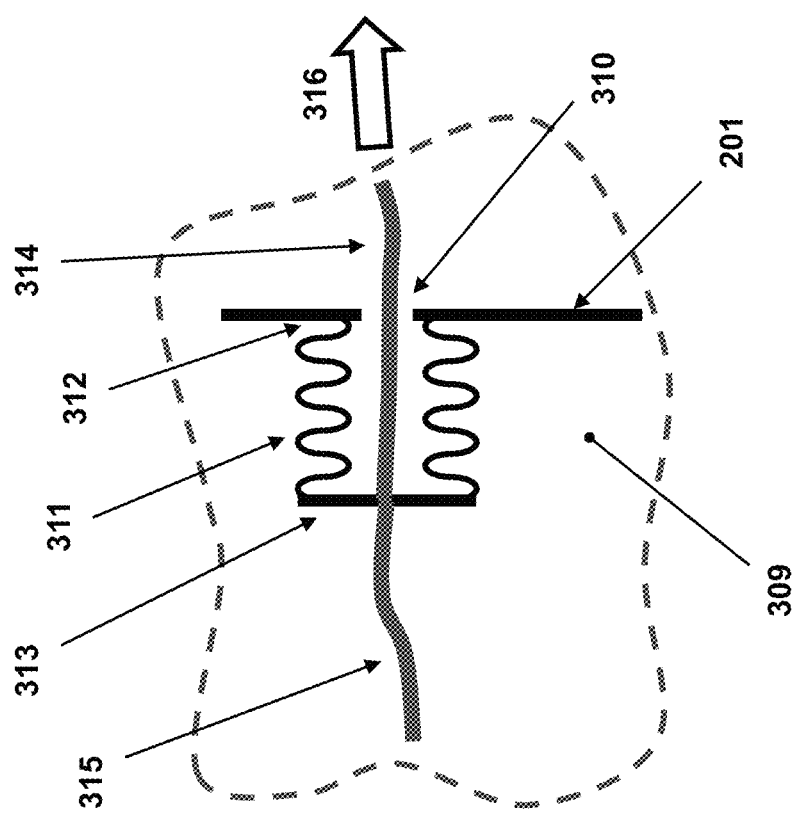

FIG. 25B shows the second method of achieving a fully hermetically sealed liquid reserve battery with lanyard pulled activation device. In FIG. 25B, the area enclosed by the dashed line is intended to show the area around the opening 310 (300 in FIG. 24) in the battery housing 201, through which the activation lanyard 296, FIG. 24, is passed. The side indicated by the numeral 309 is the battery interior side of the housing 201. In this method, a metal (such as stainless-steel) bellow 311 is welded on one end 312 to the battery housing 201 around the opening 310. The other end of the bellow 311 is closed by welding of a cap plate 313. The welding of the bellow to the housing 201 on one end and to the cap plate 313 on the other end ensures that the interior of the housing is rendered fully and hermetically sealed. The lanyard 315 (296 in FIG. 24), which is attached to the activation pin 293 is then fixedly attached to the cap plate 313. A lanyard 314 is attached to the opposite side of the cap plate 306, located inside the bellow 311 as can be seen in FIG. 25B. Then to activate the liquid reserve battery of FIG. 24, the lanyard 314 is pulled in the direction of the arrow 316, causing the bellow to collapse, pulling the lanyard 315, thereby causing the activation pin 293 being pulled out of engagement with the post 294, FIG. 24, causing the liquid reserve battery of FIG. 24 to be activated as was previously described.

The liquid reserve battery embodiments of FIGS. 14 and 17 with the activation mechanism of FIG. 20 are then activated by firing setback acceleration as follows. When the liquid reserve battery is subjected to an acceleration in the direction of the arrow 259 (260 and 261 in FIGS. 15 and 117, respectively), the acceleration acts on the mass of the collar 254 and exerts a downward inertial force on the collar against the compressively preloaded spring 255. If the generated inertial force is below the level of spring 255 preload, the collar would not move downward. If the applied acceleration is above the prescribed firing setback acceleration threshold level, the spring 255 preload level is designed to be overcome, thereby allowing the collar 254 to begin to move downwards. Then if the applied acceleration is applied long enough, i.e., if the prescribed acceleration threshold is reached and its duration is at or longer than the prescribed all-fire acceleration duration, then the collar 254 is designed to move down enough to clear the path for the balls 250 to be pushed out of the holes 249 in the cylindrical extension 247, thereby freeing the locking head 252, thereby allowing the preloaded spring 214 and/or 212 (FIG. 15) to begin to collapse the electrolyte storage container 198, thereby to begin to activate the liquid reserve batteries of FIGS. 15 and 17. Otherwise, if the acceleration in the direction of the arrow 259 is at or above the prescribed acceleration threshold but its duration is much shorter than the prescribed threshold (like accelerations that are encountered due to accidental drops on hard surfaces), then the collar 254 would move down, but not enough to clear a path for the balls 250 to be push out of engagement with the locking head 252 and the collar 254 would return back to its state shown in FIG. 20.

The electrolyte storage container of FIG. 13A is seen to be constructed with the wall member of a single storage container unit embodiment 150 of FIG. 10 as assembled with the top and bottom member 165 and 167, respectively, with the corresponding transition sections 166 and 168. It is, however, appreciated by those skilled in the art that more than one wall member of the storage container unit 150 of FIG. 10 may be stacked to form a single electrolyte storage container, such as the storage container 175 shown in FIG. 14. As can be seen, the electrolyte storage container 175 is constructed with three wall member of the storage container unit 150 (hereinafter referred to as stages and the storage container 175 as a multi-stage storage container) as indicated by the numerals 172, 173 and 174. The three stages 172, 173 and 174 are formed as was described earlier for the storage container 150 from a single thin wall tube (usually 0.003 inch to 0.010 inch thick). In general, it is most cost effective to form the single and multi-stage electrolyte storage containers from a single thin wall tube, but they may also be fabricated by welding panels or wall units, fabricating by electroplating or hydroforming, or 3D printing.

It is appreciated that once a multi-stage electrolyte storage container wall 175, FIG. 14, is constructed, it can be assembled as previously described for the storage container of FIG. 13A with the top and bottom member 165 and 167, respectively. The multi-stage electrolyte storage container wall 175 is also provided with the transition sections 166 and 168 (not shown in FIG. 14), which are formed from the same thin wall tube that is used to construct the container wall 175.

In the above disclosures, the embodiments of FIGS. 10-14 of the present invention are described as electrolyte storage containers for liquid reserve batteries. It is, however, appreciated by those skilled in the art that the disclosed single (FIG. 10) or multi-stage (FIG. 14) wall structures with end caps (for example, 165 and 167 of FIG. 13A) may also be used for storing other various liquids, such as medicine, in place of glass bottles and ampules, or as coupling with minimal resistance for connecting pipes or shafts with minimal resistance. The wall structures may be designed to collapse by the application of force/pressure and/or torque and remain in their collapsed state after the applied force/pressure and/or torque has ceased or they may be designed to rebound to their free state, i.e., function as a spring. As such, the single and multi-stage wall structures function as standard bellow, such as the bellow 22 in FIG. 1, but with advantages that include more flexibility (i.e., lower spring rate); larges elastic deformation; and the significantly lower solid length.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A liquid reserve battery comprising:
a collapsible storage unit having a collapsible cavity for storing a liquid electrolyte therein; and
a battery cell in communication with an outlet of the collapsible storage unit, the battery cell having gaps dispersed therein;
wherein the collapsible storage unit comprises a plurality of triangular sidewalls; and
the plurality of triangular sidewalls being configured to collapse in a longitudinal direction about a hinge disposed between adjacent sides of each of the plurality of triangular sidewalls.

2. The liquid reserve battery of claim 1, further comprising a pyrotechnic material disposed adjacent the collapsible storage unit such that initiation of the pyrotechnic material provides pressure to collapse the collapsible storage unit to heat and force the liquid electrolyte through the outlet and into the gaps.

3. The liquid reserve battery of claim 1, wherein the collapsible storage unit has a top plate and a bottom plate between which the plurality of triangular sidewalls extend.

4. The liquid reserve battery of claim 1, wherein one of the top plate and the bottom plate has the outlet for ejecting the liquid electrolyte into the battery cell.

5. The liquid reserve battery of claim 4, wherein the outlet is covered by a diaphragm.

6. The liquid reserve battery of claim 5, wherein the diaphragm has first portions weaker than second portions to facilitate breakage of the diaphragm along the first portions.

7. The liquid reserve battery claim 5, further comprising a puncture member movable with collapse of the collapsible storage unit to puncture the diaphragm.

8. The liquid reserve battery of claim 1, further comprising an initiation device configured to initiate collapse of the collapsible storage unit.

9. The liquid reserve battery of claim 8, wherein the initiation device initiates the collapse of the collapsible storage unit upon an acceleration event having an acceleration greater than a predetermined magnitude and duration.

10. The liquid reserve battery of claim 8, wherein the initiation device initiates the collapse of the collapsible storage unit upon pulling of a lanyard attached to the initiation device.

11. The liquid reserve battery of claim 3, wherein upon collapse of the collapsible storage unit, the top plate and the bottom plate do not rotate relative to each other.

12. The liquid reserve battery of claim 4, further comprising a base plate having an opening in fluid communication with the collapsible cavity, the plate having two or more channels in fluid communication with the opening, each of the channels having an outlet in fluid communication with the battery cell.

13. The liquid reserve battery of claim 12, wherein the base plate comprises the one of the top plate or the bottom plate having the outlet and the opening comprises the outlet.

14. The liquid reserve battery of claim 2, wherein at least a portion of the pyrotechnic material is disposed adjacent to the two or more channels.

15. The liquid reserve battery of claim 8, further comprising one or more springs positioned such that, upon initiation, apply a force to collapse the collapsible storage unit.

16. The liquid reserve battery of claim 1, wherein the plurality of triangular sidewalls are integrally formed of a metal.

17. The liquid reserve battery of claim 16, wherein the hinges joining the adjacent sides of each of the plurality of triangular sidewalls are formed having a thickness thinner than other portions of the plurality of triangular sidewalls.

* * * * *